(12) United States Patent
Tachiki et al.

(10) Patent No.: US 6,531,569 B1
(45) Date of Patent: Mar. 11, 2003

(54) RESIN MATERIAL FOR GAS SEPARATION BASE AND PROCESS FOR PRODUCING THE SAME

(75) Inventors: Akira Tachiki, Futtsu (JP); Hiroshi Mano, Kyoto (JP); Kenji Haraya, Tsukuba (JP)

(73) Assignees: National Institute of Advanced Industrial Science and Technology, Tokyo (JP); Research Institute of Innovative Technology for the Earth, Kyoto (JP); Nippon Steel Corporation, Tokyo (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/937,143

(22) PCT Filed: Mar. 22, 2000

(86) PCT No.: PCT/JP00/01751

§ 371 (c)(1),
(2), (4) Date: Sep. 21, 2001

(87) PCT Pub. No.: WO00/56430

PCT Pub. Date: Sep. 28, 2000

(30) Foreign Application Priority Data

Mar. 23, 1999 (JP) ........................................... 11-077994

(51) Int. Cl.$^7$ .............................................. C08G 69/44
(52) U.S. Cl. ...................................................... 528/289
(58) Field of Search ......................................... 528/289

(56) References Cited

U.S. PATENT DOCUMENTS

| 5,055,616 A | 10/1991 | Burgoyne et al. |
| 5,409,525 A | 4/1995 | Kazama et al. |

FOREIGN PATENT DOCUMENTS

| DE | 140623 | | 3/1980 |
| EP | 412882 | * | 2/1991 |
| JP | 41-8525 | * | 4/1992 |
| JP | A4108525 | | 4/1992 |
| JP | 05192552 | * | 9/1993 |
| JP | A9173801 | | 7/1997 |
| JP | A10099666 | | 4/1998 |

OTHER PUBLICATIONS

Tokuda et al, Energy Convers. Manage, vol. 38, (Suppl., Proceedings of the Third International Conference on Carbon Dioxide Removal) pp. S111–S116 (1997).

Okamoto et al, Chemistry Letters, No. 8, pp. 613–614, (1996).

Journal Macromolecular Symposia (2001), 175 (Polymerization processess and Polymer Materials II) pp. 403–410.*

Nippon Kagaku Kaishi, 1973, No. 1, pp. 35–39.

Yoshikawa et al., Chemistry Letters, 1994, pp. 243–246.

Okamoto et al., Chemistry Letters, 1996, pp. 613–614.

Cabasso, Israel et al., Journal of Applied Polymer Science; vol. 18, pp. 1969–1986, 1974.

Cabasso, Israel et al., Journal of Applied Polymer Science, vol. 23, pp. 2967–2988.

Pugh, Coleen et al., Macromolecules, 1986, vol. 19, pp. 65–71.

Liska, Juraj et al., Die Angewandte Makromolekulare Chemie, Vo. 211, pp. 121–129, 1993 (No. 3676).

Nishikobu et al., Journal of Synthetic Organic Chemistry, Japan, vol. 51, No. 2; 1993; pp. 157–0167.

Wang, Fei et al., Macromolecules, vol. 26, pp. 5295–5302; 1993.

Scoponi, Marco et al., Die Andewandte Makromolekulare Chemie; pp. 237–256, vol. 252; 1997; No. 4525.

Wang, Fei et al., Journal of Polymer Science: Part A: Polymer Chemistry, vol. 32, pp. 2413–2424, 1994.

* cited by examiner

*Primary Examiner*—Terressa M. Boykin
(74) *Attorney, Agent, or Firm*—Birch, Stewart, Kolasch & Birch, LLP

(57) ABSTRACT

This invention relates to resin material for gas separation base containing a cardo polyimide structure in which the hydrogen atoms in the side-chain benzyl and/or allyl position are halogenated at a rate of modification by halogen of 0.1% or more or resin material for gas separation base containing polymer in which the hydrogen atoms in the side-chain benzyl and/or allyl position are halogenated at a rate of modification by halogen of 34% or more and, additionally, relates to polymer which serves as raw material for the aforementioned resin material for gas separation base containing a cardo polymer structure and a process for producing said polymer; said polymer not only excels in such properties as solvent solubility, ease of conversion to film by a wet process, thermal stability, and chemical stability but also performs well in gas permeability and the process of this invention makes it possible to produce gas separation base, particularly gas separation membrane, whose gas permeability and gas selectivity can be readily controlled.

31 Claims, 4 Drawing Sheets

RESIN MATERIAL FOR GAS SEPARATION BASE AND PROCESS FOR PRODUCING THE SAME

This application is the national phase under 35 U.S.C. §371 of PCT International Application No. PCT/JP00/01751 which has an International filing date of Mar. 22, 2000, which designated the United States of America.

FIELD OF TECHNOLOGY

This invention relates to resin materials for gas separation base and a process for producing the same and, particularly to resin materials for gas separation base consisting of polymers in which hydrogen atoms in the side-chain benzyl and/or allyl position are replaced by halogen atoms, resin materials for gas separation base consisting of cardo polymers in which hydrogen atoms in the side-chain benzyl and/or allyl position are replaced by specified functional groups, halogen- or functional group-modified polymers of a cardo polyimide structure in which hydrogen atoms in the side-chain benzyl and/or allyl position are replaced by halogen atoms or functional groups, a process for producing the aforementioned polymers, and gas separation membranes based on the aforementioned resin materials for gas separation base. Resin materials of this invention are useful in a variety of areas such as recovery of carbon dioxide from exhaust gas, separation of methane/carbon dioxide from natural gas, dehumidification of gases, and manufacture of oxygen and nitrogen from air and are also applicable as functional resin materials to a variety of areas.

BACKGROUND TECHNOLOGY

In recent years, numerous attempts have been made to separate and purify a mixture of gases by means of resin or polymer materials, in particular, polymer gas separation membranes. For example, an attempt is being made to prepare oxygen-enriched air by passing air through a polymer gas separation membrane thereby selectively permeating oxygen and utilize it in medical care, combustion system, and the like.

Gas separation membranes to be used in the aforementioned applications are required to exhibit excellent permeability and selectivity toward the gas to be separated. Moreover, depending upon the environment in which they are used, there is also a demand for additional property requirements such as stability, heat resistance, chemical resistance, and high strength. Moreover, another important requirement is ease of their processibility into hollow fibers that provide a configuration suitable for highly efficient gas separation. A large number of polymer separation membranes have been tested for a variety of gases to see whether they satisfy the aforementioned requirements or not.

An indicator of gas permeability of a polymer membrane or permeability coefficient is expressed by the product of solubility coefficient that is an indicator of the solubility of gas in the polymer membrane and diffusion coefficient that is an indicator of the diffusibility of gas in the polymer membrane. Moreover, separation factor that is an indicator of selectivity is expressed by the ratio of the permeability of the gas to be separated to that of the gas not to be separated. Therefore, in order to improve selectively the permeability of the gas to be separated relative to that of the gas not to be separated, it becomes necessary to improve selectively the solubility coefficient and/or diffusion coefficient of the gas to be separated relative to that of the gas not to be separated.

A means that is considered to be effective for selectively improving the solubility coefficient is to provide the membrane with an affinity to the gas to be separated and various studies are being made on polymers containing a structure (a functional group) exhibiting a physical or chemical affinity to the gas to be separated.

Regarding separation membranes for $CO_2$, for example, Japan Kokai Tokkyo Koho Hei 08-332,362 (1996) utilizes an idea of the existence of an affinity between $CO_2$ and ester and reports on a polyimide-type gas separation membrane synthesized from a cardo monomer containing an ester group. Although this gas separation membrane is capable of improving the separation factor, it still leaves the permeability coefficient at a low level.

Yoshikawa et al., holding an idea of the existence of an affinity between $CO_2$ and amine, report on polymers prepared from a monomer containing a tertiary amino group in Chemistry Letters, p. 243 (1994). In this case, however, they face the same problem as in the aforementioned cardo monomer containing an ester group, that is, the separation factor improves but the permeability coefficient remains low.

In the case of polymers that are synthesized from monomers containing a functional group exhibiting an affinity to gas as described in the aforementioned examples, such monomers become difficult to polymerize if the functional group in the monomer is chemically reactive or spatially bulky; monomers of this type are not suitable for the synthesis of polymers for gas separation membranes that require a high degree of polymerization.

On the other hand, separately from the aforementioned methods, studies are being made on an approach that introduces a functional group exhibiting an affinity to gas to polymers after formation of the polymer backbone. In numerous examples reported, the starting materials for this type of polymer reaction are polymers in which aromatic rings containing side chains are halogenated in the benzyl position, that is, polymers containing a halogenated carbon atom in the benzyl position as an active site in the reaction. Halogenated polymers containing halogenated carbon atoms in the benzyl position are generally easy to synthesize and show good storage stability. These halogenated polymers exhibit high reactivity with nucleophilic reagents and the reaction can be controlled with ease.

Such being the case, Okamoto et al. have proposed in Chemistry Letters, p.613 (1996) and in the specification of Japan Kokai Tokkyo Koho Hei 09-173,801 (1997) to subject aromatic polyimides containing methyl groups as substituents to bromination at the side chain, convert the brominated polymers into film, treat the film with an amine to give amine-modified polyimides, and use the resulting film as a gas separation membrane. Regarding this gas separation membrane, however, it is essential that the gas to be separated accompanies water vapor and the examples disclose only those membranes which are used in the configuration of film and none in the configuration of hollow fiber that is suitable for a gas separation membrane. Moreover, there is the possibility of the amino groups in the polyimide polymer in question being oxidized in air, but no description is given on the durability of the polymer. What is more, aromatic polyimides show low solvent solubility in general and it is often the case that solvents useful for chemical modification such as bromination are limited. Therefore, a reaction in a homogeneous system, that is, a reaction to be carried out with the reactants dissolved in a solvent may be applicable to one kind of aromatic polyimide, but it is not necessarily applicable to another kind of aromatic polyimide. Rather, a reaction in a homogeneous system is often difficult to apply to aromatic polyimides.

On the other hand, there is a thought that providing the polymer backbone with planarity and rigidity is effective for selectively improving the diffusion coefficient and studies have been made on polymers containing a bulky structure in the polymer backbone. For example, Japan Tokkyo Koho Sho 55-41,802 (1980) describes polyimide-type gas separation membranes containing a rigid polyimide skeleton to which a substituent is introduced and states that restriction of free rotation around the polymer backbone is an effective means for enhancing the gas permeability and gas selectivity of polymer gas separation membranes.

Aside from the applications as gas separation membranes, a number of reports have been made on modification of polymer backbone in order to provide polymers with a variety of functions.

For example, Ohkawara et al. reported in 1966 on the reaction of chlorinated poly(chloromethylstyrene) (PCMS) with various nucleophilic reagents and Nishikubo et al. reported on exceptional acceleration of this reaction by adding to the reaction system a quaternary ammonium salt or the so-called phase-transfer catalyst. Reference should be made to Tadaomi Nishikubo et al., Journal of the Chemical Society of Japan, 35 (1973) and, for an overview, to Journal of the Organic Synthetic Chemistry Association, 51 (2) (1933).

Cabasso et al. synthesized modified polyphenylene oxide (PPO) in 1974 by treating poly[oxy(2,6-dimethyl-1,4-phenylene)] with bromine or N-bromo-succinimide (NBS) to build a bromobenzyl structure and treating the brominated polymer with a compound of trivalent phosphorus to introduce a pentavalent phosphate group [J. Appl. Polym. Sci., 18, 1969–1968 (1974); J. Appl. Polym. Sci., 23, 2967–2988 (1979)]. The following reports are known on reactions of this kind: C. Pugh and V. Percec, Macromolecules, 19, 65 (1986); J. Liske, E. Borsig, and I. Tack, Angewand. Makromol. Chemie, 211, 121 (1993); and M. Scoponi and C. Ghighone, Angewand. Makromol. Chemie, 252, 237–256 (1997).

Starting with polyaryletheretherketone (PEEK) containing side-chain methyl groups, Wang and Roovers in 1993 brominated the side-chain methyl groups by bromine and then treated the brominated PEEK with a variety of nucleophilic reagents to give PEEK containing functional groups [J. Polym. Sci., Part A, 32, 2413–2424 (1994); Macromolecules, 26, 5295–5302 (1993)].

Regarding the processibility of membrane polymers, aromatic polyimides with a rigid structure that is advantageous in respect to selectivity in gas separation generally show extremely poor solvent solubility and the choice of solvents in which chemical modification such as bromination can be carried out is very much limited. For example, polyimides prepared by the reaction of 2,4,6-trimethyl-1,3-phenylenediamine (TrMPD) with 3,4,3',4'-biphenyltetracarboxylic acid dianhydride show poor solvent solubility and a solvent useful for the polyimides in question is practically limited to dichloromethane. Therefore, if an attempt is made to carry out the substitution reaction of the brominated polyimides with an amine in dichloromethane, the dichloromethane reacts with the amine, that is, the substitution with amine cannot be carried out in dichloromethane as a solvent. Thus, it is difficult to carry out the substitution with amine in a homogeneous system, that is, in a solution of the aforementioned brominated polyimides in dichloromethane.

Poor solvent solubility such as this places great restrictions on the preparation of membranes, particularly on the preparation of asymmetric hollow fibers which provide a suitable configuration for gas separation membranes. Generally, in the preparation of asymmetric hollow fibers, the polymers are dissolved in a solvent which dissolves the polymers well and is miscible with water which does not dissolve the polymers, for example, N-methylpyrrolidone (NMP) and dimethylacetamide (DMAc), and the polymer solution is brought into contact with water to transfer the solvent from the polymer solution to water and form the membrane (to form the active layer for gas separation). As described above, no solvent but dichloromethane can be used for ordinary aromatic polyimides. As dichloromethane is not miscible with water, it is not possible to prepare asymmetric hollow fibers from these aromatic polyimides.

Moreover, in the case of poor solvent solubility such as above, it is conceivable to carry out the modification of aromatic polyimides with an amine by first molding a membrane in the intended configuration from the brominated polyimides and then immersing the molded polymer in a solution of amine-water system to replace the bromine with the amine. On application of this procedure, however, it is not easy for the amine molecules to penetrate into the inside of the membrane and replace the bromine and the resulting amine-modified moldings are not uniform throughout the surface and the inside and only moldings exibiting a low rate of permeation are obtained sometimes in practice.

The present inventors have taken note of good stability, solvent solubility, and processibility of cardo polymers and conducted studies on them. Here, cardo polymers is a generic name of polymers in which cyclic groups are directly linked to the backbone. Structurally, a bulky substituent containing a quaternary carbon atom exists at a right angle to polymer backbone in cardo polymers and this structure helps to exhibit high heat resistance, good solvent solubility, high transparency, high refractive index, low birefringence, and high gas permeability due to the following effects; (1) restriction of the rotation of polymer backbone, (2) conformational regulation of the backbone and side chains, (3) hindrance of intermolecular packing, and (4) increase in aromaticity due to the introduction of an aromatic substituent to the side chains.

Functional resin materials, particularly functional resin materials for gas separation, are designed by controlling the sorption and diffusion of gas by adjusting primarily the average and distribution of free volume that is an interstice in polymer chain and the motion of polymer chain. The present inventors have selected cardo monomers containing a bulky group as a constitutional element to enlarge the free volume and control the motion of polymer chain, conducted studies on development of such monomers and their conversion to polymers, confirmed that bifunctional monomers prepared by adding phenol, aniline, xylidine, and the like to a base compound containing a skeleton of fluorene serve the purpose, and developed cardo polymers from these monomers.

Moreover, as a result of studies aimed at improving the performance of cardo polymers, the present inventors have found that modifying cardo polymers by replacing hydrogen atoms in the side-chain benzyl or allyl position partly or wholly with functional groups which are considered to have an affinity for the physical or chemical properties of the gas to be separated, for example, halogen atoms and functional groups and derivatives thereof which can replace the halogen atoms, can further improve the performance in permeability and selectivity of gas separation membranes while fully utilizing properties such as solvent solubility attributable to a bulky structure characteristic of cardo polyimides, ease of wet forming of membranes, thermal stability attributable to a rigid structure, and chemical stability attributable to a skeleton mainly composed of condensed aromatic rings, have found further that the permeability and selectivity can be controlled easily thereby providing gas separation membranes with desired separation performance, and have completed this invention.

Further, the present inventors have found that polymers containing halogenated regions in the side-chain benzyl position or in the internal allyl position generally exhibit excellent gas separation performance in permeability and selectivity and completed this invention.

Still further, the present inventors have found that the aforementioned cardo polymers can be used as a variety of functional polymers by changing the kind of substituents at the side chain and completed this invention.

DISCLOSURE OF THE INVENTION

Accordingly, this invention relates to resin materials for gas separation base comprising polymers of a cardo structure whose hydrogen atoms in the side-chain benzyl and/or ally position are halogenated at a rate of modification of 0.1% or more.

The polymers here are preferably polyimides and, furthermore, they preferably contain a cardo polyimide structure represented by the following general formula (1)

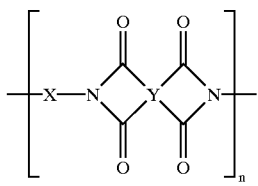

(1)

wherein X is a divalent residue of an organic group and at least partly a divalent residue of an organic group represented by the following structural formula (A)

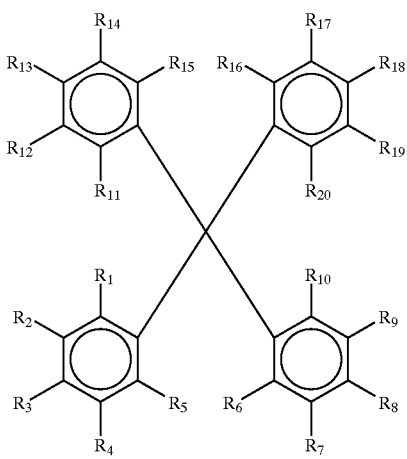

(A)

and Y is a tetravalent residue of an organic group; in the structural formula (A), at least one of $R_1$ to $R_{20}$ is a halogen-modified substituent represented by

—$CZR_{21}R_{22}$ (wherein Z is a halogen atom and $R_{21}$ and $R_{22}$ will be defined later) and the remainder of $R_1$ to $R_{20}$ and $R_{21}$ and $R_{22}$ in the halogen-modified substituent are hydrogen, halogen, linear or branched or cyclic unsubstituted or substituted alkyl, alkenyl, alkynyl, or aryl, the aforementioned alkyl, alkenyl, alkynyl and aryl groups may contain one kind or two kinds or more of hetero atoms selected from nitrogen, oxygen, sulfur, phosphorus, and halogens and may be identical with or different from on another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure.

The structural formula (A) in the aforementioned general formula (1) is preferably a divalent residue of an organic group containing a fluorene skeleton represented by the following structural formula (B)

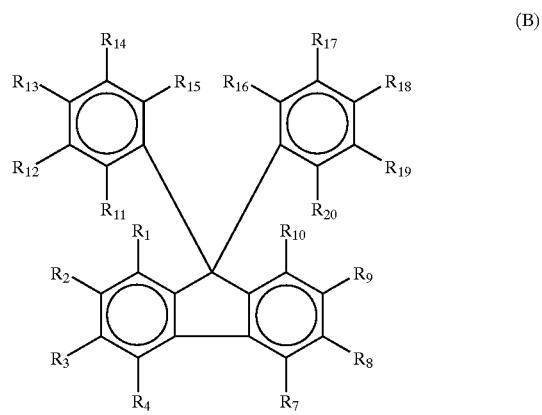

(B)

wherein $R_1$ to $R_4$ and $R_7$ to $R_{20}$ are as defined in the structural formula (A); more preferably, at least one substituent selected from $R_{11}$ to $R_{20}$ is modified by halogen in the structural formula (B).

In the aforementioned halogen-modified cardo polymers, the rate of modification by halogen of hydrogen atoms in the side-chain benzyl and/or ally position is preferably 20% or more from the standpoint of manifestation of good gas separation performance.

This invention also relates to resin materials for gas separation base comprising polyimides of a cardo structure represented by the following general formula (1)

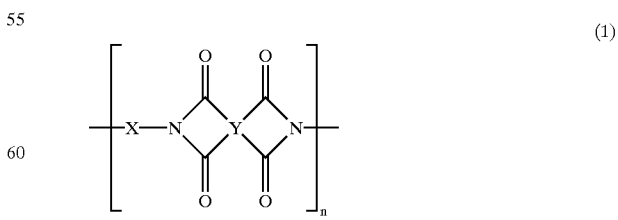

(1)

wherein X is a divalent residue of an organic group and at least partly a divalent residue of an organic group represented by the following structural formula (A)

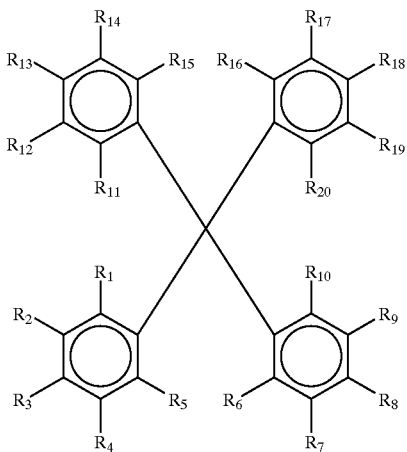

and Y is a tetravalent residue of an organic group; in the structural formula (A), at least one of $R_1$ to $R_{20}$ is a functional group-modified substituent represented by —$CFuR_{21}R_{22}$, —$CFu_2R_{21}$ and/or —$CFu_3$ (wherein Fu is a functional group or a derivative thereof which can replace a halogen atom in the benzyl and/or ally position), the remainder of $R_1$ to $R_{20}$ and $R_{21}$ and $R_{22}$ are hydrogen, halogen, linear or branched or cyclic unsubstituted or substituted alkyl, alkenyl, alkynyl, or aryl, the aforementioned alkyl, alkenyl, alkynyl and aryl groups may contain one kind or two kinds or more of hetero atoms selected from nitrogen, oxygen, sulfur, phosphorus, and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure.

The structural formula (A) in the aforementioned general formula (1) is preferably a divalent residue of an organic group containing a fluorene skeleton represented by the following structural formula (B)

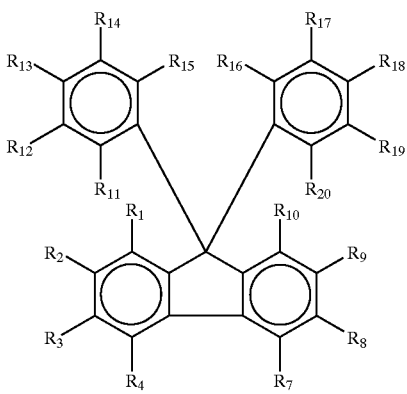

wherein $R_1$ to $R_4$ and $R_7$ to $R_{20}$ are as defined in the strucutral formula (A); more preferably, at least one substituent selected from $R_{11}$ to $R_{20}$ is modified by a functional group in the structural formula (B).

Moreover, this invention relates to resin materials for gas separation base comprising polymers whose hydrogen atoms in the side-chain benzyl and/or ally position are halogenated at a rate of modification of 34% or more and, preferably, to resin materials for gas separation base wherein said polymers are polyimides.

Thus, this invention relates to cardo polymers whose hydrogen atoms in the side-chain benzyl and/or allyl position are halogenated at a rate of modification of 0.1% or more, preferably to cardo polymers wherein said polymers are polyimides, and more preferably to polymers with a cardo polyimide structure represented by the following general formula (1)

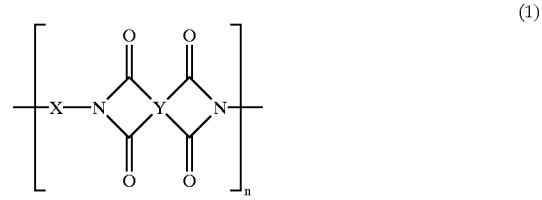

wherein X is a divalent residue of an organic group and at least partly a divalent residue of an organic group represented by the following structural formula (A)

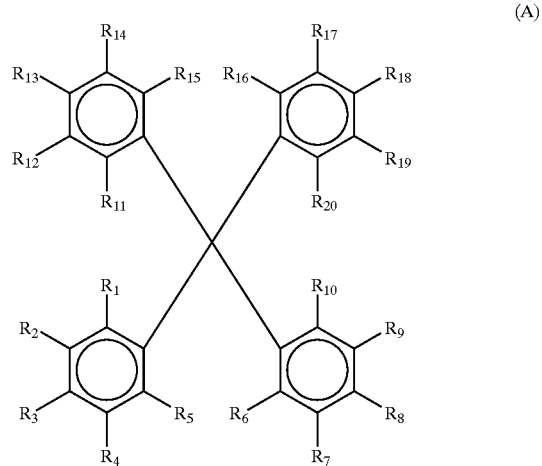

and Y is a tetravelent residue of an organic group; in the structural formula (A), at least one of $R_1$ to $R_{20}$ is a halogen-modified substituent represented by

—$CZR_{21}R_{22}$ (wherein Z is a halogen atom and $R_{21}$ and $R_{22}$ will be defined later), the remainder of $R_1$ to $R_{20}$ and $R_{21}$ and $R_{22}$ in the halogen-modified substituent are hydrogen, halogen, linear or branched or cyclic unsubstituted or substituted alkyl, alkenyl, alkynyl, or aryl, the afornentioned alkyl, alkenyl, alkynyl and aryl groups may contain one kind or two kinds or more of hetero atoms selected from nitrogen, oxygen, sulfur, phosphorus and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure.

In polymers containing this cardo polyimide structure, it is preferable that the structural formula (A) in the aforementioned general formula (1) is a divalent residue of an organic group having a fluorene skeleton represented by the following structural formula (B)

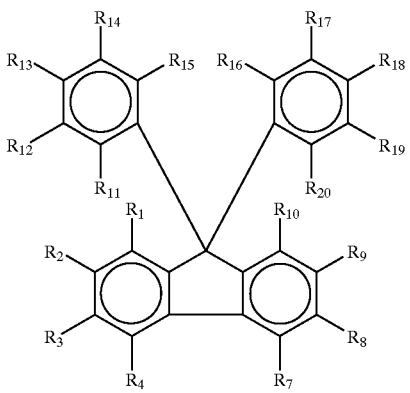

(B)

(wherein $R_1$ to $R_4$ and $R_7$ to $R_{20}$ are as defined earlier), at least one substituent selected from $R_{11}$ to $R_{20}$ is a halogen-modified substituent, and the rate of modification by halogen in the side-chain benzyl and/or allyl groups is 20% or more.

Moreover, this invention relates to polymers containing cardo polymers possessing substituents at least one of which is a functional group-modified substituent represented by

—$CFuR_{21}R_{22}$, —$CFu_2R_{21}$ and/or —$CFu_3$ (wherein Fu is a functional group or a derivative thereof which can replace a halogen atom in the benzyl and/or ally position, $R_{21}$ and $R_{22}$ are hydrogen, halogen, linear or branched or cyclic unsubstituted or substituted alkyl, alkenyl, alkynyl, or aryl, and the aforementioned alkyl, alkenyl, alkynyl or aryl group may contain one kind or two kinds or more of hetero atoms selected from nitrogen, oxygen, sulfur, phosphorus, and halogens, may be identical with or different from each other, and may join together or to other carbon atoms directly or through another atom to form a saturated or unsaturated bond in a cyclic structure); still more, this invention preferably relates to cardo polyimides possessing said functional group-modified substituents and further relates to resin materials for gas separation base containing said polymers and to gas separation membranes comprising said polymers and, more preferably, this invention relates to polymers containing a cardo polyimide structure represented by the following general formula (1)

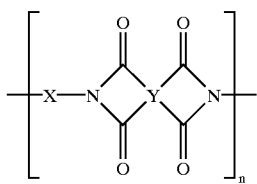

(1)

wherein X is a divalent residue of an organic group and at least partly a divalent residue of an organic group represented by the following structural formula (A)

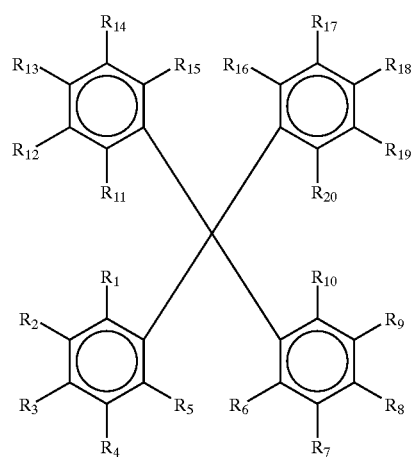

(A)

and Y is a tetravalent residue of an organic group; in the structural formula (A), at least one of $R_1$ to $R_{20}$ is a functional group-modified substituent represented by

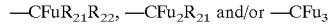

—$CFuR_{21}R_{22}$, —$CFu_2R_{21}$ and/or —$CFu_3$ (wherein Fu is a functional group or a derivative thereof which can replace a halogen atom in the benzyl and/or ally position), the remainder of $R_1$ to $R_{20}$ and $R_{21}$ and $R_{22}$ are hydrogen, halogen, linear or branched or cyclic unsubstituted or substituted alkyl, alkenyl, alkynyl, or aryl, the aforementioned alkyl, alkenyl, alkynyl and aryl groups may contain one kind or two kinds or more of hetero atoms selected from nitrogen, oxygen, sulfur, phosphorus, and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure.

In the polymers containing this cardo polyimide structure, it is preferable that the structural formula (A) in the aforementioned general formula (1) is a divalent residue of an organic group possessing a fluorene skeleton represented by the following structural formula (B)

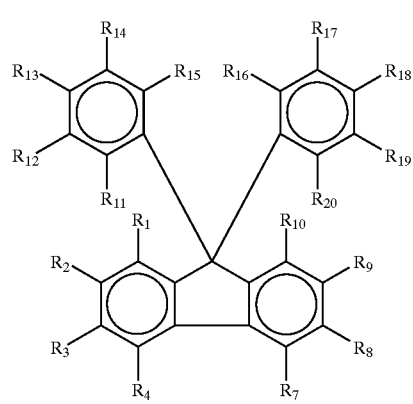

(B)

(wherein $R_1$ to $R_4$ and $R_7$ to $R_{20}$ are as defined earlier) and at least one substituent selected from $R_{11}$ to $R_{20}$ is modified by a functional group.

Furthermore, this invention relates to a process for producing polymers containing a halogen-modified cardo polyimide structure from polymers containing a cardo polyimide structure represented by the following general formual (1)

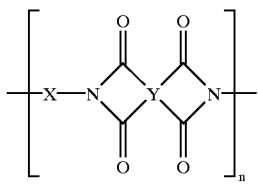
(1)

wherein X is a divalent residue of an organic group and at least partly a divalent residue of an organic group represented by the following structural formula (A)

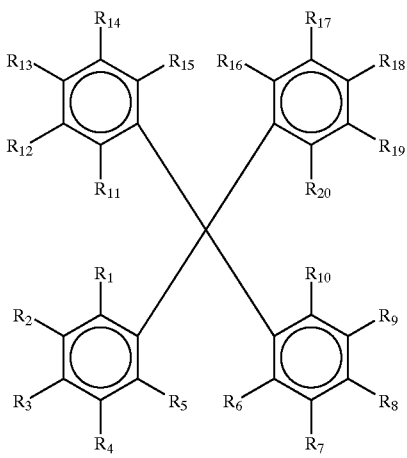
(A)

and Y is a tetravalent residue of an organic group; in the structural formula (A), at least one of $R_1$ to $R_{20}$ is a pre-modification substituent represented by $$-CHR_{21}R_{22}$$

(wherein $R_{21}$ and $R_{22}$ are as defined later), the remainder of $R_1$ to $R_{20}$ and $R_{21}$ and $R_{22}$ are hydrogen, halogen, linear or branched or cyclic unsubstituted or substituted alkyl, alkenyl, alkynyl, or aryl, the aforementioned alkyl, alkenyl, alkynyl and aryl groups may contain one kind or two kinds or more of hetero atoms selected from nitrogen, oxygen, sulfur, phosphorus, and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure; said process comprises treating said polymers containing a cardo-type polyimide structure with a halogenating agent in mole equivalent corresponding to 0.01–3 times that of the hydrogen atoms in the benzyl and/or allyl position in said pre-modification substituent and effecting the reaction at a rate of modification by halogen of 0.1% or more to give polymers containing halogen-modified substituents represented by $$-CZR_{21}R_{22}$$

(wherein Z is a halogen atom and $R_{21}$ and $R_{22}$ are as defined earlier).

In the process for producing these polymers, it is preferable that the structural formula (A) in the aforementioned general formula (1) possesses a fluorene skeleton represented by the following structural formula (B)

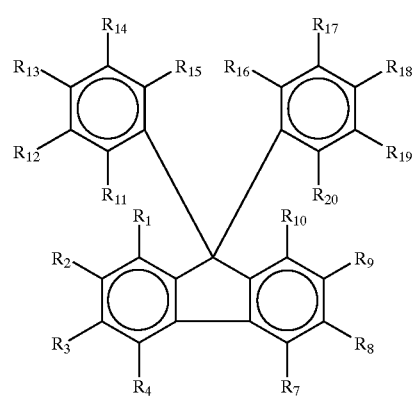
(B)

(wherein $R_1$ to $R_4$ and $R_7$ to $R_{20}$ are as defined earlier), at least one substituent selected from $R_{11}$ to $R_{20}$ is a halogen-modified substituent, and the rate of modification by halogen of the hydrogen atoms in the side-chain benzyl and/or ally position is 20% or more.

Furthermore, this invention relates to a process for producing polymers containing a functional group-modified cardo polyimide structure from polymers containing a cardo polyimide structure represented by the following general formual (1)

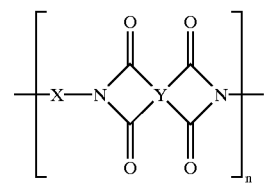
(1)

wherein X is a divalent residue of an organic group and at least partly a divalent residue of an organic group represented by the following structural formula (A)

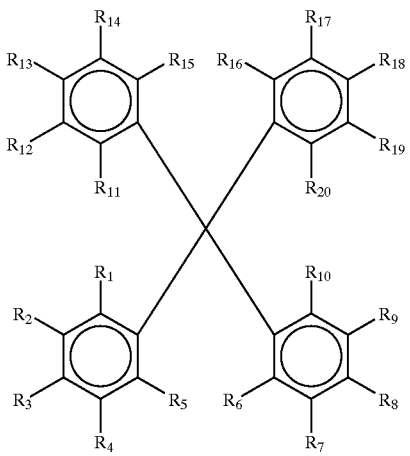

(A)

and Y is a tetravalent residue of an organic group; in the structural formula (A), at least one of $R_1$ to $R_{20}$ is a pre-modification substituent represented by

—$CHR_{21}R_{22}$ (wherein $R_{21}$ and $R_{22}$ are as defined later), the remainder of $R_1$ to $R_{20}$ and $R_{21}$ and $R_{22}$ in the pre-modification substituent are hydrogen, halogen, linear or branched or cyclic unsubstituted or substituted alkyl, alkenyl, alkynyl, or aryl, the aforementioned alkyl, alkenyl, alkynyl, and aryl groups may contain one kind or two kinds or more of hetero atoms selected from nitrogen, oxygen, sulfur, phosphorus, and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure; said process comprises treating said polymers containing a cardo polyimide structure with a halogenating agent in mole equivalent corresponding to 0.01–3 times that of the hydrogen atoms in the benzyl and/or allyl position in the aforementioned pre-modification substituent, effecting the reaction at a rate of modification by halogen of 0.1% or more to give polymers containing halogen-modified substituents represented by

—$CZR_{21}R_{22}$ (wherein Z is a halogen atom and $R_{21}$ and $R_{22}$ are as defined earlier), and then treating the polymers thus obtained with a nucleophilic reagent containing a functional group which can replace the halogen atom in the halogen-modified substituent thereby converting at least partially the aforementioned halogen-modified substituents to functional group-modified substituents represented by

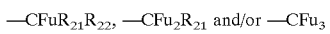
—$CFuR_{21}R_{22}$, —$CFu_2R_{21}$ and/or —$CFu_3$ (wherein Fu is a functional group or a derivative thereof which can replace a halogen atom in the benzyl and/or allyl position).

In this invention, the side-chain benzyl position is used in the same way as in general organic systhesis; the side-chain benzyl position refers to the position where the carbon atom of the side-chain alkyl group is directly bonded to the aromatic carbon and hydrogen in the benzyl position designates the hydrogen directly bonded to the carbon in the benzyl position. Likewise, as used in general organic synthesis, the allyl position refers to the position where carbon atoms forming an allylic carbon-carbon double bond are present and hydrogen in the allyl position designates the hydrogen directly bonded to the carbon in the allyl position.

The side-chain benzyl and/or allyl position as used in this invention may be present at any site in a polymer molecule and either one or both of the benzyl and allyl positions may be present not only in the side chains but also in the polymer backbone. Moreover, the allyl position is not necessarily in the side chain of an aromatic ring. The side-chain benzyl and/or allyl position as used in this invention may be present, for example, in X or Y in the general formula (1) or in any one of $R_1$ to $R_{22}$ in the structural formulas (A) and (B); also, they may be present in other parts of the polymers containing the foregoing. Furthermore, nothing would prevent the side-chain benzyl and/or allyl position as used in this invention from existing in plural number or existing together in a given polymer chain. For example, an allyl group may be present at the end of the benzyl group of $R_1$ to $R_{20}$ in the structural formulas (A) and (B) and, still more, a benzyl and/or allyl group may be present at the end of this allyl group.

In the halogenation of this invention to be effected in the side-chain benzyl and/or allyl position, it is not necessary to halogenate uniformly in all the benzyl and/or allyl positions in the repeating unit and it is allowable to effect halogenation only in some of the repeating units. In the cases where a plural number of hydrogen atoms are present on benzyl and/or allyl carbon, it does not make difference whether the halogenation occurs at either one of the benzyl and allyl carbons or the halogenation occurs partially or wholly.

Halogen-modified polymers as used in this invention include those obtained by halogenating polymers and those obtained by polymerizing monomers containing halogen in the side-chain benzyl and/or ally position and raw material monomers or polymers may contain halogen from the start.

The rate of modification by halogen in this invention refers to the rate of the number of halogen atoms directly bonded to "the total carbon atoms in the benzyl and/or allyl position in the polymer" to the number of hydrogen and halogen atoms bonded in the same manner and is represented by the following equation:

Rate of modification by halogen (%)=[(number of halogen atoms directly bonded to all the carbon atoms in the benzyl and/or allyl position in the polymer)/(number of hydrogen and halogen atoms directly bonded to all the carbon atoms in the benzyl and/or allyl position in the polymer)]×100

The number of those atoms required for the calculation can be determined easily by elemental analysis or $^1$H-NMR analysis. Where the structure is complicated, $^{13}$C-NMR analysis readily allows the quantitative determination of the carbon atoms in the benzyl and allyl positions.

In this invention, cardo polymers generically refer to those polymers in which a cyclic group is directly linked to the polymer backbone. The cyclic portion may contain a saturated or unsaturated bond involving carbon and other atoms such as nitrogen, oxygen, sulfur, and phosphorus; moreover, the cyclic portion may be polycyclic, linked to other carbon chains, or corsslinked.

Any polymers containing at least partly the aforementioned cardo polymers are acceptable as polymers containing the cardo polymer structure of this invention and they may be copolymers with other monomers, graft polymers, or crosslinked polymers. Resin materials of this invention refer to materials containing the aforementioned polymers and include a combination thereof with other materials or a blend or composite thereof with other materials.

Gas separation base of this invention may be in any shape as long as it is suited for the purpose of gas separation; the base may come in such a shape as membrane, hollow fiber, granule, sheet and bulk or it may be fibers woven into cloth, filled randomly, or molded into pleats. Moreover, the base in question may be joined to, bonded by adhesive to, or blended with other materials or may be filled in containers of some sort.

Polyimides of this invention are represented by the aforementioned structural formula (1) and, in the cases where they are simply referred to as polyimides, X may be a divalent residue of any organic group. Tetracarboxylic acid dianhydrides, the raw material for Y, include pyromellitic dianhydride, 3,3',4,4'-benzophenonetetracarboxylic acid dianhydride, bis(3,4-dicarboxy-phenyl)sulfone dianhydride, 2,2-bis(3,4-dicarboxyphenyl)-1,1,1,3,3,3-hexafluoropropane dianhydride, 3,3',4,4'-biphenyltetracarboxylic acid dianhydride, 3,3',4,4'-tetracarboxydiphenylether dianhydride, and 2,2-bis(3,4-dicarboxyphenyl)propane dianhydride, and a mixture of these dianhydrides and they may contain benzyl and/or allyl groups.

Polymers of this invention or polymers to be used for their preparation are synthesized by a general synthetic procedure for polymers. Polymers of any kind are acceptable if they can be used for functional materials, particularly for gas separation base, but they need to contain halogen atoms in the side-chain benzyl and/or allyl position or hydrogen atoms replaceable with halogen atoms in the benzyl and/or allyl position at least in a part of their structure. For example, polymers with the following basic skeleton or their mixtures, copolymers, and crosslinked polymers can be used on condition that they meet the aforementioned requirement.

(1) Polymers in which the Carbon-carbon Bond Forms the Backbone Chain

Polyolefins (polyethylene, polypropylene, poly-1-butene, etc.), polystyrene, polyacetylenes, polyphenylenes, and polysaccharides such as cellulose.

(2) Polymers Containing Oxygen in the Backbone Chain

Polyethers (—O—), polyacetals (—O—R—O—R'—), polyesters (—COO—), polycarbonates (—O—CO—O—), etc.

(3) Polymers Containing Nitrogen in the Backbone Chain

Polyamines (in particular, polyamines in which H of —NH— is replaced by an alkyl group or the like), polyamides (—NH—CO—), polyurethanes (—OCONH—R—NHCOO—R'—), polyureas (—NHCONH—R—NHCONH—R'—), polyimides, polyimidazoles, polyoxazoles, polypyrroles, polyanilines, etc.

(4) Polymers Containing Sulfur in the Backbone Chain

Polysulfides (—C—S—C—), polysulfones (—C—$SO_2$—C—), etc.

(5) Polymers Containing Phosphorus in the Backbone Chain

Polyphoshpines (—PR—), polyphosphine oxides [—PR(=O)—], polyphosphinates [—OPR(=O)—], polyphosphonates [—OPR(=O)—O—], etc.

(6) Polymers Containing Metal in the Backbone Chain

Polysiloxanes (—SiRR'O—), polysilanes (—SiRR'—), etc.

Polymers of this invention, if they contain halogen atoms in the side-chain benzyl and/or allyl position or hydrogen atoms replaceable by halogen in the side-chain benzyl and/or allyl position, can have a skeleton selected from, for example, polyesters, polycarbonates, polyethers and polyimides described in Japan Kokai Tokkyo Koho Hei 10-99, 666 (1998).

In this invention, halogen-modified polymers can be prepared by polymerizing monomers containing halogen atoms in the side-chain benzyl and/or allyl position (while protecting the benzyl and/or allyl position and other positions as needed) or halogenating polymers containing hydrogen atoms replaceable by halogen in the side-chain benzyl and/or allyl position by treating with a position-selective halogenating agent under radical reaction conditions according to a normal organic synthetic procedure. Halogenating agents which are capable of effecting halogenation in the side-chain benzyl position or in the allyl position of aromatic compounds are useful and they include N-bromosuccinimide (NBS), N-chlorosuccinimide (NCS), N-iodosuccinimide (NIS), sulfuryl bromide ($SO_2Br_2$), sulfuryl chloride ($SO_2Cl_2$), t-butyl hypohalite, bromine, and 1,3-dibromo-5,5-dimethyl-hydantoin (DBMH). The halogenation in the aforementioned reaction proceeds selectively in the side-chain benzyl and/or allyl position preferably under the radical reaction condition and this condition can be attained by high temperature, irradiation by UV, use of a nonpolar solvent, and addition of a radical generator.

The halogenation of this invention in the side-chain benzyl position is preferably bromination because of the ease of controlling the reaction and the rate of modification by bromine, and NBS is suited as a brominating agent for this reaction, in particular, for the bromination in the allyl position.

The method for preparing the aforementioned halogen-modified polymers is applicable to the case where the polymers are polyimides or cardo polymers.

Cardo polymers in this invention include polymers of a vinyl monomer such as an alkyl-substituted derivative of methylidenephthalide, polycarbonates resulting from the reaction of a bisphenol such as an alkyl-substituted derivative of 9,9-bis(4'-hydroxyphenyl)anthrone-10 with phosgene, and polyamides resulting from the reaction of an alkyl-substituted derivative of 3,3-bis(4'-carboxyphenyl) phthalide with a diamine.

In this invention, halogen-modified cardo polyimides are synthesized in the following manner.

The raw material cardo polyimides for the synthesis of halogen-modified cardo polyimides are obtained by the reaction of a diamine which generates the X component in the general formula (1) with a tetracarboxylic acid dianhydride which generates the Y component in the general formula (1). It is necessary in this reaction that hydrogen atoms are present in the side-chain benzyl and/or allyl position in at least one of X or Y.

Any diamine having a cardo skeleton is useful as a diamine generating the X component in the general formula (1); for example, 9,9-bis(4'-aminophenyl)-phthalimidine and 1,1-bis(4'-aminophenyl)cyclohexane, a mixture of the two, and a mixture of the two and other diamines.

A diamine generating the X component in the general formula (1) is preferably an aromatic cardo monomer represented by the structural formula (A); for example, 9,9-bis (4'-aminophenyl)fluorene, 9,9-bis(4'-aminophenyl)-anthrone-10, a mixture of the two, and a mixture of the two and other diamines.

A diamine generating the X component in the general formula (1) is more preferably a diamine having a xylidine skeleton which is a compound represented by the structural formula (A) wherein $R_{13}$ and $R_{18}$ are amino groups, $R_{11}$, $R_{12}$, $R_{14}$ through $R_{17}$, $R_{19}$, and $R_{20}$ are hydrogen atoms, functional groups such as alkyl groups represented by —$C_nH_{2n+1}$ (n is an integer, preferably 1–4), alkoxyl groups represented by —$OC_nH_{2n+1}$ (n is an integer, preferably 1–4), carboxyl groups, carboxymethyl groups, and nitro groups, and halogen atoms, either used singly or together with other diamines.

Concrete examples of diamines with a xylidine skeleton are derivatives of fluorene such as 9,9-bis(3',5'-dimethyl-4'-aminophenyl)fluorene, 9,9-bis(2',3'-dimethyl-4'-aminophenyl)fluorene, 9,9-bis(3',6'-dimethyl-4'-aminophenyl)fluorene, 9,9-bis(2',6'-dimethyl-4'-aminophenyl)fluorene, 9,9-bis(3',5'-dimethyl-2',6'-difluoro-4'-aminophenyl)fluorene, 1,2,3,4,5,6,7,8-octafluoro-9,9-bis(3',5'-dimethyl-2',6'-difluoro-4'-aminophenyl)fluorene, 9,9-bis(3',5'-dimethyl-4'-aminophenyl)fluorene-4-carboxylic acid, methyl 9,9-bis(3',5'-dimethyl-4'-aminophenyl)fluorene-4-carboxylate, 4-bromo-9,9-bis(3',5'-dimethyl-4'-aminophenyl)fluorene, 4-nitro-9,9-bis(3',5'-dimethyl-4'-aminophenyl)fluorene, methyl 9,9-bis(3',5'-dimethyl-4'-aminophenyl)fluorene-4-sulfonate, and 4,5-dimethyl-9,9-bis(3',5'-dimethyl-4'-aminophenyl)fluorene and a mixture thereof.

Other diamines include those containing aromatic residues such as 9,9-bis(4'-aminophenyl)fluorene, 9,9-bis(2'-aminophenyl)fluorene, 9,9-bis(3',5'-diethyl-4'-aminophenyl)fluorene, 9,9-bis(3'-methyl-4'-aminophenyl)fluorene, 9,9-bis(3'-methyl-5'-ethyl-4'-aminophenyl)fluorene, 9,9-bis(3',5'-di-n-butyl-4'-aminophenyl)fluorene, 9,9-bis(3',5'-di-s-butyl-4'-aminophenyl)fluorene, 9,9-bis(3'-bromo-4'-aminophenyl)fluorene, 4-chloro-9,9-bis(3',5'-diethyl-4'-aminophenyl)fluorene, 4-nitro-9,9-bis(3',5'-diethyl-4'-aminophenyl)fluorene, 9,9-bis-(2',5'-diethyl-4'-aminophenyl)fluorene, 9,9-bis[3',5'-di-(3"-butene)-4'-aminophenyl]fluorene, 9,9-bis(4'-aminophenyl)fluorene-4-carboxylic acid, methyl 9,9-bis(4'-aminophenyl)fluorene-4-carboxylate, methyl 9,9-bis(4'-aminophenyl)fluorene-4-sulfonate, 2,7-diaminofluorene, naphthalenediamine, 2,8-diaminobenxofuran, 4,4'-diaminobiphenyl, and 4,4'-diaminodiphenyl ether and those containing aliphatic residues such as hexamethylenediamine and isopropyldiamine.

In the use of other diamines, there is no specific restriction imposed on the proportion of other diamines to the diamines having a xylidine skeleton, but it is desirable for the proportion to be 90 mol % or less.

Tetracarboxylic acid dianhydrides generating the Y component in the general formula (1) include pyromellitic dianhydride, 3,3',4,4'-benzophenonetetracarboxylic acid dianhydride, bis(3,4-dicarboxyphenyl)sulfone dianhydride, 2,2-bis(3',4'-dicarboxyphenyl)-1,1,1,3,3,3-hexafluoropropane dianhydride, 3,3',4,4'-biphenyltetracarboxylic acid dianhydride, 3,3',4,4'-tetracarboxydiphenylether dianhydride and a mixture thereof.

The cardo polyimides obtained in this manner are modified by treating with a halogenating agent to replace the hydrogen atoms in the side-chain benzyl and/or allyl position with halogen atoms.

The halogenation reaction of the cardo polyimides in the side-chain benzyl position is explained with reference to the aforementioned bromination with the use of NBS. The reaction is generally applicable to the halogenation in the side-chain benzyl and/or allyl position of polymers.

The bromination reaction in question is a radical reaction that is accelerated in a halogen-containing solvent by heating and/or ultraviolet irradiation preferably in the presence of 0.1~1% of a radical initiator and molecular bromine being generated from NBS in low concentration participates in the reaction. A preferable halogen-containing solvent is carbon tetrachloride, chloroform, methylene chloride, or 1,2-dichloroethane. The reaction is accelerated by heat, light, or a radical initiator such as benzoyl peroxide and azobisisobutyronitrile (AIBN).

The bromine-modified cardo polyimides obtained in this reaction are isolated and purified by adding the reaction mixture to a solvent such as methanol to separate polyimides, pulverizing the polyimides suitably, washing with a solvent such as methanol, and drying under reduced pressure at a temperature in the range from room temperature to 60° C. The halogenation takes place easily in the side-chain benzyl and/or allyl position.

The rate of modification by bromine of the bromine-modified cardo polyimides as defined earlier can be calculated readily on the basis of elemental analysis or $^1$H-NMR and $^{13}$C-NMR analysis.

The following example illustrates the bromination in the side-chain benzyl position. In the case of the modification by bromine of cardo polyimides [PI-BPBA-BAFL(4Me)] prepared by polymerizing the monomer represented by the structural formula (B) in which $R_{13}$ and $R_{18}$ are amino groups, $R_{12}$, $R_{14}$, $R_{17}$, and $R_{19}$ are methyl groups, and the rest of R's are hydrogen and 3,3',4,4'-biphenyltetracarboxylic acid dianhydride, the rate of modification by bromine can be calculated from the ratio of the integrated values of methylene protons in the benzyl position resulting from monobromination [δ: in the vicinity of 4.0–4.8 ppm (—$CH_2$—Br), br-m, 2H], methylidyne proton in the benzyl position resulting from dibromination [δ: in the vicinity of 6.5 ppm (—CH—$Br_2$), br-s, 1H], and methyl protons in the tolyl group in the absence of bromination [δ: in the vicinity of 1.8–2.4 ppm (—$CH_3$), br-m, 3H] determined by $^1$H-NMR analysis (300 MHz, $CDCl_3$, room temperature). For example, in case the integrated values of the peaks of methylene protons in the benzyl position, methylidyne proton in the benzyl position, and methyl protons in the tolyl group are respectively 10.0, 1.0, and 6.0, the rate of modification by bromine is calculated as follows:

Rate of modification by bromine (%)=[10.0/(2×1)+1.0/(1×2)]/[10.0/(2×3)+1.0/(1×3)+6.0/(3×3)]×100=29

This means that, of the twelve hydrogen atoms in the four methyl groups, namely, $R_{12}$, $R_{14}$, $R_{17}$, and $R_{19}$ in the structural formula (B), 3.5 (12×0.29) hydrogen atoms on the average per repeating unit of the polymer are replaced by bromine atoms.

Likewise, in the case of the bromination in the allyl position, the rate of modification by bromine can be calculated from the ratio of the integrated values of methylene protons in the allyl position resulting from monobromination [δ: in the vicinity of 3.7–4.3 ppm (—C=C—$CH_2$—Br), br-m, 2H], methylidyne proton in the allyl position resulting from dibromination [δ: in the vicinity of 6.5 ppm ([—C=C—$CHBr_2$), br-m,1H], and methyl protons in the allyl position in the absence of bromination [δ: in the vicinity of 1.5–2.4 ppm (—C=C=$CH_3$), br-m, 3H] determined by 1H-NMR analysis (300 MHz, $CDCl_3$, room temperature).

The rate of modification by halogen can be controlled at the desired value by controlling the amount of a halogenating agent to be used for the halogenation reaction and this makes it possible to prepare cardo polyimides at a desired rate of modification by halogen.

In this invention, halogen-modified cardo polyimides exhibiting a rate of modification by halogen of 0.1% or more, preferably 20% or more, more preferably 34% or more, are prepared from cardo polyimides of the aforementioned general formula (1) by treating with a halogenating agent in mole equivalent normally 0.01–3 times, preferably 0.5–3 times, that of total hydrogen atoms in the side-chain benzyl and allyl positions of $R_1$ to $R_{20}$ in the structural formula (A). A rate of modification by halogen of less than 0.1% undesirably produces a small halogenating effect. A rate of modification by halogen of 20% or more is desirable and this can be obtained under normal reaction conditions with a pronounced effect of modification by halogen. Supposing methyl groups in the benzyl position are halogenated, a rate of modification by halogen of 34% means the condition where one halogen atom or more on the average has entered each methyl group in the benzyl position and this condition is particularly desirable. There is no specific upper limit for the rate of modification by halogen, but it is preferably 90% or less from a consideration of the gas permeability. In the case of $CO_2$ separation, the gas permeability [$P(CO_2)$] is excellent at a low rate of modification by halogen while the gas selectivity [$\alpha$] improves at a high rate of modification by halogen. It is possible to prepare gas separation membranes with a good balance of gas permeability [$P(CO_2)$] and gas selectivity [$\alpha$] from halogen-modified cardo polyimides by controlling the rate of modification by halogen. What is discussed above also holds for polymers in general.

Functional group-modified cardo polymers can be prepared readily by treating the aforementioned halogen-modified cardo polymers with a nucleophilic reagent possessing a functional group Fu which can replace a halogen atom in the benzyl and/or allyl position. Functional groups Fu of this kind are linear, branched, or cyclic unsubstituted or substituted alkyl groups, alkenyl groups, alkynyl groups, aryl groups, and heterocyclic groups and they may contain atoms other than carbon such as nitrogen, oxygen, sulfur, and phosphorus in the molecule. Moreover, they may contain polar functional groups capable of changing the existing state of electrons, functional groups with a multiple bond capable of inducing a $\pi$ electron-$\pi$ electron interaction, or organometallic functional groups carrying metals with an empty orbit.

Concrete examples of functional groups Fu containing atoms other than carbon are —OH, —$OR_{23}$, —$OCOR_{23}$, —$OCSR_{23}$, —$NO_2$, —NCO, —NCS, —CN, —CH($COR_{23}$)($COR_{24}$), halogen, —$SR_{24}$, —$SR_{24}R_{25}$, —$SR_{24}R_{25}R_{26}$, —$SOR_{24}$, —$SOR_{24}R_{25}$, —$SOR_{24}R_{25}R_{26}$, —$SO_2R_{24}$, —$SO_2R_{24}R_{25}$, —$SO_2R_{24}R_{25}R_{26}$, —$SO_3R_{24}$, —$SO_3R_{24}R_{25}$, —$SO_3R_{24}R_{25}R_{26}$, —$PR_{24}$, —$PR_{24}R_{25}$, —$PR_{24}R_{25}R_{26}$, —$POR_{24}$, —$POR_{24}R_{25}$, —$POR_{24}R_{25}R_{26}$, —$PO_2R_{24}$, —$PO_2R_{24}R_{25}$, —$PO_2R_{24}R_{25}R_{26}$, —$PO_3R_{24}$, —$PO_3R_{24}R_{25}$, —$PO_3R_{24}R_{25}R_{26}$, —$SiR_{24}R_{25}R_{26}$, —$SnR_{24}R_{25}R_{26}$, —$PdR_{24}R_{25}R_{26}$, and —$GeR_{24}R_{25}R_{26}$. In these examples, $R_{23}$ designates hydrogen, sulfur, phosphorus, linear, branched, or cyclic unsubstituted or substituted alkyl, alkenyl, alkynyl, aryl, and heterocyclic and may contain nitrogen, oxygen, or sulfur in the molecule. The groups $R_{24}$, $R_{25}$, and $R_{26}$ are hydrogen, oxygen, sulfur, phosphorus, linear, branched, or cyclic unsubstituted or substituted alkyl, alkenyl, alkynyl, aryl, alkoxy, or heterocyclic and they may contain nitrogen, oxygen, or sulfur in the molecule. It is possible to convert these substituents into functional groups containing protons of high acidity such as —COOH and —$SO_3H$.

Moreover, functional group-modified cardo polymers of this invention can serve as functional materials in a variety of end uses after incorporation of crown ethers, optically active structures containing asymmetric carbon, metal complexes, and materials which can interact with gases such as oxygen or of functional structures such as antibodies and biomaterials.

The nucleophilic substitution reaction with the use of a nucleophilic reagent described above is generally considered to proceed with the halogenated carbon in the benzyl and/or allyl position in halogen-modified cardo polymers undergoing $S_N1$ or $S_N2$ subsitution in the presence of a carbanion, an anion of oxygen, nitrogen, sulfur or phosphorus, or a nucleophilic reagent containing an atom with a lone pair of electrons. The halogenated carbon atom in the benzyl and/or allyl position in halogen-modified cardo polymers is readily attacked by a nucleophilic reagent under the alkaline conditions or in the presence of a phase-transfer catalyst such as tetrabutylammonium chloride, polyamine, and crown ether to allow replacement of the halogen atom by a functional group.

Another procedure for introducing a functional group Fu to halogen-modified cardo polymers is to prepare an RMgX-type organomagnesium compound, the so-called Grignard reagent, from the polymers and treat the Grignard reagent with any of reactants that are capable of undergoing Grignard reactions such as alcohols, water, aldehydes, ketones, esters, carbon dioxide, and amines.

As a concrete example, the introduction of an alkyl group can be effected in a reaction system in which the carbanion is lithiated by LDA (lithium diisopropylamide) and used in the substitution reaction or in a reaction system in which a two-layer reaction is carried out with the use of solid potassium hydroxide and a phase-transfer catalyst such as triethylammonium chloride.

The introduction of an amino group (—$NR_{13}R_{14}$) can be effected by directly treating halogen-modified cardo polymers with twice or more in mole equivalent of the corresponding primary or secondary amine in solution thereby replacing the halogen atoms with the amino groups. In case the amine used is primary, each of its two active hydrogen atoms participates in the substitution reaction with the possibility of forming a crosslinked structure; it is then advisable to dilute the polymers with a solvent and use a large excess of the amine.

A hydroxyl group (—OH) can be introduced by a solid-liquid or liquid-liquid two-phase reaction; for example, in a reaction system in which hydrolysis is carried out under the basic conditions or in the co-presence of a silver salt, in a reaction system in which the reaction is carried out in solution with the use of solid potassium hydroxide or the like and a phase-transfer catalyst such as triethylammonium chloride, or in a reaction system in which an aqueous solution of tetra-n-butylammonium hydroxide or the like is allowed to coexist in the theoretical amount. Moreover, the group —$OR_{23}$ can be introduced by treating the corresponding unsubstituted or substituted alcohol or phenol with sodium to form the sodium salt and treating the halogen-modified cardo polymers with the sodium salt in solution in the presence of a phase-transfer catalyst such as triethylammonium chloride.

A sulfur-containing functional group Fu such as sulfonyl (—$SO_2R_{23}$), sulfinyl (—$SOR_{23}$), mercapto (—$SR_{23}$), —$OCSR_{23}$, and —NCS can be introduced by converting the corresponding thiol, sulfonic acid, sulfinic acid, sulfenic acid, mercaptan, thiophenol, thiocarboxylic acid, azasulfonium salt, sulfilimine, and sulfoximine to the sodium or potassium salt and submitting the salt to the reaction in solution in the presence of a phase-transfer catalyst such as triethylammonium chloride. Furthermore, the group —$SO_3H$ can be introduced by oxidizing modified polymers carrying —SH or with the use of $Na_2SO_3$ and a phase-transfer catalyst.

The groups —$OCOR_{23}$, —$NO_2$, —NCO, and —CN can be introduced readily by converting the corresponding carboxylic acid and the like to the sodium or potassium salt and submitting the salt to the reaction in solution in the presence of a phase-transfer catalyst such as triethylammonium chloride.

Of the aforementioned functional groups Fu, —$NO_2$, —NCO, —NCS, and —CN are commercially available as quaternary ammonium salts containing the respective anion as counter ion and such quaternary ammonium salts are useful for the introduction of these groups. Moreover, —COOH can be derived from modified polymers containing —CN by hydrolysis with the use of sulfuric acid and the like.

A phosphorus-containing functional group Fu is introduced by using as reactant the sodium or potassium salt of a trivalent organophosphorus compound such as phosphine, phosphinous acid, phosphonous acid, and phosphorous acid and a pentavalent organophosphorus compound such as phosphorane, phosphine oxide, phosphinic acid, phosphonic acid, and phosphoric acid.

Halogens include fluorine, chlorine, bromine, and iodine and they can be introduced in a system involving potassium fluoride, potassium chloride, potassium bromide or potassium iodide and a phase-transfer catalyst.

As described above, a halogen atom can be introduced directly by treating cardo polymers with a suitable halogenating agent, but another approach is to introduce a suitable halogen atom, preferably bromine, to give intermediate halogen-modified cardo polymers first and to replace the halogen by another halogen in a reaction system in which the intermediate halogen-modified cardo polymers are treated with potassium fluoride, potassium chloride or potassium iodide in the presence of a phase-transfer catalyst.

In the aforementioned reaction system in which a phase-transfer catalyst is used, it is possible to effect the substitution reaction in question by supporting the phase-transfer catalyst on the resin and allowing the supported catalyst to coexist in the reaction system. This procedure helps to facilitate the treatment for purification after the reaction.

In the introduction of the aforementioned functional groups Fu, there is no specific restriction on the reactants to be used in the substitution reaction as long as they contain an appropriate functional group Fu in the molecule and they may be saturated, unsaturated, linear, branched or cyclic and they may additionally contain atoms other than carbon, for example, hydrogen, nitrogen, oxygen, sulfur, and halogen without ill effect. In case there are two or more functional groups Fu, either identical with or different from each other, in the reactant molecules, each functional group participates in the substitution reaction; as a result, there is the possibility of crosslinking taking place inside a single polymer chain or between different polymer chains in halogen-modified cardo polymers and the crosslinking can produce the effect of improving the strength of polymers and the performance of gas separation membranes.

Furthermore, the reaction of halogen-modified cardo polymers with a nucleophilic reagent to give functional group-modified cardo polymers is not restricted to the chemical reaction in bulk and it is possible to utilize this nucleophilic substitution reaction as a procedure for surface treatment after molding the halogen-modified cardo polymers into film or hollow fiber.

In case the halogen atoms in the benzyl position remain unreacted in the functional group-modified cardo polymers after the reaction of halogen-modified cardo polymers with a nucleophilic reagent, they can be removed by a known procedure for dehalogenation such as heating, if necessary. While the procedure is being applied, a carbon-carbon bond may possibly form inside a polymer chain or between different polymer chains to give a crosslinked structure which produces an extra effect of improving the strength of polymers and the performance of gas separation membranes.

A proper selection of functional groups to be introduced as functional group Fu in this invention makes it possible to produce resin materials containing polymers of this invention useful not only for gas separation but also for selective separation or selective transfer of liquids, a variety of solutes dissolved in liquids (dissolved solids, dissolved gases, ions, etc.), mixtures, and dispersions. That is, introduction of a functional group that exhibits a highly selective interaction with an object of separation or transfer yields a support capable of selectively separating or transfering said object.

Modified cardo polymers of this invention, that is, cardo polymers modified by halogen or functional group, exhibit excellent properties common to cardo polymers, particularly excellent solvent solubility and ease of wet molding, and are soluble in N-methyl-2-pyrrolidone (NMP), dimethylacetamide (DMAc), dimethyl sulfoxide (DMSO), dimethylformamide (DMF), p-chlorophenol, tetrahydrofuran (THF), and a variety of chlorinated solvents (chloroform; methylene chloride, 1,2-dichloroethane, etc.). Halogen-modified cardo polymers, particularly bromine-modified cardo polymers, improve their solvent solubility in response to the rate of modification by halogen and this permits a suitable selection of the kind and amount of solvent to be used in the preparation of membranes. Moreover, halogen-modified cardo polymers, particularly bromine-modified cardo polymers, are dissolved homogeneously in an organic solvent and treated with a nucleophilic reagent to replace the halogen with a functional group and this makes it possible to effect the desired modification by a functional group to suit the target gas to be separated.

In this invention, no restriction is imposed on the geometrical shape of gas separation membranes molded from modified cardo polymers represented by the aforementioned general formula (1) as long as the membranes are in any of the shapes generally used for gas separation. The structure on a micro scale is symmetric or asymmetric or a composite of a thin coating on the porous membrane. A known procedure is applicable to the production of membranes.

PREFERRED EMBODIMENTS OF THE INVENTION

Figure 1:
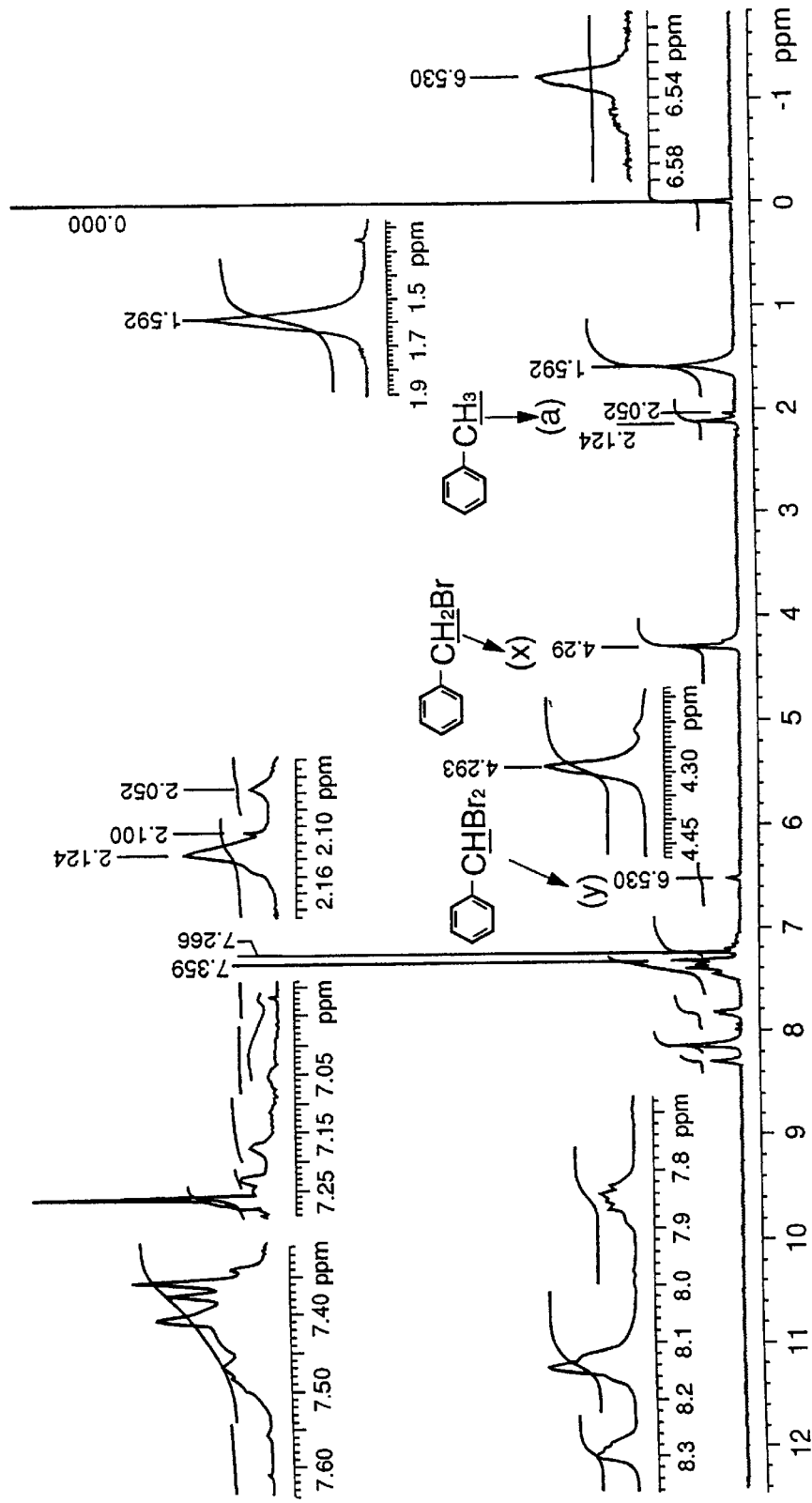
FIG. 1 is a graph showing the results of $^1$H-NMR analysis conducted on the bromine-modified cardo polyimides [PI-BPDA-BAFL(4Me)-Br(27.6%)] prepared in Example 1.

The preferred modes of the execution of this invention will be described concretely below with reference to Examples and Comparative Examples.

In the following Examples and Comparative Examples, the permeability coefficient of gas was determined on the feed gas which was a mixture of 10% carbon dioxide and 90% nitrogen at 35° C. (308 K) and at a pressure difference of 1 atmosphere ($1.0 \times 10^5$ Pa) by the time lag method with the aid of a reduced pressure type apparatus for measuring the rate of permeation of gas equipped with a gas chromatograph as a detector. The film for testing was mounted on the apparatus and dried for about 2 hours at 90° C. under high vacuum. Although the permeability coefficient of gas (P) is expressed in the unit of $m^3 \cdot m/(m^2 \cdot s \cdot Pa)$, it is also expressed simultaneously in the unit of barrer as follows.

$$1 \text{ barrer} = 1 \times 10^{-10} \text{ cm}^3 \text{ (STP) cm}/(\text{cm}^2 \cdot \text{s} \cdot \text{cm Hg})$$
$$= 7.5 \times 10^{-18} \text{ m}^3 \cdot \text{m}/(\text{m}^2 \cdot \text{s} \cdot \text{Pa}) \text{ (standard condition)}$$

The separation factor ($\alpha$) is expressed by the ratio of permeability coefficients.

Where a structural formula is shown in any one of the following examples, it is merely an average structure to be inferred from the results of NMR determination and there is no denying that other structures may be present.

EXAMPLE 1

In 5,500 g of N-methyl-2-pyrrolidone (NMP) were dissolved 650 g (1.59 moles) of 9,9-bis(3',5'-dimethyl-4'-aminophenyl)fluorene [BAFL(4Me)] and 468 g (1.59 moles) of 3,3',4,4'-biphenyltetracarboxylic acid dianhydride (BPDA) by stirring for 1 hour at room temperature and the solution was kept at 180° C. and allowed to react for 7 hours with removal of the water being formed. Upon completion of the reaction, the reaction mixture was diluted by fresh addition of 18 liters of NMP, cooled, and poured into 100 liters of methanol to for a precipitate.

The precipitate was washed twice with 50 liters of methanol and dried under vacuum at 70° C. for 2 days and at 100° C. for 1 day to give 980 g of cardo polyimided [PI-BPDA-BAFL(4Me); molecular weight of the repeating unit, 662.7] represented by the following structural formula.

PI-BPDA-BAFL(4Me)

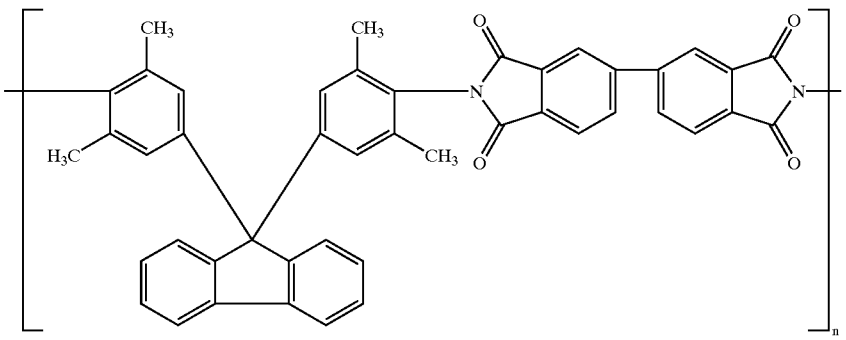

In 500 ml of 1,2-dichloroethane was dissolved 26.5 g (40 millimoles) of the PI-BPDA-BAFl(4Me) by stirring for 1 hour at room temperature, 51.3 g (288 millimoles) of N-bromosuccinimide (NBS) and 0.5 g of 2,2-azobisbutyronitrile (AIBN) were added, and the mixture was allowed to react for 5 hours under reflux conditions (the temperature of the solution being 80–100° C.). Upon completion of the reaction, the reaction mixture was poured into 4.5 liters of methanol to precipitate polymers. The polymers thus precipitated were collected, washed with grinding in a mixer after fresh addition of 1 liter of methanol, and further washed 5 times with 1.5 liters of methanol. Thereafter, the polymers were dried under vacuum at 50° C. for 12 hours to give bromine-modified PI-BPDA-BAFL (4Me).

Figure 2:
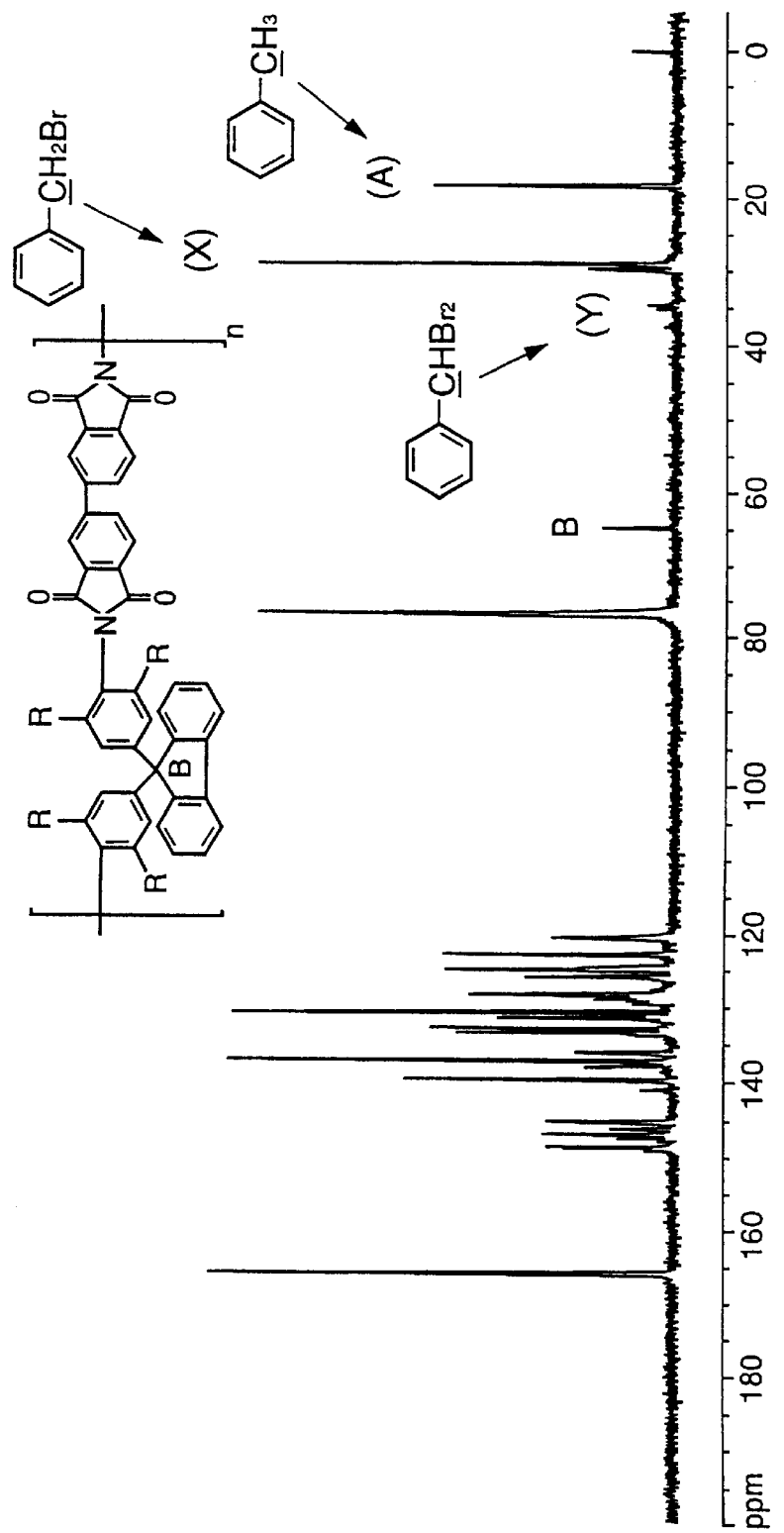
FIG. 2 is a graph showing the results of $^{13}$C-NMR analysis conducted on the bromine-modified cardo polyimides [PI-BPDA-BAFL(4Me)-Br(27.6%)] prepared in Example 1.

The bromine-modified polymers thus obtained were submitted to $^1$H-NMR analysis (300 MHz, CDCl$_3$, room temperature), $^{13}$C-NMR analysis (75 MHz, CDCl$_3$, room temperature), two-dimensional NMR analysis, and elemental analysis of bromine. The results of the $^1$H-NMR and $^{13}$C-NMR analyses are respectively shown in FIGS. 1 and 2. The results of $^1$H-NMR analysis indicate that the integraded value of peak x ($\delta$: 4.1–4.4 ppm, br-m) of the methylene protons (Ar—CH$_2$—Br) in the benzyl position after monobromination is 2.0 and the integrated value of peak a ($\delta$: in the vicinity of 1.9–2.2 ppm, br-m) of the methyl protons (Ar—CH$_3$) in the benzyl position in the absence of bromination is 0.79 and this confirms that the side-chain methyl group on the aromatic ring in the BAFL(4Me) segment of the polymer is partly monobrominated. In addition, peak y ($\delta$: 6.3–6.6 ppm, br-m) was observed. In comparison with the reference compound benzal bromide (Ar—CH—Br$_2$: $\delta$ 6.6–6.7 ppm, br-s), the peak y was inferred to be due to the methylidyne proton (Ar—CH—Br$^2$) in the benzyl position after dibromination. On the other hand, in the $^{13}$C-NMR analysis, peak X ($\delta$, 29.7 ppm) of the methylene carbon (Ar—CH$_2$—Br) in the benzyl position after monobromination and peak A ($\delta$, in the vicinity of 18 ppm) of the methyl carbon (Ar—CH$_3$) in the benzyl position in the absence of bromination were observed and, in addition, peak Y ($\delta$, in the vicinity of 34.5 ppm) was observed. The peak Y was inferred to be due to the methylidyne carbon (Ar—CH—Br$_2$) in the benzyl position after dibromination in comparison with the reference compound benzal bromide (Ar—CH—Br$_2$; $\delta$ in the vicinity of 41 ppm). Each peak was assigned by two-dimensional NMR determination and, as a correlation was observed between a part of the peak y of 1H-NMR spectrum and the peak Y of $^{13}$C-NMR spectrum, the peak y was assigned to the methylidyne proton and the peak Y to the methylidyne carbon in the benzyl position (Ar—CH—Br$_2$) after replacement of the hydrogens in the side-chain methyl group with two bromine atoms. The integrated value of the portion which shows a correlation between the peak y of $^1$H-NMR spectrum and the peak Y of $^{13}$C-NMR spectrum is 0.04 and the rate of modification by bromine is 27.6% and this indicates that approximately 3.31 hydrogen atoms, averaged for the polymers, out of the 12 hydrogen atoms in the benzyl position in the repeating unit are replaced by bromine atoms. The $^{13}$C-NMR analysis indicated the absence of tribrominated carbon in the benzyl position. Since the integrated value of aromatic hydrogen and the abundance ratio of aliphatic hydrogen in the $^1$H-NMR analysis are roughly identical with the calculated values, the possibility of bromine being introduced to the aromatic ring is considered to be remote, if any.

[$^1$H-NMR analysis]

Ar—CH—Br$_2$ (δ: 6.3–6.6 ppm, br-m; integrated value, 0.04)

Ar—CH$_2$—Br (δ: 4.2–4.4 ppm, br-m; integrated value, 2.00)

Ar—CH$_3$ (δ: 2.0–2.2 ppm, br-m; integrated value, 0.79)

[Rate of modification by bromine] 27.6%

[Elemental analysis of Br] Br: 31.6%

[Number of bromine introduced to the benzyl position per repeating unit] Approximately 3.31

As is apparent from the results of NMR analysis and elemental analysis of bromine, the bromine-modified polymers are bromine-modified cardo polyimides [PI-BPDA-BAFL(4Me)-Br] represented by the following structural formula.

PI-BPDA-BAFL(4Me)-Br

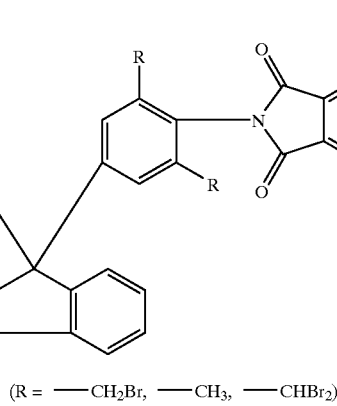

(R = —CH$_2$Br, —CH$_3$, —CHBr$_2$)

Moreover, the results of $^1$H-NMR analysis conducted on the bromine-modified polymers thus obtained indicate that the integrated values of the methylidyne proton in the benzyl position after dibromination, the methylene protons in the benzyl position after monobromination, and the methyl protons in the tolyl group in the absence of bromination are respectively 0.04, 2.00, and 0.79 and this confirms that the bromine-modified polymers in question are PI-BPDA-BAFL(4Me)-Br(27.6%) resulting from partial di- and mono-bromination of the methyl groups of the tolyl groups.

Hereinafter, bromine-modified cardo polyimides will be written using a symbol such as PI-BPDA-BAFL(4Me)-Br and the rate of modification by bromine will be written immediately thereafter in parentheses like (27.6%).

In 50 ml of NMP was dissolved 5 g of the PI-BPDA-BAFL(4Me)-Br(27.6%) at room temperature and the resulting solution was cast on a glass plate in a uniform thickness and dried in a dryer at 50° C. for 10 hours. Then, the dried glass plate was immersed in distilled water and the film was peeled off the glass plate and dried in a vacuum dryer at 50° C. for 3 days. The film was then immersed in methanol to remove the solvent NMP completely and dried under vacuum at 50° C. for 24 hours. Thus, the bromine-modified cardo polyimides PI-BPDA-BAFL(4Me)-Br(27.6%) were converted into membrane.

Gas permeabilities of the membrane were as follows.

[Permeability coefficient of carbon dioxide]

647×10$^{-18}$m$^3$.m/(m$^2$.s.Pa) (86.2 barrer)

[Permeability coefficient of nitrogen]

18.0×10$^{-18}$m$^3$.m/(m$^2$.s.Pa) (2.4 barrer)

[Carbon dioxide/nitrogen separation factor] 36

EXAMPLE 2

Using 26.5 g (40 millimoles) of the PI-BPDA-BAFL(4Me) prepared in Example 1 and 17.1 g (96 millimoles) of NBS, the bromination reaction, purification, and analysis were carried out as in Example 1. Approximately 10.2% of the 12 hydrogen atoms in the benzyl position in the repeating unit, or approximately 1.22 hydrogen atoms, was replaced by bromine atoms to give bromine-modified cardo polyimides PI-BPDA-BAFL(4Me)-Br(10.2%).

The analysis of the PI-BPDA-BAFL(4Me)-Br(10.2%) thus obtained gave the following results.

[$^1$H-NMR analysis]

Ar—CH—Br$_2$ (δ: 6.3–6.6 ppm, br-m; integrated value, 0.00)

Ar—CH$_2$—Br (δ: 4.1–4.4 ppm, br-m; integrated value, 2.00)

Ar—CH$_3$ (δ: 1.8–2.4 ppm, br-m; integrated value, 6.81)

[Rate of modification by bromine] 10.2%

[Elemental analysis of Br] Br: 17.9%

[Number of bromine introduced to the benzyl position per repeating unit] Approximately 1.22

Membrane was made from the PI-BPDA-BAFL(4Me)-Br(10.2%) and gas permeabilities of the membrane of the bromine-modified cardo polyimides were as follows.

[Permeability coefficient of carbon dioxide]

1490×10$^{-18}$m$^3$.m/(m$^2$.s.Pa) (198 barrer)

[Permeability coefficient of nitrogen]

49.5×10$^{-18}$m$^3$.m/(m$^2$.s.Pa) (6.6 barrer)

[Carbon dioxide/nitrogen separation factor] 32

EXAMPLE 3

Using 26.5 g (40 millimoles) of the PI-BPDA-BAFL (4Me) prepared in Example 1 and 8.6 g (48 millimoles) of NBS, the bromination reaction, purification, and analysis were carried out as in Example 1. Approximately 3.6% of the 12 hydrogen atoms in the benzyl position in the repeating unit, or approximately 0.43 hydrogen atom, was replaced by bromine atom to give bromine-modified cardo polyimides PI-BPDA-BAFL(4Me)-Br(3.6%).

26 hours with removal of the water being formed. Upon completion of the reaction, the reaction mixture was diluted by fresh addition of 5 liters of NMP, cooled, and poured into 100 liters of methanol to give cardo polyimides as a precipitate. The cardo polyimides thus obtained were washed twice with 50 liters of methanol and dried under vacuum at 70° C. for 2 days and at 100° C. for 1 day to give 960 g of cardo polyimides [PI-6FDA-BAFL(4Me); molecular weight of the repeating unit, 814.8] represented by the following structural formula.

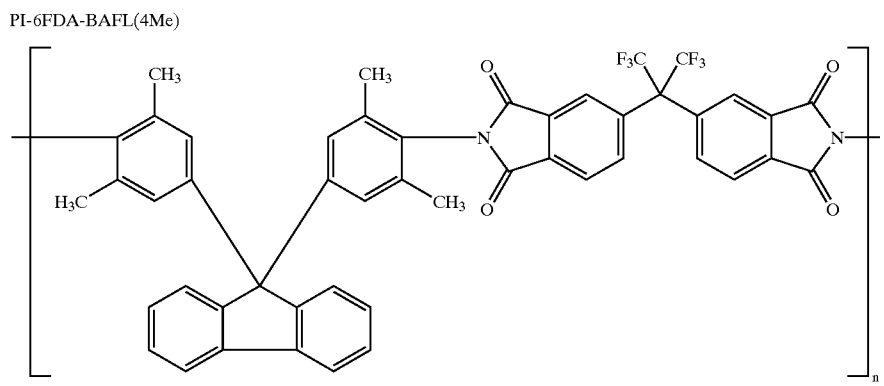

PI-6FDA-BAFL(4Me)

The analysis of the PI-BPDA-BAFL(4Me)-Br(3.6%) thus obtained gave the following results.

[$^1$H-NMR analysis]

Ar—CH—Br$_2$ (δ: 6.3–6.6 ppm, br-m; integrated value, 0.00)

Ar—CH$_2$—Br (δ: 4.2–4.4 ppm, br-m; integrated value, 2.00)

Ar—CH$_3$ (δ: 1.8–2.3 ppm, br-m; integrated value, 24.78)
[Rate of modification by bromine] 3.6%
[Elemental analysis of Br] Br: 9.9%
[Number of bromine introduced to the benzyl position per repeating unit] Approximately 0.43

Membrane was made from the PI-BPDA-BAFL(4Me)-Br(3.6%) and gas permeabilities of the membrane of the bromine-modified cardo polyimides were as follows.
[Permeability coefficient of carbon dioxide]
2790×10$^{-18}$m$^3$.m/(m$^2$.s.Pa) (372 barrer)
[Permeability coefficient of nitrogen]
150×10$^{-18}$m$^3$.m/(m$^2$.s.Pa) (20 barrer)
[Carbon dioxide/nitrogen separation factor] 27

EXAMPLE 4

In 5,350 g of NMP were dissolved 521 g (1.28 moles) of 9,9-bis(3',5'-dimethyl-4'-aminophenyl)fluorene [BAFL (4Me)] and 567 g (1.28 moles) of 2,2-bis(3',4'-dicarboxyphenyl)-1,1,1,3,3,3-hexafluoropropane dianhydride (6FDA) by stirring for 1 hour at room temperature and then the solution was kept at 180° C. and allowed to react for Using 32.7 g (40 millimoles) of the PI-6FDA-BAFL (4Me) thus prepared and 51.3 g (288 millimoles) of NBS, the bromination reaction and purification were carried out as in Example 1 to give bromine-modified PI-6FDA-BAFL (4Me).

The bromine-modified product thus obtained was analyzed as in Example 1 to give the following results.

[$^1$H-NMR analysis]

Ar—OH—Br$_2$ (δ: 6.3–6.6 ppm, br-m; integrated value, 0.06)

Ar—CH$_2$—Br (δ: 4.1–4.4 ppm, br-m; integrated value, 2.00)

Ar—CH$_3$ (δ: 1.9–2.2 ppm, br-m; integrated value, 0.51)
[Rate of modification by bromine] 30.4%
[Elemental analysis of Br] Br: 31.9%
[Number of bromine introduced to the benzyl position per repeating unit] Approximately 3.64

As is apparent from these analytical results, the bromine-modified product is confirmed to be bromine-modified cardo polyimides [PI-6FDA-BAFL(4Me)-Br] represented by the following structural formula.

PI-6FDA-BAFL(4Me)-Br

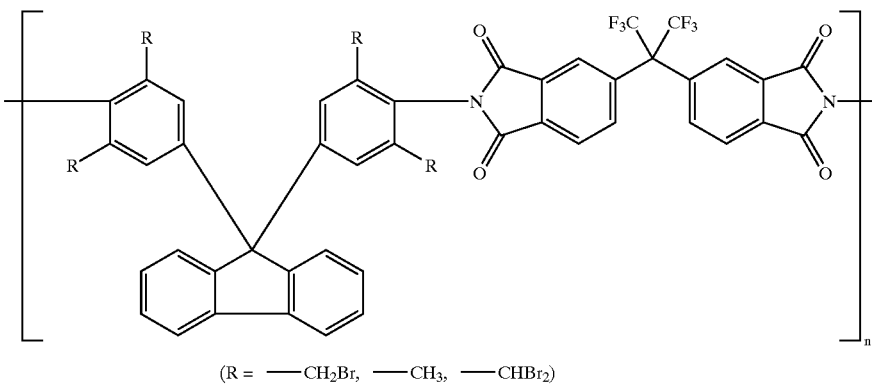

(R = —CH$_2$Br, —CH$_3$, —CHBr$_2$)

It is to be noted that there is the possibility of bromine atoms having been introduced, although in small amounts, to the aromatic rings in the repeating unit.

As the aforementioned $^1$H-NMR analysis of the bromine-modified product indicates, the intergrated values of the methylidyne proton in the benzyl position after dibromination, the methylene protons in the benzyl position after monobromination, and the methyl protons in the tolyl group in the absence of bromination are respectively 0.06, 2.00, and 0.51 and this confirms that the bromine-modified product is PI-6FDA-BAFL(4Me)-Br(30.4%) formed by partial di- and mono-bromination of the side-chain methyl groups of the tolyl groups.

Membrane was made from the PI-6FDA-BAFL(4Me)-Br (30.4%) as in Example 1 and gas permeabilities of the membrane of the bromine-modified cardo polyimides were as follows.

[Permeability coefficient of carbon dioxide]
1280×10$^{-18}$m$^3$.m/(m$^2$.s.Pa) (170 barrer)
[Permeability coefficient of nitrogen]
43.4×10$^{-18}$m$^3$.m/(m$^2$.s.Pa) (5.8 barrer)
[Carbon dioxide/nitrogen separation factor] 29

EXAMPLE 5

Using 32.7 g (40 millimoles) of the PI-6FDA-BAFL (4Me) prepared in Example 4 and 34.2 g (192 millimoles) of NBS, the bromination reaction, purification, and analysis were carried out as in Example 1. Approximately 18.1% of the 12 hydrogen atoms in the benzyl position, or approximately 2.17 hydrogen atoms, was replaced by bromine atoms to give PI-6FDA-BAFL(4Me)-Br(18.1%).

The bromine-modified product thus obtained was analyzed as in Example 1 to give the following results.

[$^1$H-NMR analysis]
Ar—CH—Br$_2$ (δ: 6.3–6.6 ppm, br-m; integrated value, 0.00)
Ar—CH$_2$—Br (δ: 4.2–4.4 ppm, br-m; integrated value, 2.00)
Ar—CH$_3$ (δ: 1.8–2.3 ppm, br-m; integrated value, 2.76)
[Rate of modification by bromine] 18.1%
[Elemental analysis of Br] Br: 24.0%
[Number of bromine introduced to the benzyl position per repeating unit] Approximately 2.17
Membrane was made from the PI-6FDA-BAFL(4Me)-Br (18.1%) and gas permeabilities of the membrane of the bromine-modified cardo polyimides were as follows.

[Permeability coefficient of carbon dioxide]
1800×10$^{-18}$m$^3$.m/(m$^2$.s.Pa) (240 barrer)
[Permeability coefficient of nitrogen]
68.3×10$^{-18}$m$^3$.m/(m$^2$.s.Pa) (9.1 barrer)
[Carbon dioxide/nitrogen separation factor] 26

EXAMPLE 6

Using 32.7 g (40 millimoles) of the PI-6FDA-BAFL (4Me) prepared in Example 4 and 17.1 g (96 millimoles) of NBS, the bromination reaction, purification, and analysis were carried out as in Example 1. Approximately 4.8% of the 12 hydrogen atoms in the benzyl position in the repeating unit, or approximately 0.58 hydrogen atom, was replaced by bromine atoms to give PI-6FDA-BAFL(4Me)-Br(4.8%).

The analysis of the PI-6FDA-BAFL(4Me)-Br(4.8%) thus obtained gave the following results.

[$^1$H-NMR analysis]
Ar—CH—Br$_2$ (δ: 6.3–6.6 ppm, br-m; integrated value, 0.00)
Ar—CH$_2$—Br (δ: 4.1–4.4 ppm, br-m; integrated value, 2.00)
Ar—CH$_3$ (δ: 1.9–2.2 ppm, br-m; integrated value, 17.71)
[Rate of modification by bromine] 4.8%
[Elemental analysis of Br] Br: 9.4%
[Number of bromine introduced to the benzyl position per repeating unit]. Approximately 0.58.
Membrane was made from the PI-6FDA-BAFL(4Me)-Br (4.8%) and gas permeabilities of the membrane of the bromine-modified cardo polyimides were as follows.

[Permeability coefficient of carbon dioxide]
4060×10$^{-18}$m$^3$.m/(m$^2$.s.Pa) (541 barrer)
[Permeability coefficient of nitrogen]
198×10$^{-18}$m$^3$.m/(m$^2$.s.Pa) (26.4 barrer)
[Carbon dioxide/nitrogen separation factor] 21

EXAMPLE 7

In 5,000 g of NMP were dissolved 650 g (1.59 moles) of 9,9-bis(3',5'-dimethyl-4'-aminophenyl)fluorene [BAFL (4Me)], 188 g (0.64 mole) of 3,3',4,4'-biphenyltetracarboxylic acid dianhydride (BPDA), and 209 g (0.96 mole) of pyromellitic dianhydride (PMDA) by stirring for 1 hour at room temperature and then the solution was kept at 180° C. and allowed to react for 8 hours with removal of the water being formed. Upon completion of the reaction, the reaction mixture was diluted by fresh addition of 18 liters of NMP, cooled, and poured into 160 liters of methanol to give cardo polyimides as a precipitate. The cardo polyimides thus obtained were washed twice with 50 liters of methanol and dried under vacuum at 70° C. for 2 days and at 100° C. for 1 day to give 950 g of cardo polyimides [PI-PMBP64-BAFL(4Me); molecular weight of the repeating unit, 618.3] represented by the following structural formula.

PI-PMBP64-BAFL(4Me) (n:m = 60:40)

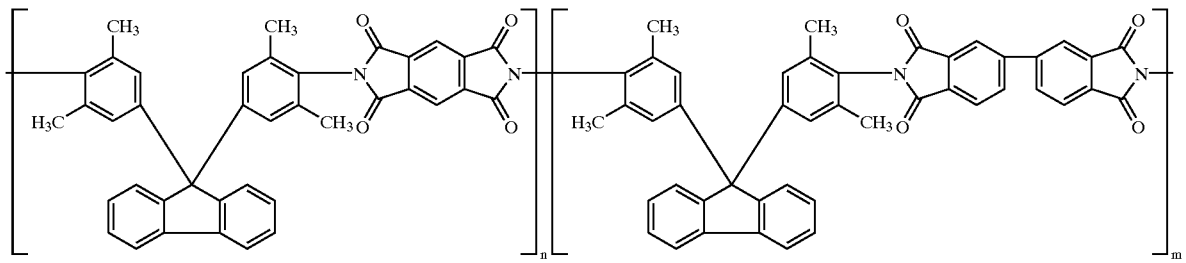

Using 24.7 g (40 millimoles) of the PI-PMBP64-BAFL(4Me) and 51.3 g (288 millimoles) of N-bromosuccinimide (NBS), the bromination reaction and purification were carried out as in Example 1 to give bromine-modified PI-PMBP64-BAFL(4Me).

The analysis made in the same manner as in Example 1 on the bromine-modified product gave the following results.

[$^1$H-NMR analysis]

Ar—CH—Br$_2$ ($\delta$: 6.3–6.6 ppm, br-m; integrated value, 0.04)

Ar—CH$_2$—Br ($\delta$: 4.1–4.5 ppm, br-m; integrated value, 2.00)

Ar—CH$_3$ ($\delta$: 1.9–2.2 ppm, br-m; integrated value, 0.61)

[Rate of modification by bromine] 29.0%

[Elemental analysis of Br] Br: 34.7%

[Number of bromine introduced to the benzyl position per repeating unit] Approximately 3.47

As is apparent from these analytical results, the bromine-modified product thus obtained was confirmed to be bromine-modified cardo polyimides [PI-PMBP64-BAFL(4Me)-Br] represented by the following structural formula.

PI-PMBP64-BAFL(4Me)-Br (n:m = 60:40)

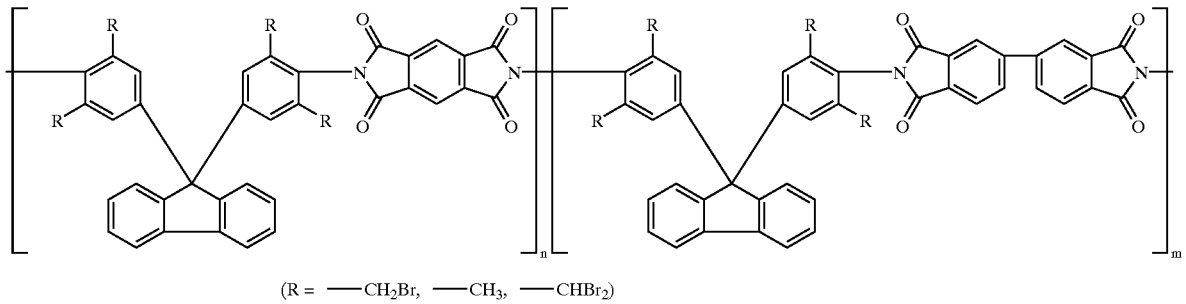

(R = —CH$_2$Br, —CH$_3$, —CHBr$_2$)

As the results of $^1$H-NMR analysis indicate, the integrated values of the methylene protons in the benzyl position after monobromination and the methyl protons in the tolyl group in the absence of bromination are respectively 2.00 and 0.61 and this confirms that the product is PI-PMBP64-BAFL(4Me)-Br(29.0%) resulting from partial di- and mono-bromination of the side-chain methyl groups.

Membrane was made from 5 g of the PI-PMBP64-BAFL(4Me)-Br(29.0%) as in Example 1 and gas permeabilities of the membrane of the bromine-modified cardo polyimides were as follows.

[Permeability coefficient of carbon dioxide] 1058×10$^{-18}$m$^3$.m/(m$^2$.s.Pa) (141 barrer)

[Permeability coefficient of nitrogen] 30.8×10$^{-18}$m$^3$.m/(m$^2$.s.Pa) (4.1 barrer)

[Carbon dioxide/nitrogen separation factor] 34

EXAMPLE 8

Using 24.7 g (40 millimoles) of the PI-PMBP64-BAFL(4Me) prepared in Example 7 and 34.2 g (192 millimoles) of NBS, the bromination reaction, purification, and analysis were carried out as in Example 1. Approximately 22.1% of the 12 hydrogen atoms in the benzyl position in the BAFL(4Me) segment, or approximately 2.82 hydrogen atoms, was replaced by bromine atoms to give bromine-modified cardo polyimides [PI-PMBP64-BAFL(4Me)-Br(22.1%)].

The analysis made in the same manner as in Example 1 on the bromine-modified product gave the following results.

[$^1$H-NMR analysis]

Ar—CH—Br$_2$ ($\delta$: 6.3–6.6 ppm, br-m; integrated value, 0.00)

Ar—CH$_2$—Br ($\delta$: 4.1–4.5 ppm, br-m; integrated value, 2.00)

Ar—CH$_3$ ($\delta$: 1.9–2.2 ppm, br-m; integrated value, 1.58)

[Rate of modification by bromine] 22.1%

[Elemental analysis of Br] Br: 29.4%

[Number of bromine introduced to the benzyl position per repeating unit] Approximately 2.66

Membrane was made from the PI-PMBP64-BAFL(4Me)-Br(22.1%) and gas permeabilities of the membrane of the bromine-modified cardo polyimides were as follows.

[Permeability coefficient of carbon dioxide]
1300×10$^{-18}$m$^3$.m/(m$^2$.s.Pa) (173 barrer)
[Permeability coefficient of nitrogen]
38.3×10$^{-18}$m$^3$.m/(m$^2$.s.Pa) (5.1 barrer)
[Carbon dioxide/nitrogen separation factor] 33

EXAMPLE 9

Using 24.7 g (40 millimoles) of the PI-PMBP64-BAFL (4Me) prepared in Example 7 and 17.1 g (96 millimoles) of NBS, the bromination reaction, purification, and analysis were carried out as in Example 1. Approximately 7.3% of the 12 hydrogen atoms in the benzyl position in the BAFL (4Me) segment, or approximately 0.88 hydrogen atom, was replaced by bromine atoms to give PI-PMBP64-BAFL (4Me)-Br(7.3%).

[$^1$H-NMR analysis]
Ar—CH—Br$_2$ (δ: 6.3–6.6 ppm, br-m; integrated value, 0.00)
Ar—CH$_2$—Br (δ: 4.1–4.4 ppm, br-m; integrated value, 2.20)
Ar—CH$_3$ (δ: 1.9–2.2 ppm, br-m; integrated value, 11.73)
[Rate of modification by bromine] 7.3%
[Elemental analysis of Br] Br: 12.8%
[Number of bromine introduced to the benzyl position per repeating unit]. Approximately 0.88.

Membrane was made from the PI-PMBP64-BAFL(4Me)-Br(7.3%)and gas permeabilities of the membrane of the bromine-modified cardo polyimides were as follows.
[Permeability coefficient of carbon dioxide]
4720×10$^{-18}$m$^3$.m/(m$^2$.s.Pa) (629 barrer)
[Permeability coefficient of nitrogen]
185×10$^{-18}$m$^3$.m/(m$^2$.s.Pa) (24.6 barrer)
[Carbon dioxide/nitrogen separation factor] 26

EXAMPLE 10

Using 24.7 g (40 millimoles) of the PI-PMBP64-BAFL (4Me) prepared in Example 7 and 8.6 g (48 millimoles) of NBS, the bromination reaction, purification, and analysis were carried out as in Example 1. Approximately 2.4% of the 12 hydrogen atoms in the benzyl position in the BAFL (4Me) segment, or approximately 0.29 hydrogen atom, was replaced by bromine atoms to give PI-PMBP64-BAFL (4Me)-Br(2.4%).

[$^1$H-NMR analysis]
Ar—CH—Br$_2$ (δ: 6.3–6.6 ppm, br-m; integrated value, 0.00)
Ar—CH$_2$—Br (δ: 4.1–4.4 ppm, br-m; integrated value, 0.75)
Ar—CH$_3$ (δ: 1.9–2.2 ppm, br-m; integrated value, 14.39)
[Rate of modification by bromine] 2.4%
[Elemental analysis of Br] Br: 6.0%
[Number of bromine introduced to the benzyl position per repeating-unit] Approximately 0.29

Membrane was made from the PI-PMBP64-BAFL(4Me)-Br(2.4%) and gas permeabilities of the membrane of the bromine-modified cardo polyimides were as follows.
[Permeability coefficient of carbon dioxide]
6680×10$^{-18}$m$^3$.m/(m$^2$.s.Pa) (891 barrer)
[Permeability coefficient of nitrogen]
293×10$^{-18}$m$^3$.m/(m$^2$.s.Pa) (39.1 barrer)
[Carbon dioxide/nitrogen separation factor] 23

EXAMPLE 11

Amination with Diethanolamine

In 50 ml of NMP was dissolved 2.78 g of the PI-PMBP64-BAFL(4Me)-Br(7.3%)(4 millimoles; molecular weight of repeating unit, 695.1) prepared in Example 9 at room temperature, 1.01 g (9.6 millimoles) of diethanolamine was added, and the reaction was allowed to proceed for 3 hours. The reaction mixture was poured into 600 ml of distilled water to give polymers as a precipitate. The precipitate was collected, washed with grinding in a mixer by fresh addition of 400 ml of methanol, and further washed 4 times with 400 ml of methanol. Thereafter, the precipitate was dried under vacuum at 30° C. for 12 hours to give diethanolamine-modified polymers.

The IR analysis of the ethanolamine-modified polymers showed an absorption band characteristic of diethanolamine at 2800~3000 cm$^{-1}$ and confirmed that the bromine atoms in the PI-PMBP64-BAFL(4Me)-Br(7.3%) were partly replaced by diethanolamine to give diethanolamine-modified cardo polyimides.

The diethanolamine-modified cardo polyimides were dissolved in NMP and made into membrane as in Example 1. Gas permeabilities of the membrane of the diethanolamine-modified cardo polyimides were as follows.
[Permeability coefficient of carbon dioxide]
245×10$^{-18}$m$^3$.m/(m$^2$.s.Pa) (32.6 barrer)
[Permeability coefficient of nitrogen]
5.25×10$^{-18}$m$^3$.m/(m$^2$.s.Pa) (0.7 barrer)
[Carbon dioxide/nitrogen separation factor] 44

EXAMPLE 12

Amination with Diethylamine

The procedure of Example 11 was followed to prepare diethylamine-modified polymers by using 0.70 g (9.6 millimoles) of diethylamine in place of diethanolamine.

The IR analysis of the diethylamine-modified polymers showed an absorption band characteristic of diethylamine at 2800~3000 cm$^{-1}$ and confirmed that the bromine atoms in the PI-PMBP64-BAFL(4Me)-Br(7.3%) were partly replaced by diethylamine to give diethylamine-modified cardo polyimides.

Gas permeabilities of the membrane made as in Example 1 from the diethylamine-modified cardo polyimides were as follows.
[Permeability coefficient of carbon dioxide]
360×10$^{-18}$m$^3$.m/(m$^2$.s.Pa) (48.0 barrer)
[Permeability coefficient of nitrogen]
9×10$^{-18}$m$^3$.m/(m$^2$.s.Pa) (1.2 barrer)
[Carbon dioxide/nitrogen separation factor] 40

EXAMPLE 13

Amination with Morpholine

The procedure of Example 11 was followed to prepare morpholine-modified polymers by using 0.70 g (8.0 millimoles) of morpholine in place of diethanolamine.

The IR analysis of the morpholine-modified polymers showed an absorption band characteristic of morpholine at 2800~3000 cm$^{-1}$ and confirmed that the bromine atoms in the PI-PMBP64-BAFL(4Me)-Br(7.3%) were partly replaced by morpholine to give morpholine-modified cardo polyimides.

Gas permeabilities of the membrane made as in Example 1 from the morpholine-modified cardo polyimides were as follows.
[Permeability coefficient of carbon dioxide]
505×10$^{-18}$m$^3$.m/(m$^2$.s.Pa) (67.3 barrer)

[Permeability coefficient of nitrogen]

$13 \times 10^{-18} m^3 .m/(m^2 .s.Pa)$ (1.7 barrer)

[Carbon dioxide/nitrogen separation factor] 39

EXAMPLE 14

Hydroxylation

In 80 ml of NMP was dissolved 2.78 g (4 millimoles) of the PI-PMBP64-BAFL(4Me)-Br(7.3%) prepared in Example 9, 10.4 g of 40% aqueous solution of tetra-n-butylammonium hydroxide (equivalent to 16 millimoles) was added, and the reaction was allowed to proceed at room temperature for 10 hours with vigorous stirring. The reaction mixture was poured into 1000 ml of distilled water to separate polymers as a precipitate. The precipitate was collected, washed with grinding in a mixer with fresh addition of 500 ml of distilled water, and further washed three times with 500 ml of distilled water and three times with 400 ml of methanol. Thereafter, the precipitate was dried under vacuum at 50° C. for 12 hours to give a hydroxyl-modified product.

[Permeability coefficient of carbon dioxide]

$263 \times 10^{-18} m^3 .m/(m^2 .s.Pa)$ (35.1 barrer)

[Permeability coefficient of nitrogen]

$7 \times 10^{-18} m^3 .m/(m^2 .s.Pa)$ (0.9 barrer)

[Carbon dioxide/nitrogen separation factor] 39

EXAMPLE 15

Hydroxylation

In 80 ml of dichloromethane was dissolved 2.78 g (4 millimoles) of the PI-PMBP64-BAFL(4Me)-Br(7.3%) prepared in Example 9 at room temperature, 2.2 g (40.0 millimoles) of pulverized potassium hydroxide and 0.12 g (0.4 millimole) of tetra-n-butylammonium chloride were

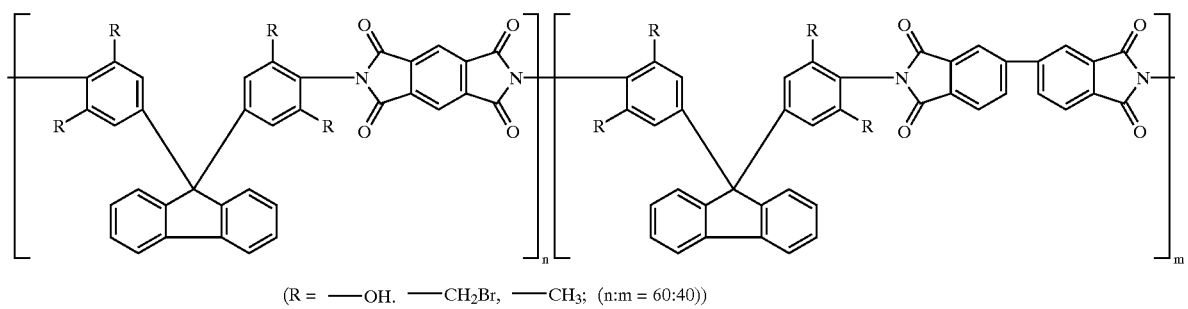

(R = —OH, —CH$_2$Br, —CH$_3$; (n:m = 60:40))

The IR analysis of the hydroxyl-modified product showed an absorption band characteristic of the hydroxyl group at 3200~3600 cm$^{-1}$ and confirmed that the bromine atoms in the PI-PMBP64-BAFL(4Me)-Br(7.3%) were partly replaced by hydroxyl groups to give hydroxyl-modified cardo polyimides.

The hydroxyl-modified cardo-type polyimides were dissolved in NMP and made into membrane as in Example 1. Gas permeabilities of the membrane of the hydroxyl-modified cardo polyimides were as follows.

added, and the reaction was allowed to proceed at room temperature for 10 hours with vigorous stirring. The reaction mixture was poured into 1000 ml of distilled water to separate polymers as a precipitate. The precipitate was collected, washed with grinding in a mixer with fresh addition of 500 ml of distilled water, and further washed five times with 500 ml of distilled water and three times with 400 ml of methanol. Thereafter, the precipitate was dried under vacuum at 50° C. for 12 hours to give a hydroxyl-modified product.

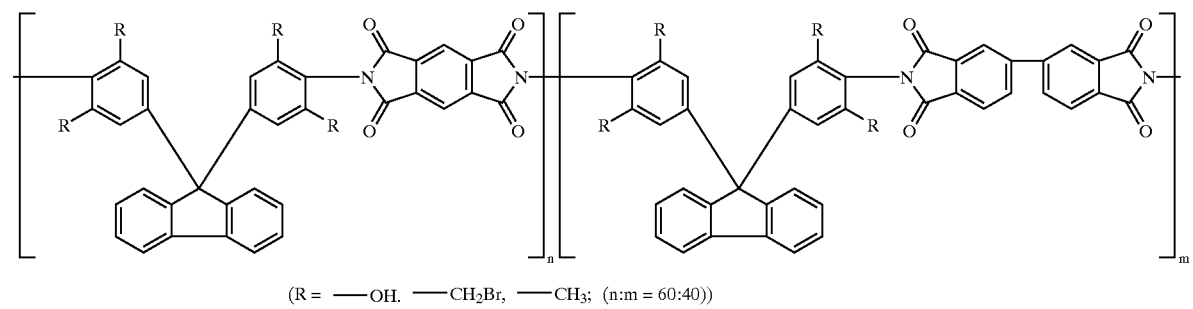

(R = —OH, —CH$_2$Br, —CH$_3$; (n:m = 60:40))

The IR analysis of the hydroxyl-modified product showed an absorption band characteristic of the hydroxyl group at 3200~3600 cm$^{-1}$ and confirmed that the bromine atoms in the PI-PMBP64-BAFL(4Me)-Br(7.3%) were partly replaced by hydroxyl groups to give hydroxyl-modified cardo polyimides.

The hydroxyl-modified cardo polyimides were dissolved in NMP and made into membrane as in Example 1. Gas permeabilities of the membrane of the hydroxyl-modified cardo polyimides were as follows.

[Permeability coefficient of carbon dioxide]

302×10$^{-18}$m$^3$.m/(m$^2$.s.Pa) (40.2 barrer)

[Permeability coefficient of nitrogen]

7.5×10$^{-18}$m$^3$.m/(m$^2$.s.Pa) (1.0 barrer)

[Carbon dioxide/nitrogen separation factor] 41

EXAMPLE 16

Methylthiolation

In 80 ml of tetrahydrofuran was dissolved 2.78 g (4 millimoles) of the PI-PMBP64-BAFL(4Me)-Br(7.3%) prepared in Example 9 at room temperature, 0.56 g (8.0 millimoles) of sodium methanethioxide and 0.12 g (0.4 millimole) of tetra-n-butylammonium chloride were added, and the reaction was allowed to proceed at room temperature for 5 hours with vigorous stirring. The reaction mixture was processed as in Example 14 to give a methylthio-modified product.

EXAMPLE 17

Substitution by Thiomorpholine

In 50 ml of NMP was dissolved 2.78 g (4 millimoles) of the PI-PMBP64-BAFL(4Me)-Br(7.3%) prepared in Example 9 at room temperature, 0.50 g (4.8 millimoles) of thiomorpholine and 0.97 g (9.6 millimoles) of triethylamine were added, and the reaction was allowed to proceed at room temperature for 3 hours. The reaction mixture was processed as in Example 11 to give a thiomorpholino-modified product.

The IR analysis of the thiomorpholine-modified product showed an absorption band characteristic of thiomorpholine at 2800~3000 cm$^{-1}$ and confirmed that the bromine atoms in the PI-PMBP64-BAFL(4Me)-Br(7.3%) were partly replaced by thiomorpholino groups to give thiomorpholino-modified cardo polyimides.

The thiomorpholino-modified cardo polyimides were dissolved in NMP and made into membrane as in Example 1. Gas permeabilities of the membrane of the thiomorpholino-modified cardo polyimides were as follows.

[Permeability coefficient of carbon dioxide]

780×10$^{-18}$m$^3$.m/(m$^2$.s.Pa) (104 barrer)

[Permeability coefficient of nitrogen]

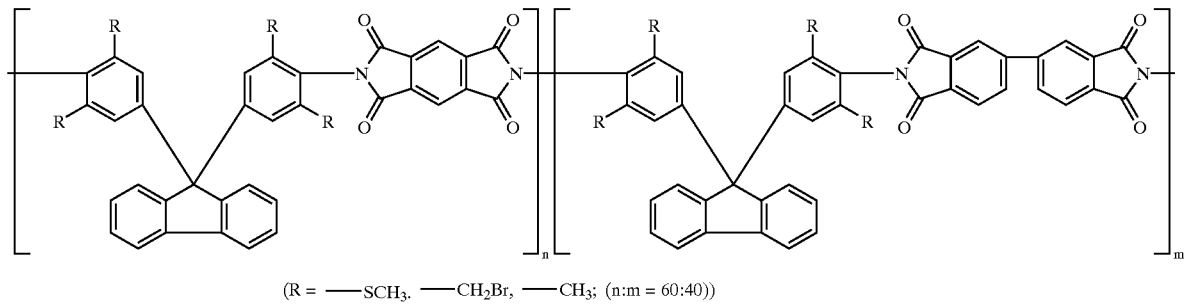

(R = —SCH$_3$. —CH$_2$Br, —CH$_3$; (n:m = 60:40))

The difference spectrum in the IR analysis of the methylthio-modified product showed an absorption band characteristic of the mercapto group in the vicinity of 2570 cm$^{-1}$ and confirmed that the bromine atoms in the PI-PMBP64-BAFL(4Me)-Br(7.3%) were partly replaced by methylthio groups to give methylthio-modified cardo polyimides.

The methylthio-modified cardo polyimides were dissolved in NMP and made into membrane as in Example 1. Gas permeabilities of the membrane of the methylthio-modified cardo polyimides were as follows.

[Permeability coefficient of carbon dioxide]

590×10$^{-18}$m$^3$.m/(m$^2$.s.Pa) (78.6 barrer)

[Permeability coefficient of nitrogen]

16×10$^{-18}$m$^3$.m/(m$^2$.s.Pa) (2.1 barrer)

[Carbon dioxide/nitrogen separation factor] 38

22×10$^{-18}$m$^3$.m/(m$^2$.s.Pa) (2.9 barrer)

[Carbon dioxide/nitrogen separation factor] 36

EXAMPLE 18

Acetoxylation

In 50 ml of dimethyl sulfoxide (DMSO) was dissolved 2.78 g (4 millimoles) of the PI-PMBP64-BAFL(4Me)-Br (7.3%) prepared in Example 9 at room temperature, 0.47 g (4.8 millimoles) of potassium acetate and N,N,N',N'-tetramethylethylenediamine were added, and the reaction was allowed to proceed at room temperature for 1 hour. The reaction mixture was processed as in Example 11 to give an acetyloxy-modified product.

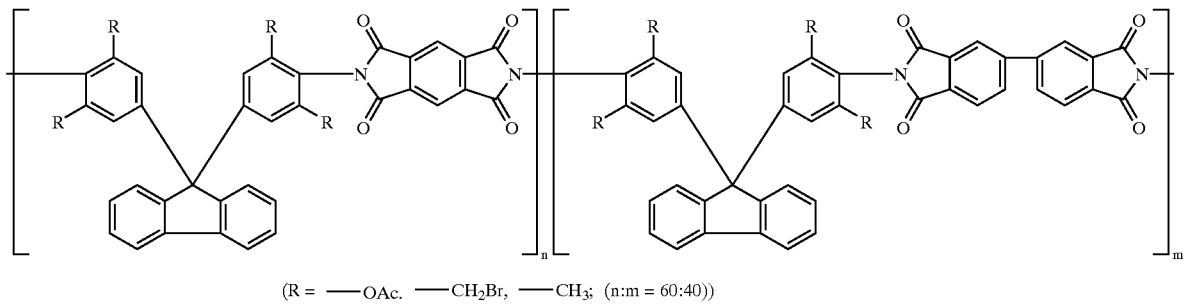

(R = —OAc. —CH₂Br, —CH₃; (n:m = 60:40))

The difference spectrum in the IR analysis of the acetyloxy-modified product showed an absorption band assignable to the carbonyl group of the acetyloxy group in the vicinity of 1745 cm$^{-1}$ and confirmed that the bromine atoms in the PI-PMBP64-BAFL(4Me)-Br(7.3%) were partly replaced by acetyloxy groups to give acetyloxy-modified cardo polyimides.

The thiomorpholino-modified cardo polyimides were dissolved in NMP and made into membrane as in Example 1. Gas permeabilities of the membrane of the acetyloxy-modified cardo polyimides were as follows.

[Permeability coefficient of carbon dioxide]
601×10$^{-18}$m$^3$.m/(m$^2$.s.Pa) (80.1 barrer)
[Permeability coefficient of nitrogen]
17×10$^{-18}$m$^3$.m/(m$^2$.s.Pa) (2.2 barrer)
[Carbon dioxide/nitrogen separation factor] 37

EXAMPLE 19

Cyanation

In 80 ml of dichloromethane was dissolved 2.78 g (4 millimoles) of the PI-PMBP64-BAFL(4Me)-Br(7.3%) prepared in Example 9 at room temperature, 1.25 g (8.0 millimoles) of tetraethylammonium cyanide and tetramethyleneethylenediamine were added, and the reaction was allowed to proceed at room temperature for 5 hours. The reaction mixture was processed as in Example 11 to give a cyano-modified product.

The difference spectrum in the IR analysis of the cyano-modified product showed an absorption band characteristic of the cyano group in the vicinity of 2245 cm$^{-1}$ and confirmed that the bromine atoms in the PI-PMBP64-BAFL(4Me)-Br(7.3%) were partly replaced by cyano groups to give cyano-modified cardo polyimides.

The cyano-modified cardo polyimides were dissolved in NMP and made into membrane as in Example 1. Gas permeabilities of the membrane of the cyano-modified cardo polyimides were as follows.

[Permeability coefficient of carbon dioxide]
618×10$^{-18}$m$^3$.m/(m$^2$.s.Pa) (82.4barrer)
[Permeability coefficient of nitrogen]
18×10$^{-18}$m$^3$.m/(m$^2$.s.Pa) (2.4barrer)
[Carbon dioxide/nitrogen separation factor] 35

EXAMPLE 20

Sulfonation

In 80 ml of dichloromethane was dissolved 2.78 g (4 millimoles) of the PI-PMBP64-BAFL(4Me)-Br(7.3%) prepared in Example 9 at room temperature, 2.41 g (8.0 millimoles) of tetraethylammonium p-toluenesulfonate was added, and the reaction was allowed to proceed at room

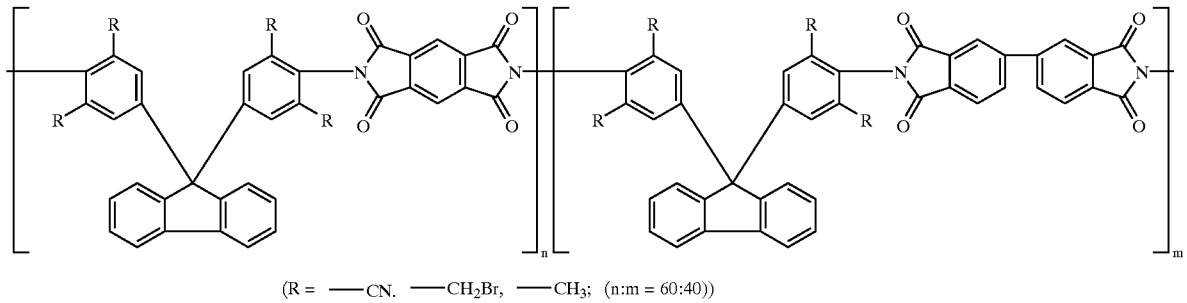

(R = —CN. —CH₂Br, —CH₃; (n:m = 60:40))

temperature for 5 hours. The reaction mixture was processed as in Example 11 to give a sulfonyl-modified product.

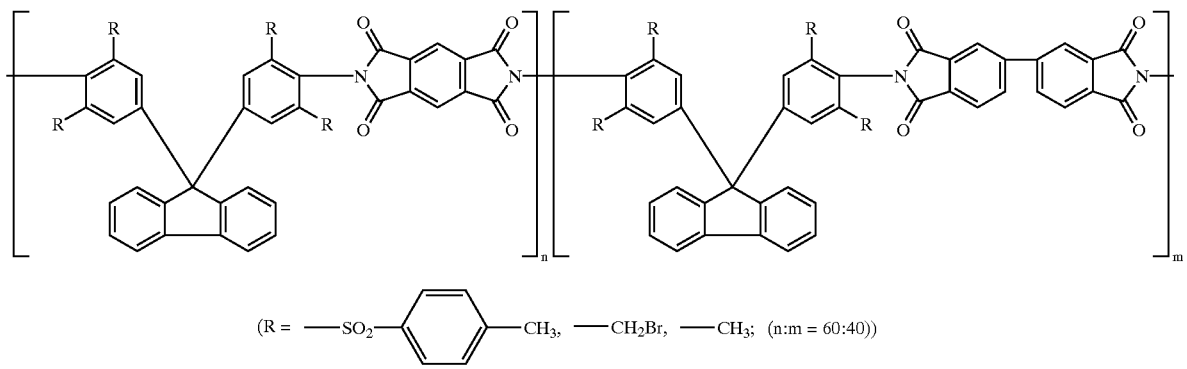

(R = —SO₂—⟨benzene⟩—CH₃, —CH₂Br, —CH₃; (n:m = 60:40))

The difference spectrum in the IR analysis of the sulfonyl-modified product showed absorption bands characteristic of the sulfonyl group in the vicinity of 1350 cm$^{-1}$ and 1175 cm$^{-1}$ and confirmed that the bromine atoms in the PI-PMBP64-BAFL(4Me)-Br(7.3%) were partly replaced by toluenesulfonyl groups to give sulfonyl-modified cardo polyimides.

The sulfonyl-modified cardo polyimides were dissolved in NMP and made into membrane as in Example 1. Gas permeabilities of the membrane of the sulfonyl-modified cardo polyimides were as follows.

[Permeability coefficient of carbon dioxide]

241×10$^{-18}$ m$^3$.m/(m$^2$.s.Pa) (32.1 barrer)
[Permeability coefficient of nitrogen]
6×10$^{-18}$ m$^3$.m/(m$^2$.s.Pa) (0.8 barrer)
[Carbon dioxide/nitrogen separation factor] 40

EXAMPLE 21

Nitration

In 80 ml of tetrahydrofuran was dissolved 2.78 g (4 millimoles) of the PI-PMBP64-BAFL(4Me)-Br(7.3%) prepared in Example 9 at room temperature, 8.79 g of 35% aqueous solution of tetraethylammonium nitrate (equivalent to 16.0 millimoles) was added, and the reaction was allowed to proceed at room temperature for 10 hours with vigorous stirring. The reaction mixture was poured into 1000 ml of distilled water to separate polymers as a precipitate. The precipitate was collected, washed with grinding in a mixer with fresh addition of 500 ml of distilled water, and further washed three times with 500 ml of distilled water and three times with 400 ml of methanol. Thereafter, the precipitate was dried under vacuum at 50° C. for 12 hours to give a nitro-modified product.

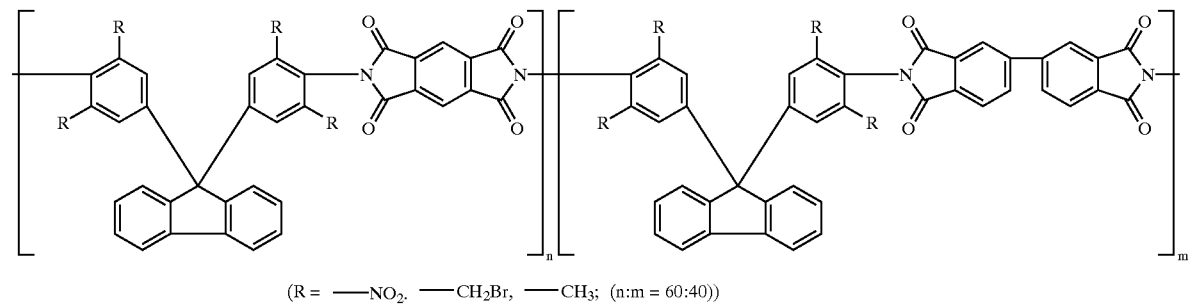

(R = —NO₂, —CH₂Br, —CH₃; (n:m = 60:40))

The difference spectrum in the IR analysis of the nitro-modified product showed an absorption band characteristic of the nitro group in the vicinity of 1600 cm$^{-1}$ and confirmed that the bromine atoms in the PI-PMBP64-BAFL(4Me)-Br (7.3%) were partly replaced by nitro groups to give nitro-modified cardo polyimides.

The nitro-modified cardo polyimides were dissolved in NMP and made into membrane as in Example 1. Gas permeabilities of the membrane of the nitro-modified cardo polyimides were as follows.

[Permeability coefficient of carbon dioxide]
410×10$^{-18}$ m$^3$.m/(m$^2$.s.Pa) (54.7 barrer)
[Permeability coefficient of nitrogen]
11×10$^{-18}$ m$^3$.m/(m$^2$.s.Pa) (1.5 barrer)
[Carbon dioxide/nitrogen separation factor] 37

EXAMPLE 22

Synthesis of PI-BTDA-BAFL(4Me)

In 4130 g of N-methyl-2-pyrrolidone (NMP) were dissolved 489.6 g (1.20 moles) of 9,9-bis(3',5'-dimethyl-4'-aminophenyl)fluorene [BAFL(4Me)] and 386.3 g (1.20 moles) of 3,3',4,4'-benzophenonetetracarboxylic acid dianhydride (BTDA) at room temperature with stirring for 1 hour, then the solution was kept at 180° C. and allowed to react for 8 hours with removal of the water being formed. Upon completion of the reaction, the reaction mixture was diluted with fresh addition of 14 liters of NMP, cooled, and poured into 150 liters of methanol to separate polymers as a precipitate. The precipitate was ground, washed twice with 50 liters of methanol, and dried under vacuum at 70° C. for 2 days and at 100° C. for 1 day to give 830 g of cardo polyimides [PI-BTDA-BAFL(4Me); molecular weight of repeating unit, 690.2] represented by the following structural formula.

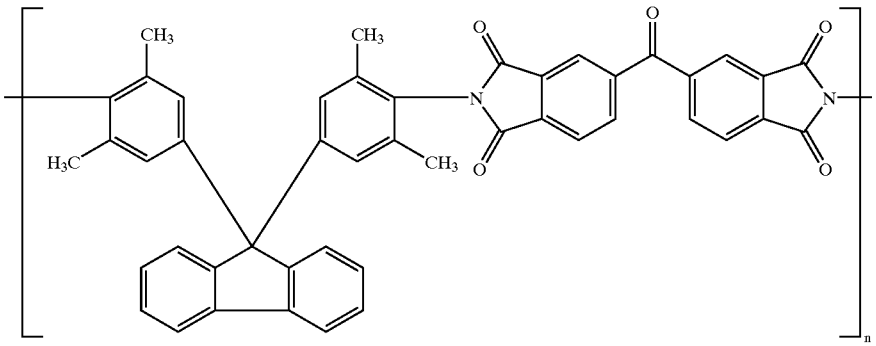

PI-BTDA-BAFL(4Me)

Using 27.5 g (40 millimoles) of the PI-BTDA-BAFL (4Me) and 51.3 g (288 millimoles) of NBS, the reaction for modification by bromine and purification were carried out as in Example 1 to give bromine-modified PI-BTDA-BAFL (4Me)-Br.

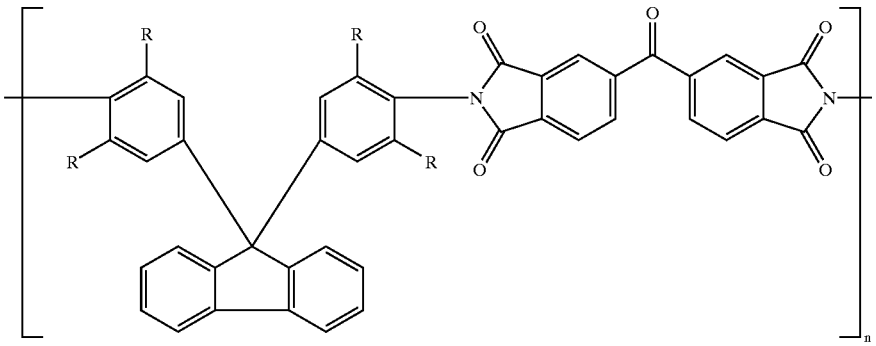

PI-BTDA-BAFL(4Me)-Br (R = —CH$_2$Br, —CH$_3$, —CHBr$_2$)

The structural analysis made on the bromine-modified product as in Example 1 confirmed that the product is bromine-modified cardo polyimides [PI-BTDA-BAFL (4Me)-Br] represented by the following structural formula. It is to be noted that there is the possibility of bromine atoms, although in small amounts, having been introduced to the aromatic rings in the repeating unit.

As the $^1$H-NMR analysis indicates, the intergrated values of the methylidyne proton in the benzyl position after dibromination, the methylene protons in the benzyl position after monobromination, and the methyl protons in the tolyl group in the absence of bromination are respectively 0.08, 6.00, and 1.82 and this confirms that the bromine-modified product is PI-BTDA-BAFL(4Me)-Br(28.6%) formed by partial di- and monobromination of the methyl groups in the tolyl groups.

[$^1$H-NMR analysis]

Ar—CH—Br$_2$ (δ: 6.3–6.6 ppm, br-m; integrated value, 0.08)

Ar—CH$_2$—Br (δ: 4.2–4.4 ppm, br-m; integrated value, 6.00)

Ar—CH$_3$ (δ: 2.0–2.2 ppm, br-m; integrated value, 1.82)

[Rate of modification by bromine] 28.6%

[Elemental analysis of Br] Br: 32.9%

[Number of bromine introduced to the benzyl position per repeating unit] Approximately 3.43

Membrane was made from 5 g of the PI-BTDA-BAFL (4Me)-Br(28.6%) as in Example 1 and gas permeabilities of the membrane of the bromine-modified cardo polyimides were as follows.

[Permeability coefficient of carbon dioxide]

$391 \times 10^{-18}$ m$^3$.m(m$^2$.s.Pa) (52.1 barrer)

[Permeability coefficient of nitrogen]

$9.8 \times 10^{-18}$ m$^3$.m/(m$^2$.s.Pa) (1.3 barrer)

[Carbon dioxide/nitrogen separation factor] 39

EXAMPLE 23

Using 27.5 g (40 millimoles) of the PI-BTDA-BAFL (4Me) prepared in Example 22 and 28.5 g (160 millimoles) of NBS, the reaction for modification by bromine, purification, and analysis were carried out as in Example 1. Approximately 15.6% of the 12 hydrogen atoms in the benzyl position was replaced by bromine atoms to give PI-BTDA-BAFL(4Me)-Br(15.6%).

[$^1$H-NMR analysis]

Ar—CH—Br$_2$ (δ: 6.4–6.6 ppm, br-m; integrated value, 0.00)

Ar—CH$_2$—Br (δ: 4.1–4.4 ppm, br-m; integrated value, 4.00)

Ar—CH$_3$ (δ: 1.8–2.4 ppm, br-m; integrated value, 6.81)

[Rate of modification by bromine] 15.6%

[Elemental analysis of Br] Br: 21.4%

[Number of bromine introduced to the benzyl position per repeating unit] Approximately 1.87

Membrane was made from the PI-BTDA-BAFL(4Me)-Br(15.6%) and gas permeabilities of the membrane of the bromine-modified cardo polyimides were as follows.

[Permeability coefficient of carbon dioxide]

788×10$^{-18}$m$^3$.m/(m$^2$.s.Pa) (105 barrer)

[Permeability coefficient of nitrogen]

2×10$^{-18}$m$^3$.m/(m$^2$.s.Pa) (0.3 barrer)

[Carbon dioxide/nitrogen separation factor] 35

EXAMPLE 24

Excessive Bromination of PI-BPDA-BAFL(4Me)

In 500 ml of 1,2-dichloroethane was dissolved 13.3 g (20 millimoles) of the PI-BPDA-BAFL(4Me) prepared in Example 1 at room temperature with one hour stirring, 51.3 g (288 millimoles) of NBS and 1.0 g of AIBN were added, and the reaction was allowed to proceed under reflux condition (the temperature of solution being approximately 90–100° C.) for 24 hours. Upon completion of the reaction, the reaction mixture was poured into 4.5 liters of methanol to separate polymers as a precipitate. The precipitate was collected, washed with grinding in a mixer with fresh addition of 1 liter of methanol, and further washed with methanol until the filtrate became colorless and transparent. Thereafter, the precipitate was dried under vacuum at 50° C. for 12 hours. Analysis in the same way as Example 1 shows that approximately 36.3% of the 12 hydrogen atoms in the benzyl position was replaced by bromine atoms to give PI-BPDA-BAFL(4Me)-Br(36.3%).

[$^1$H-NMR analysis]

Ar—CH—Br$^2$ (δ: 6.4–6.6 ppm, br-m; integrated value, 0.14)

Ar—CH$^2$—Br (δ: 4.1–4.4 ppm, br-m; integrated value, 2.00)

Ar—CH$^3$ (δ: 1.9–2.2 ppm, br-m; integrated value, 0.11)

[Rate of modification by bromine] 36.3%

[Elemental analysis of Br] Br: 38.8%

[Number of bromine introduced to the benzyl position per repeating unit] Approximately 4.35

Membrane was made from the PI-BPDA-BAFL(4Me)-Br(36.3%) and gas permeabilities of the membrane of the bromine-modified cardo polyimides were as follows.

[Permeability coefficient of carbon dioxide]

576×10$^{-18}$m$^3$.m/(m$^2$.s.Pa) (76.8 barrer)

[Permeability coefficient of nitrogen]

16×10$^{-18}$m$^3$.m/(m$^2$.s.Pa) (2.1 barrer)

[Carbon dioxide/nitrogen separation factor] 37

EXAMPLE 25

Excessive Bromination of PI-6FDA-BAFL(4Me)

Using 16.2 g (20 millimoles) of the PI-6FDA-BAFL(4Me) prepared in Example 4 and 51.3 g (288 millimoles) of NBS, the reaction for modification by bromine, purification, and analysis were carried out as in Example 24. Approximately 36.8% of the 12 hydrogen atoms in the benzyl position was brominated to give PI-6FDA-BAFL(4Me)-Br (36.8%).

[$^1$H-NMR analysis]

Ar—CH—Br$_2$ (δ: 6.4–6.6 ppm, br-m; integrated value, 0.16)

Ar—CH$_2$—Br (δ: 4.1–4.4 ppm, br-m; integrated value, 2.00)

Ar—CH$_3$ (δ: 1.9–2.2 ppm, br-m; integrated value, 0.11)

[Rate of modification by bromine] 36.8%

[Elemental analysis of Br] Br: 35.8%

[Number of bromine introduced to the benzyl position per repeating unit] Approximately 4.41

Membrane was made from the PI-6FDA-BAFL(4Me)-Br (36.8%) as in Example 1 and gas permeabilities of the membane of the bromine-modified cardo polyimides were as follows.

[Permeability coefficient of carbon dioxide]

930×10$^{-18}$m$^3$.m/(m$^2$.s.Pa) (124 barrer)

[Permeability coefficient of nitrogen]

29×10$^{-18}$m$^3$.m/(m$^2$.s.Pa) (3.9 barrer)

[Carbon dioxide/nitrogen separation factor] 32

EXAMPLE 26

Excessive Bromination of PI-BTDA-BAFL(4Me)

Using 13.8 g (20 millimoles) of the PI-BTDA-BAFL(4Me) prepared in Example 22 and 51.3 g (288 millimoles) of NBS, the reaction for modification by bromine, purification, and analysis were carried out as in Example 24. Approximately 35.6% of the 12 hydrogen atoms in the benzyl position was brominated to give PI-BTDA-BAFL(4Me)-Br(35.6%).

[$^1$H-NMR analysis]

Ar—CH—Br$_2$ (δ: 6.4–6.6 ppm, br-m; integrated value, 0.11)

Ar—CH$_2$—Br (δ: 4.1–4.4 ppm, br-m; integrated value, 2.00)

Ar—CH$_3$ (δ: 1.9–2.2 ppm, br-m; integrated value, 0.10)

[Rate of modification by bromine] 35.6%

[Elemental analysis of Br] Br: 35.5%

[Number of bromine introduced to the benzyl position per repeating unit] Approximately 4.27

Membrane was made from the PI-BTDA-BAFL(4Me)-Br(35.6%) as in Example 1 and gas permeabilities of the membrane of the bromine-modified cardo polyimides were as follows.

[Permeability coefficient of carbon dioxide]

215×10$^{-18}$m$^3$.m/(m$^2$.s.Pa) (28.7 barrer)

[Permeability coefficient of nitrogen]

5×10$^{-18}$m$^3$.m/(m$^2$.s.Pa) (0.7 barrer)

[Carbon dioxide/nitrogen separation factor] 40

EXAMPLE 27

Temperature for Elimination of Bromine

In order to examine the heat stability of bromine-modified cardo polyimides and the temperature at which bromine is eliminated, these properties were determined with the use of TG (thermogravimetry)-GC/MS method (TG-MS method and trap GC/MS method). The TG-MS (thermo(gravimetry-mass spectrometry) method uses a device in which a thermogravimetric instrument is directly connected to a mass spectrometer and determines the change in weight of the specimen and simultaneously keeps track of gases generated from the specimen during heating while recording the change in concentration for each mass number as a function of temperature. On the other hand, the trap GC/MS (gas chromatography/mass spectrometry) method traps a part of the gases generated inside the thermogravimetric instrument by an absorbent, reheats the absorbent, and analyzes the generated gases by GC/MS.

Specimens: PI-PMBP64-BAFL(4Me)-Br(29.0%), PI-BPDA-BAFL(4Me)-Br(27.6%), and PI-6FDA-BAFL(4Me)-Br(30.3%), all in powder Conditions for measurement:

Apparatus; TG-MS, devices working simultaneously

Atmosphere; stream of helium (30 ml/min)

Temperature range; room temperature→1000° C.

Heat-up speed; 20° C./min

Condition for thermal elimination; temperature 280° C., absorbent C300

As a results, it was observed for each specimen that the generation of HBr started in the vicinity of 300° C. and reached a peak in the vicinity of 440° C.

EXAMPLE 28

Synthesis of PI-BPDA-BAFL(4Me)-Cl

Using 26.5 g (40 millimoles) of the PI-BPDA-BAFL(4Me) prepared in Example 1 and 38.5 g (288 millimoles) of N-chlorosuccinimide (NCS), the reaction for modification by chlorine, purification, and analysis were carried out as in Example 1. Approximately 7.7% of the 12 hydrogen atoms in the benzyl position was chlorinated to give PI-BPDA-BAFL(4Me)-Cl(7.7%).

[$^1$H-NMR analysis]

Ar—CH$_2$—Cl ($\delta$: 4.3–4.5 ppm, br-m; integrated value, 2.00)

Ar—CH$_3$ ($\delta$: 1.9–2.2 ppm, br-m; integrated value, 10.01)

[Rate of modification by chlorine] 7.7%

[Elemental analysis of Cl] Cl: 5.0%

[Number of chlorine introduced to the benzyl position per repeating unit]. Approximately 0.92.

Membrane was made from the PI-BPDA-BAFL(4Me)-Cl(7.7%) and gas permeabilities of the members of the chlorine-modified cardo polyimides were as follows.

[Permeability coefficient of carbon dioxide]

4140×10$^{-18}$m$^3$.m/(m$^2$.s.Pa) (552 barrer)

[Permeability coefficient of nitrogen]

148×10$^{-18}$m$^3$.m/(m$^2$.s.Pa) (19.7 barrer)

[Carbon dioxide/nitrogen separation factor] 28

EXAMPLE 29

Synthesis of PI-PMBP64-BAFl(4Me)-Cl

Using 24.7 g (40 millimoles) of the PI-PMBP64-BAFL(4Me) prepared in Example 7 and 38.5 g (288 millimoles) of NCS, the reaction for modification by chlorine, purification, and analysis were carried out as in Example 27. Approximately 7.0% of the 12 hydrogen atoms in the benzyl position was chlorinated to give PI-PMBP64-BAFL(4Me)-Cl(7.0%).

[$^1$H-NMR analysis]

Ar—CH$_2$—Cl ($\delta$: 4.3–4.5 ppm, br-m; integrated value, 2.00)

Ar—CH$_3$ ($\delta$: 1.9–2.2 ppm, br-m; integrated value, 11.26)

[Rate of modification by chlorine] 7.0%

[Elemental analysis of Cl] Cl: 4.8%

[Number of bromine introduced to the benzyl position per repeating unit]. Approximately 0.84.

Membrane was made from the PI-PMBP64-BAFL(4Me)-Cl (7.0%) and gas permeabilities of the membrane of the chlorine-modified cardo polyimides were as follows.

[Permeability coefficient of carbon dioxide]

5570×10$^{-18}$m$^3$.m/(m$^2$.s.Pa) (743 barrer)

[Permeability coefficient of nitrogen]

215×10$^{-18}$m$^3$.m/(m$^2$.s.Pa) (28.6 barrer)

[Carbon dioxide/nitrogen separation factor] 26

EXAMPLE 30

Synthesis of PI-BPDA-BAFL(4Et)-Br

Using 9,9-bis(3',5'-diethyl-4-aminophenyl)fluorene [BAFL(4Et)] and BPDA, the polymerization was carried out as in Example 1 to give PI-BPDA-BAFL(4Et) represented by the following structural formula.

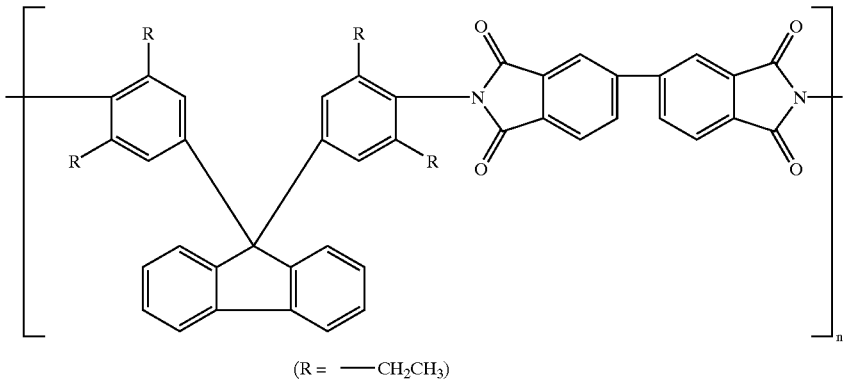

Using the PI-BPDA-BAFL(4Et) thus obtained and NBS, the reaction for modification by bromine, purification, and analysis were carried out as in Example 1. Several % of the 12 hydrogen atoms in the benzyl position was brominated to give PI-BPDA-BAFL(4Et)-Br represented by the following structural formula.

PI-BPDA-BAFL(4Et)-Br

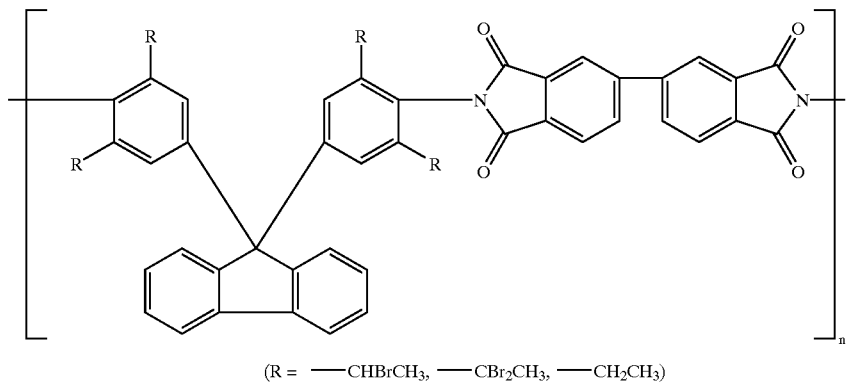

(R = —CHBrCH$_3$, —CBr$_2$CH$_3$, —CH$_2$CH$_3$)

Membrane was made from the PI-BPDA-BAFL(4Et)-Br as in Example 1 and, as for gas permeabilities, the membrane of the bromine-modified cardo polyimides showed somewhat lower permeability coefficients of carbon dioxide and nitrogen but improved carbon dioxide/nitrogen separation factor compared with PI-BPDA-BAFl(4Et):

EXAMPLE 31

Synthesis of PI-6FDA-BAAN(4Me)-Br

Using 9,9-bis(3',5'-dimethyl-4'-aminophenyl)anthrone-10 [BAAN(4Me)] and 6FDA in equimolar amounts, the polymerization was carried out in accordance with a general condensation reaction such as shown in Example 1 to give PI-6FDA-BAAN(4Me) represented by the following structural formula.

PI-6FDA-BAAN(4Me)

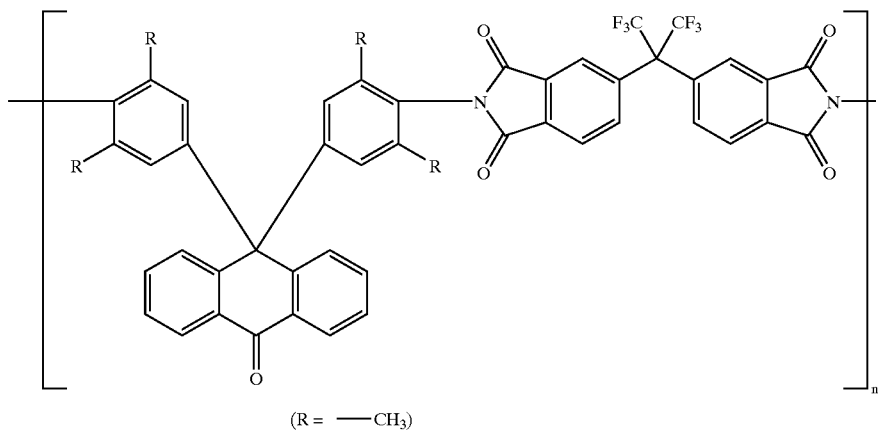

(R = —CH$_3$)

Using the PI-6FDA-BAAN(4Me) and NBS, the reaction for modification by bromine, purification, and analysis were carried out as in Example 1. Several % of the 12 hydrogen atoms in the benzyl position was brominated to give PI-6FDA-BAAN(4Me)-Br represented by the following structural formula.

PI-6FDA-BAAN(4Me)-Br

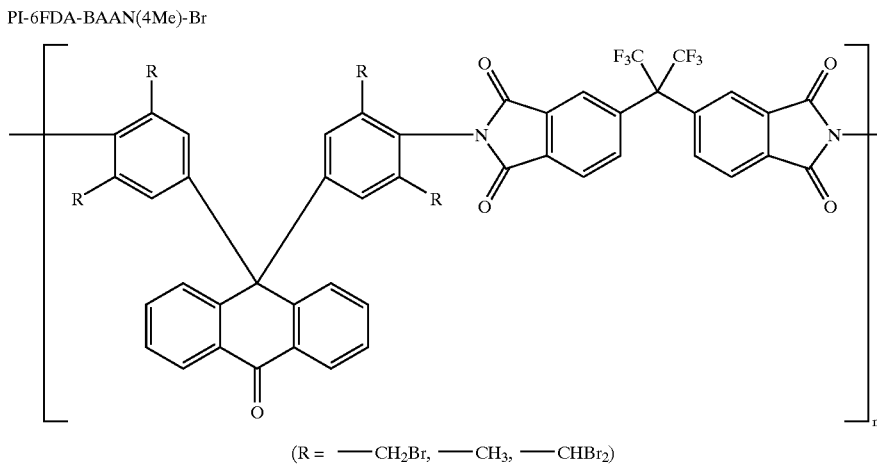

(R = —CH$_2$Br, —CH$_3$, —CHBr$_2$)

Membrane was made from the PI-6FDA-BAAN(4Me)-Br as in Example 1 and, as for gas permeabilities, the membrane of the bromine-modified cardo polyimides showed somewhat lower permeability coefficients of carbon dioxide and nitrogen but improved carbon dioxide/nitrogen separation factor compared with PI-6FDA-BAAN(4Me).

EXAMPLE 32

Synthesis of PI-BPDA-BAMe(4Me)-Br

Using 1,1-bis(3',5'-dimethyl-4'-aminophenyl)-4-methylcyclohexane [BAME(4Me)] and BPDA in equimolar amounts, the polymerization was carried out in accordance with a general condensation reaction such as shown in Example 1 to give PI-BPDA-BAME(4Me) represented by the following structural formula.

PI-BPDA-BAMe(4Et)

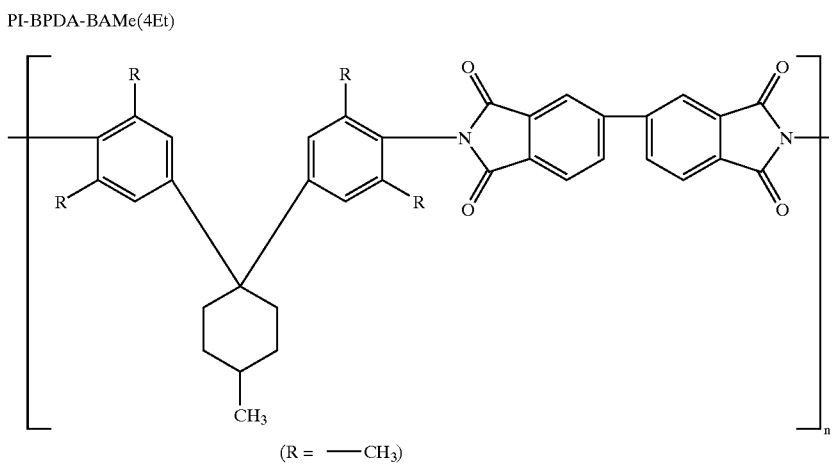

(R = —CH$_3$)

Using the PI-BPDA-BAME(4Me) and NBS, the reaction for modification by bromine, purification, and analysis were carried out as in Example 1. Several % of the 12 hydrogen atoms in the benzyl position was brominated to give PI-BPDA-BAME(4Me)-Br represented by the following structural formula.

Using the PA-BAFL(4Me) and NBS, the reaction for modification by bromine, purification, and analysis were carried out as in Example 1. Several % of the 12 hydrogen atoms in the benzyl position was brominated to give PA-BAFL(4Me)-Br represented by the following structural formula.

PI-BPDA-BAMe(4Et)-Br

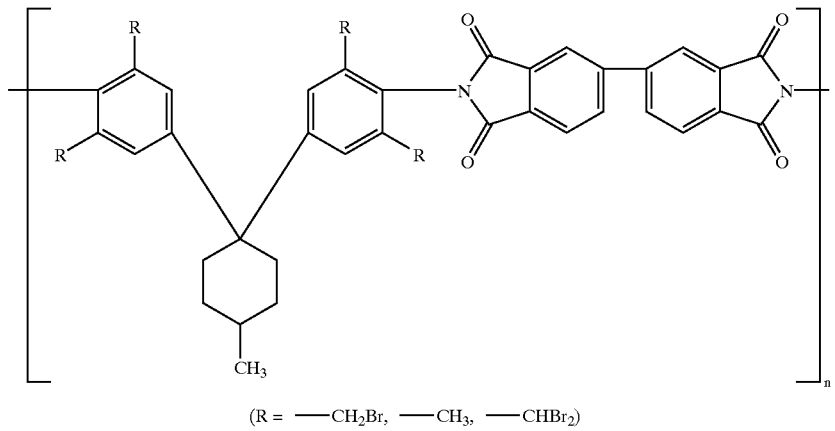

(R = —CH$_2$Br, —CH$_3$, —CHBr$_2$)

Membrane was made from the PI-BPDA-BAME(4Me)-Br as in Example 1 and, as for gas permeabilities, the membrane of the bromine-modified cardo polyimides showed somewhat lower permeability coefficients of carbon dioxide and nitrogen but improved carbon dioxide/nitrogen separation factor compared with PI-BPDA-BAME(4Me).

EXAMPLE 33

Synthesis of PA-BAFL(4Me)-Br

In a solvent such as dimethylacetamide (DMAc) was dissolved 9,9-bis(3',5'-dimethyl-4'-aminophenyl)fluorene [BAFL(4Me)] and, according to a general polymerization procedure for the preparation of polyamides, the solution was treated with an equimolar amount of terephthaloyl dichloride at low temperature to give polyamides PA-BAFL(4Me) represented by the following general formula.

PA-BAFL(4Me)

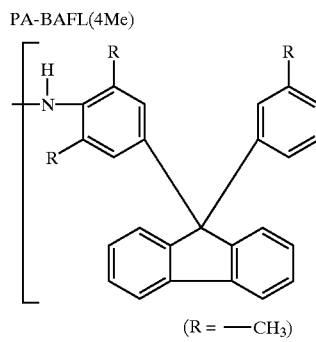

(R = —CH$_3$)

PA-BAFL(4Me)-Br

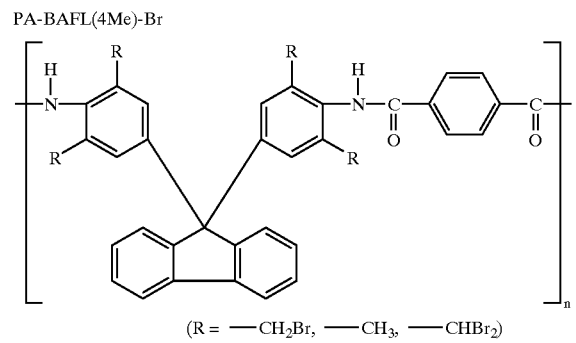

(R = —CH$_2$Br, —CH$_3$, —CHBr$_2$)

Membrane was made from PA-BAFL(4Me)-Br as in Example 1 and, as for gas permeabilities, the membrane of the bromine-modified cardo polyamides showed somewhat lower permeability coefficients of carbon dioxide and nitrogen but improved carbon dioxide/nitrogen separation factor compared with PA-BAFL(4Me).

EXAMPLE 34

Synthesis of PA-BAPI(4Me)-Br

Using 3,3-bis(3',5'-dimethyl-4'-aminophenyl)phthalide [BAPI(4Me)] and isophthaloyl dichloride in equimolar amounts, the polymerization reaction for the preparation of polyamides was carried out as in Example 33 to give polyamides PA-BAPI(4Me) represented by the following structural formula.

PA-BAPI(4Me)

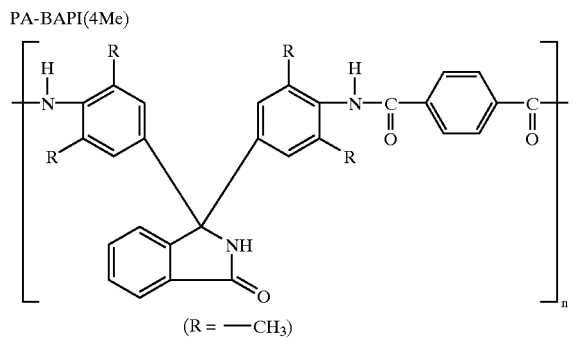

(R = —CH$_3$)

Using the PA-BAPI(4Me) and NBS, the reaction for modification by bromine, purification, and analysis were carried out as in Example 1. Several % of the 12 hydrogen atoms in the benzyl position was brominated to give PA-BAPI(4Me)-Br represented by the following structural formula.

PA-BAPI(4Me)-Br

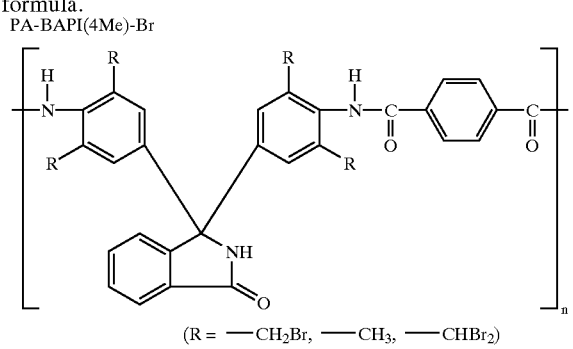

(R = —CH$_2$Br, —CH$_3$, —CHBr$_2$)

Membrane was made from the PA-BAPI(4Me)-Br as in Example 1 and, as for gas permeabilities, the membrane of the bromine-modified cardo polyamides showed somewhat lower permeability coefficients of carbon dioxide and nitrogen but improved carbon dioxide/nitrogen separation factor compared with PA-BAPI(4Me).

EXAMPLE 35

Synthesis of PS-BHCH(4Me)-Br

Polyethersulfones PS-BHCH(4Me) represented by the following structural formula were obtained by a synthetic method for preparing polyethersulfones by an aromatic nucleophilic substitution reaction, for example, by refluxing 1,2-bis(3',5'-dimethyl-4'-hydroxyphenyl)cyclohexane [BHCH(4Me)] together with an equimolar amount of bis(4-chlorophenyl)sulfone and an amount slightly exceeding equimolar of potassium carbonate in dimethylacetamide (DMAc)-toluene, then removing the toluene under reduced pressure, and heating the mixture further at 160° C. for 10–12 hours.

PS-BHCH(4Me)

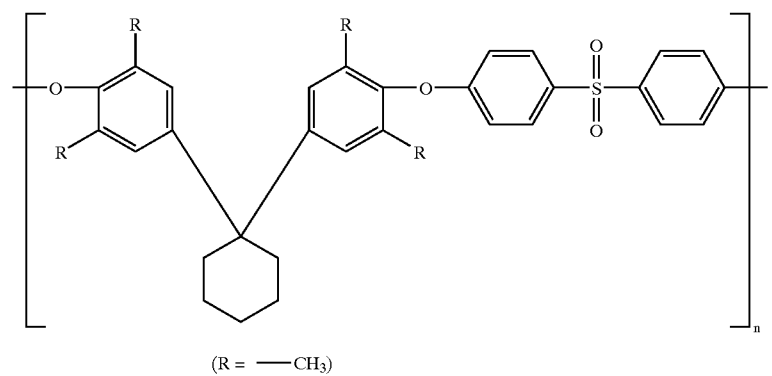

(R = —CH$_3$)

Using the PS-BHCH(4Me) and NBS, the reaction for modification by bromine, purification, and analysis were carried out as in Example 1. Several % of the 12 hydrogen atoms in the benzyl position was brominated to give PS-BHCH(4Me)-Br represented by the following structural formula.

Using the PS-BHCHE and NBS, the reaction for modification by bromine, purification, and analysis were carried out as in Example 1. Several % of the 4 hydrogen atoms in the allyl position was brominated to give PS-BHCHE-Br represented by the following structural formula.

PS-BHCH(4Me)-Br

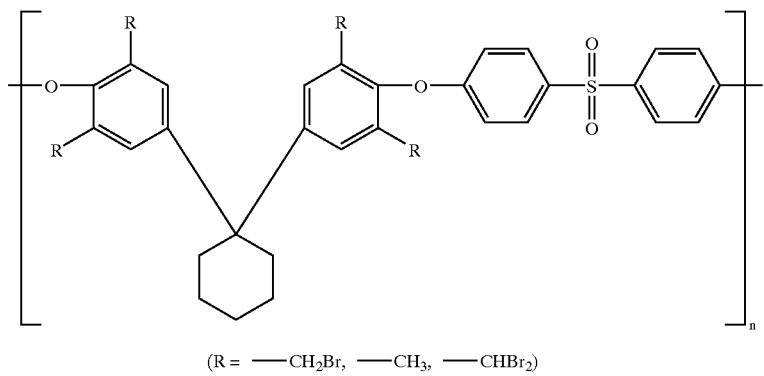

(R = ——$CH_2Br$, ——$CH_3$, ——$CHBr_2$)

Membrane was made from the PA-BHCH(4Me)-Br as in Example 1 and, as for gas permeabilities, the membrane of the bromine-modified cardo polyethersulfones showed somewhat lower permeability coefficients of carbon dioxide and nitrogen but improved carbon dioxide/nitrogen separation factor compared with PS-BHCH(4Me).

EXAMPLE 36

Synthesis of PS-BHCHE-Br

Polyethersulfones PS-BHCHE represented by the following structural formula were obtained by a synthetic method for preparing polyethersulfones by an aromatic nucleophilic substitution reaction, for example, by protecting the double bond of 1,1-bis(4'-hydroxyphenyl)-3-cyclohexene [BHCHE], refluxing the protected BHCHE together with an equimolar amount of bis(4-chlorophenyl)sulfone and an amount slightly exceeding equimolar of potassium carbonate in dimethylacetamide-toluene, then removing the toluene under reduced pressure, and heating the mixture further at 160° C. for 10–12 hours.

PS-BHCHE

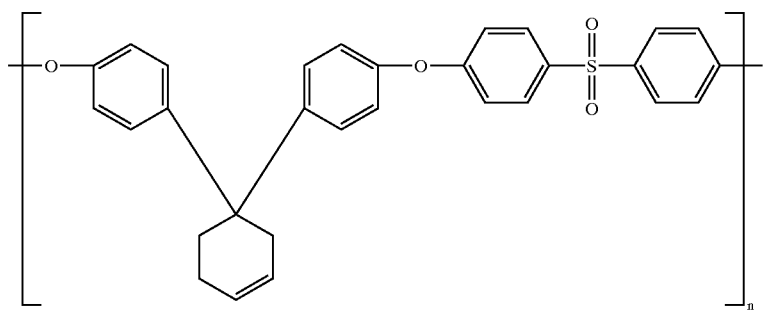

PS-BHCHE-Br

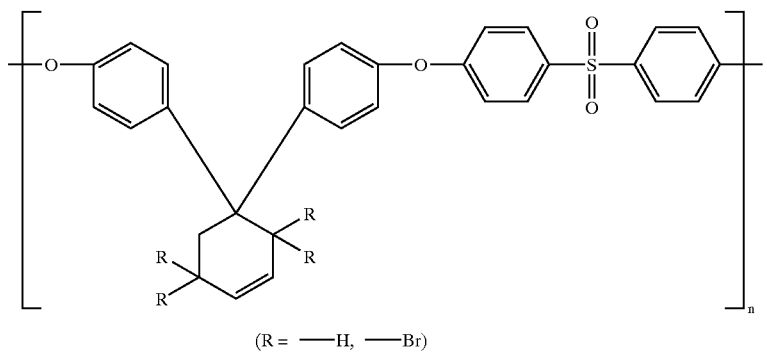

(R = ——H, ——Br)

Membrane was made from the PS-BHCHE-Br as in Example 1 and, as for gas permeabilities, the membrane of the bromine-modified cardo polyether-sulfones showed somewhat lower permeability coefficients of carbon dioxide and nitrogen but improved carbon dioxide/nitrogen separation factor compared with PS-BHCHE.

EXAMPLE 37

Synthesis of PPO(2Me)-Br

Following a procedure for polymerization by oxidative coupling, oxygen was passed through a solution of 2,6-dimethylphenol in nitrobenzene at 25–50° C. in the presence of a copper chloride(I)-amine complex catalyst to give PPO(2Me) represented by the following structural formula.

PPO(2Me)

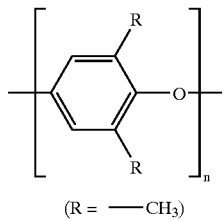

(R = ——$CH_3$)

Using the PPO(2Me) and NBS, the reaction for modification by bromine, purification, and analysis were carried out as in Example 1. Several % of the 6 hydrogen atoms in the benzyl position was brominated to give PPO(2Me)-Br represented by the following structural formula.

PPO(2Me)-Br

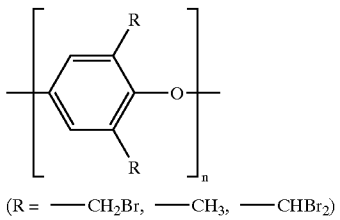

(R = ——$CH_2Br$, ——$CH_3$, ——$CHBr_2$)

Membrane was made from the PPO(2Me) as in Example 1 and, as for gas permeabilities, the membrane of the bromine-modified poly(p-phenylene) showed somewhat lower permeability coefficients of carbon dioxide and nitrogen but improved carbon dioxide/nitrogen separation factor compared with PPO(2Me).

EXAMPLE 38

Synthesis of PI-BPDA-ODA(4Me)-Br

Using bis(3,5-dimethyl-4-aminophenyl)ether and BPDA in equimolar amounts, a general procedure for the condensation reaction for preparing polyimides such as shown in Example 1 was followed to give PI-BPDA-ODA(4Me) represented by the following structural formula.

PI-BPDA-ODA(4Me)

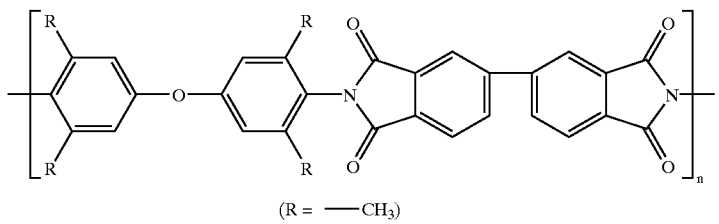

(R = ——$CH_3$)

Using the PI-BPDA-ODA(4Me) thus obtained and NBS, the reaction for modification by bromine, purification, and analysis were carried out as in Example 1. Several % of the 12 hydrogen atoms in the benzyl position was brominated to give PI-BPDA-ODA(4Me)-Br represented by the following structural formula.

PI-BPDA-ODA(4Me)-Br

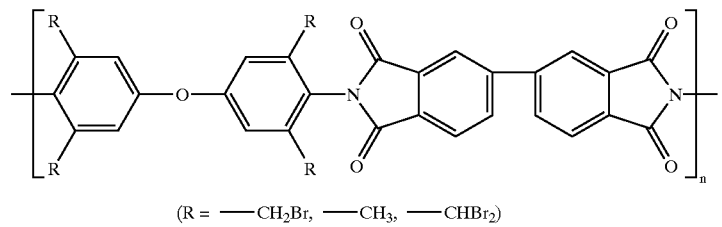

(R = —CH$_2$Br, —CH$_3$, —CHBr$_2$)

Membrane was made from the PI-BPDA-ODA(4Me)-Br as in Example 1 and, as for gas permeabilities, the membrane of the bromine-modified polyimides showed somewhat lower permeability coefficients of carbon dioxide and nitrogen but improved carbon dioxide/nitrogen separation factor compared with PI-BPDA-ODA(4Me).

EXAMPLE 39

Synthesis of PI-BPDA-BNFL(2Me)-Br

Using 9,9-bis(methyl-4'-aminonaphthyl)fluorene [BNFL(2Me)] and BPDA in equimolar amounts, a general procedure for the condensation reaction for preparing polyimides such as shown in Example 1 was followed to give PI-BPDA-BNFL(2Me) represented by the following structural formula.

PI-BPDA-BNFL(2Me)

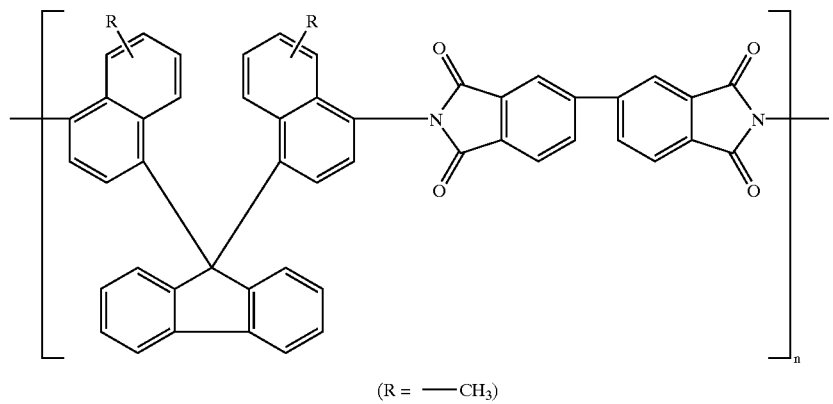

(R = —CH$_3$)

Using the PI-BPDA-BNFL(2Me) thus obtained and NBS, the reaction for modification by bromine, purification, and analysis were carried out as in Example 1. Several % of the 6 hydrogen atoms in the benzyl position was brominated to give PI-BPDA-BNFL(2Me)-Br represented by the following structural formula.

PI-BPDA-BNFL(2Me)-Br

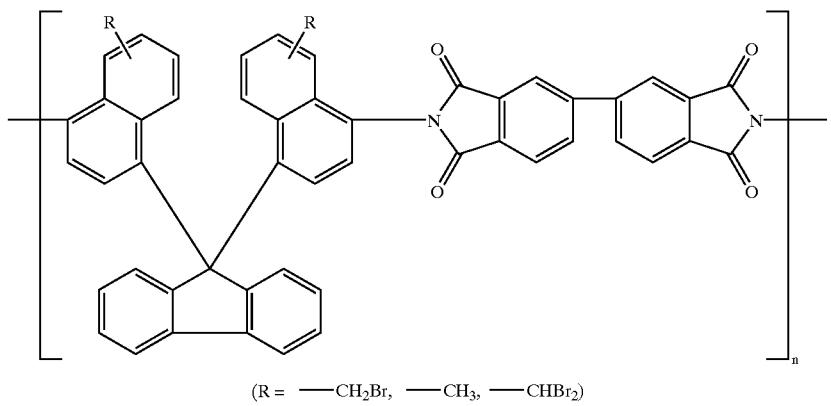

(R = —CH$_2$Br, —CH$_3$, —CHBr$_2$)

Membrane was made from the PI-BPDA-BNFL(2Me)-Br as in Example 1 and, as for gas permeabilities, the membrane of the bromine-modified cardo polyimides showed somewhat lower permeability coefficients of carbon dioxide and nitrogen but improved carbon dioxide/nitrogen separation factor compared with PI-BPDA-BNFL(2Me).

EXAMPLE 40

Synthesis of PI-BPDA-BAMFL(2Me)-Br

Using dimethylated 9,9-bis(1'-aminomethyl)fluorene [BAMFL(2Me)] and BPDA in equimolar amounts, a general procedure for the condensation reaction for preparing polyimides such as shown in Example 1 was followed to give PI-BPDA-BAMFL(2Me) represented by the following structural formula.

and analysis were carried out as in Example 1. Several % of the 6 hydrogen atoms in the benzyl position was brominated to give PI-BPDA-BAMFL(2Me)-Br represented by the following structural formula.

PI-BPDA-BAMFL(2Me)

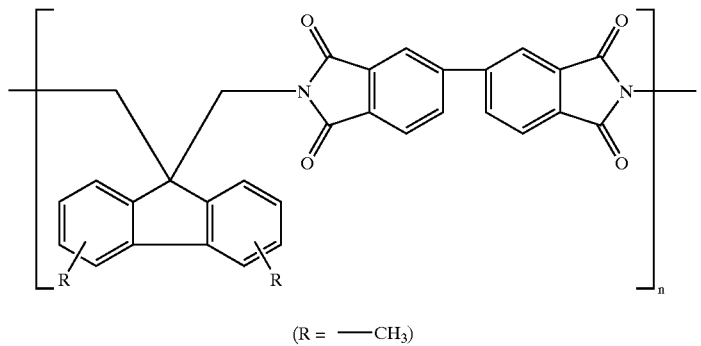

(R = —CH$_3$)

Using the PI-BPDA-BAMFL(2Me) thus obtained and NBS, the reaction for modification by bromine, purification, PI-BPDA-BAMFL(2Me)-Br

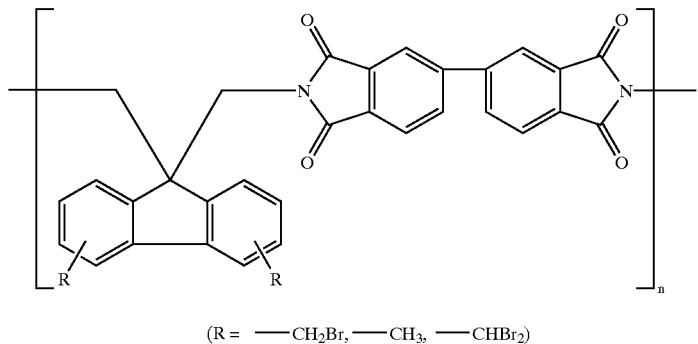

(R = —CH₂Br, —CH₃, —CHBr₂)

Membrane was made from the PI-BPDA-BAMFL(2Me)-Br as in Example 1 and, as for gas permeabilities, the membrane of the bromine-modified cardo polyimides showed somewhat lower permeability coefficients of carbon dioxide and nitrogen but improved carbon dioxide/nitrogen separation factor compared with PI-BPDA-BAMFL(2Me).

EXAMPLE 41

Synthesis of PI-BPDA-BACHE-Br

Using 1,1-bis(4'-aminophenyl)-3-cyclohexene [BACHE] whose double bond is protected and BPDA in equimolar amounts, a general procedure for the condensation reaction for preparing polyimides such as shown in Example 1 was followed and the resulting polymers were deprotected to give PI-BPDA-BACHE represented by the following structural formula.

PI-BPDA-BACHE

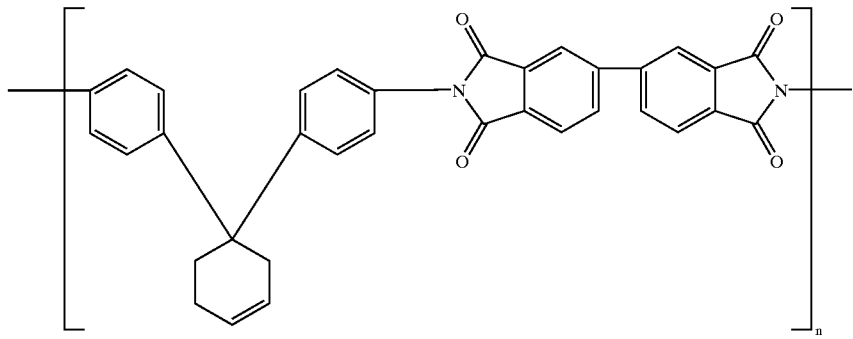

Using the PI-BPDA-BACHE thus obtained and NBS, the reaction for modification by bromine, purification, and analysis were carried out as in Example 1. Several % of the 4 hydrogen atoms in the allyl position was brominated to give PI-BPDA-BACHE-Br represented by the following structural formula.

PI-BPDA-BACHE-Br

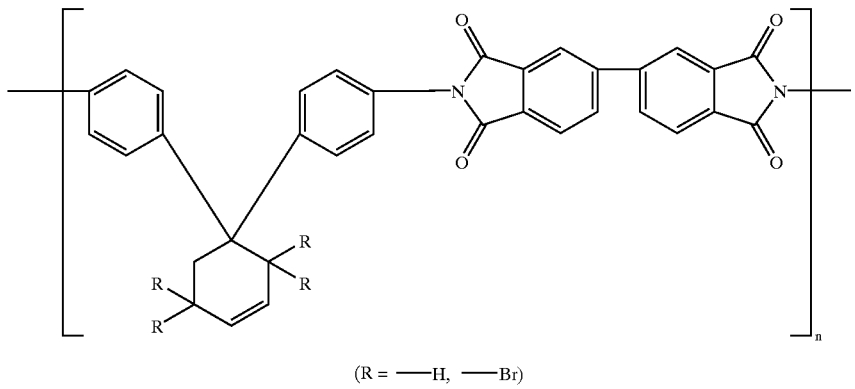

(R = ––H, ––Br)

Membrane was made from the PI-BPDA-BACHE-Br as in Example 1 and, as for gas permeabilities, the membrane of the bromine-modified cardo polyimides showed somewhat lower permeability coefficients of carbon dioxide and nitrogen but improved carbon dioxide/nitrogen separation factor compared with PI-BPDA-BACHE.

EXAMPLE 42

Synthesis of PA-BAPI(4Me)-Br

The PI-BPDA-BACHE-Br prepared in Example 41 was dissolved in tetrahydrofuran (THF) and treated with four times in mole of tetrabutylammonium isothiocyanate to effect partial replacement of the bromine atoms in the allyl position by isothiocyanato groups and give isothiocyanato-modified cardo polyimides represented by the following structural formula.

EXAMPLE 43

Synthesis of Bromine-modified Natural Rubber

Using natural rubber (polyisoprene) represented by the following structural formula,

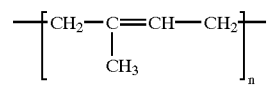

the reaction for modification by bromine, purification, and analysis were carried out as in Example 1. Several % of the 7 hydrogen atoms in the allyl position was brominated to give bromine-modified natural rubber represented by the following structural formula.

(R = ––SCN, ––H, ––Br)

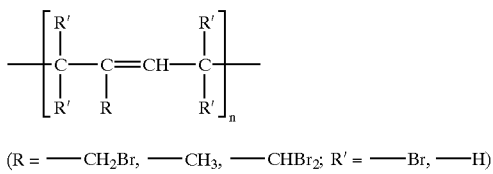

(R = ——CH$_2$Br, ——CH$_3$, ——CHBr$_2$; R' = ——Br, ——H)

EXAMPLE 44

Synthesis of PFL(2Me)-Br

Dimethylated methylidenefluorene [FL(2Me)] was subjected to addition polymerization to give polymethylidenefluorene [PFL(2Me)] represented by the following structural formula.

PFL(2Me)

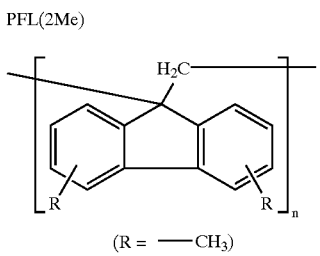

(R = ——CH$_3$)

Using the PFL(2Me) thus obtained and NBS, the reaction for modification by bromine, purification, and analysis were carried out as in Example 1. Several % of the 6 hydrogen atoms in the benzyl position was brominated to give PFL(2Me)-Br represented by the following structural formula.

PFL(2Me)-Br

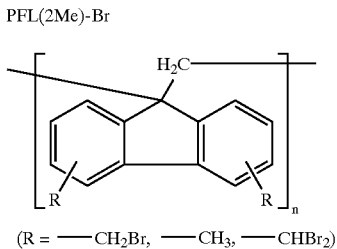

(R = ——CH$_2$Br, ——CH$_3$, ——CHBr$_2$)

Membrane was made from the PFL(2Me)-Br as in Example 1 and, as for gas permeabilities, the membrane of the bromine-modified polymethylidene-fluorene showed somewhat lower permeability coefficients of carbon dioxide and nitrogen but improved carbon dioxide/nitrogen separation factor compared with PFL(2Me).

EXAMPLE 45

Synthesis of PPHTL(Me)-Br

Methylated methylidenephthalide [PHTL(Me)] was subjected to addition polymerization to give polymethylidenephthalide [PPHTL(Me)] represented by the following formula.

PPHTL(Me)

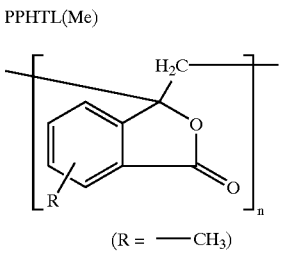

(R = ——CH$_3$)

Using the PPHTL(Me) thus obtained and NBS, the reaction for modification by bromine, purification, and analysis were carried out as in Example 1. Several % of the 3 hydrogen atoms in the benzyl position was brominated to give PPHTL(Me)-Br represented by the following structural formula.

PPHTL(Me)-Br

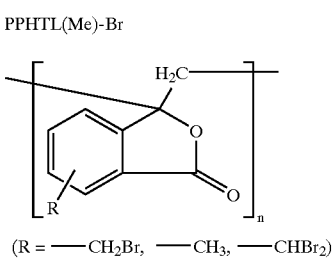

(R = ——CH$_2$Br, ——CH$_3$, ——CHBr$_2$)

Membrane was made from the PPHTL(Me)-Br as in Example 1 and, as for gas permeabilities, the membrane of the bromine-modified cardo polyimides modified polymethylidene-phthalide showed somewhat lower permeability coefficients of carbon dioxide and nitrogen but improved carbon dioxide/nitrogen separation factor compared with PPHTL(Me).

EXAMPLE 46

Synthesis of PA-BAMFL(2Me)-Br

Using dimethylated 9,9-bis(1'-aminomethyl)fluorene [BAMFL(2Me)] and terephthaloyl dichloride in equimolar amounts, a general procedure for preparing polyimides as shown in Example 33 was followed to give PA-BAMFL(2Me) represented by the following structural formula.

PA-BAMFL(2Me)

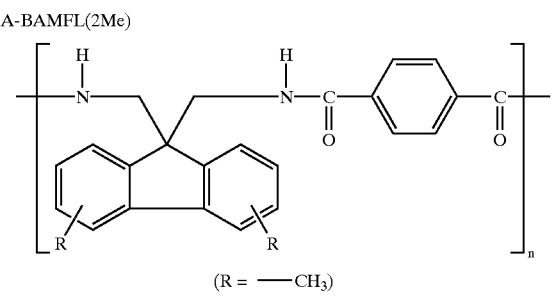

(R = ——CH$_3$)

Using the PA-BAMFL(2Me) thus obtained and NBS, the reaction for modification by bromine, purification, and analysis were carried out as in Example 1. Several % of the 6 hydrogen atoms in the benzyl position was brominated to give PA-BAMFL(2Me)-Br represented by the following structural formula.

PA-BAMFL(2Me)-Br

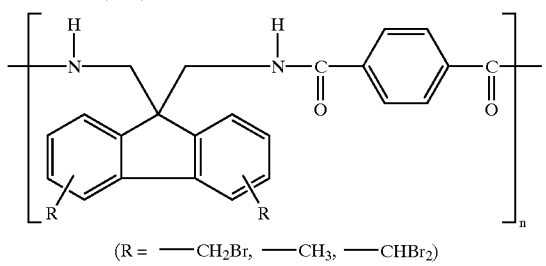

(R = —CH$_2$Br, —CH$_3$, —CHBr$_2$)

Membrane was from the PA-BAMFL(2Me)-Br as in Example 1 and, as for gas permeabilities, the membrane of the bromine-modified cardo polyimides showed somewhat lower permeability coefficients of carbon dioxide and nitrogen but improved carbon dioxide/nitrogen separation factor compared with PA-BAMFL(2Me).

EXAMPLE 47

Preparation and Performance of Asymmetric Hollow Fiber Membrane

Asymmetric hollow-fiber membranes were made continuously from the PI-PMBP64-BAFL(4Me)-Br(29.0%) prepared in Example 7 in an apparatus for making hollow-fiber membranes equipped with a double-ring spinneret. A solution of the PI-PMBP64-BAFL(4Me)-Br(29.0%) in N-methylpyrrolidone (NMP) was forced through the outer annular orifice of the double-ring spinneret and, at the same time, deionized water as a bore liquid was forced through the inner circular orifice; the two jets were guided into a solvent-removing vessel filled with deionized water to form asymmetric hollow-fiber membranes having an acitve layer for gas separation inside the hollow fiber. The hollow-fiber membranes were stripped of the remaining solution in deionized water, dried, heated at approximately 300° C. for 30 minutes, bundled, and packed in a housing to prepare a module.

The module of asymmetric hollow-fiber membranes was tested for the rate of permeation of gases at 35° C. (308 K) and at a pressure difference of 1 atmosphere ($1.0 \times 10^5$ Pa) in a reduced presssure type instrument for measuring the rare of permeation of gases equipped with a gas chromatograph as a detector. The results were as follows.
[Rate of permeation of carbon dioxide]
$38 \times 10^{-16}$ m$^3$/(m$^2$.s.Pa)
[$5.0 \times 10^{-4}$ cm$^3$(STP)/(cm$^2$.s.cmHg)]
[Rate of permeation of nitrogen]
$1.1 \times 10^{-16}$ m$^3$/(m$^2$.s.Pa)
[$0.14 \times 10^{-4}$ cm$^3$(STP)/(cm$^2$.s.cmHg)]
[Carbon dioxide/nitrogen separation factor] 35

Comparative Example 1

In 50 ml of NMP was dissolved 5 g of the PI-BPDA-BAFL(4Me) prepared in Example 1 by heating at 80° C. and the solution was cast on a glass plate in a uniform thickness and dried in a dryer at 60° C. for 1 hour and at 80° C. for 5 hours. Thereafter, the dried glass plate was immersed in distilled water and the film was peeled off the glass plate and dried in a vacuum dryer at 210° C. for 12 hours. Thus the cardo polyimides PI-BPDA-BAFL(4Me) were made into membrane.

Gas permeabilities of the cardo polyimide membrane thus made were as follows.
[Permeability coefficient of nitrogen]
$171 \times 10^{-18}$ m$^3$.m/(m$^2$.s.Pa) (22.8 barrer)
[Carbon dioxide/nitrogen separation factor] 22

Comparative Example 2

The cardo polyimides PI-6FDA-BAFL(4Me) prepared in Example 4 were made into membrane as in Comparative Example 1.

Gas permeabilities of the cardo polyimide membrane thus made were as follows.
[Permeability coefficient of carbon dioxide]
$6470 \times 10^{-18}$ m$^3$.m/(m$^2$.s.Pa) (862 barrer)
[Permeability coefficient of nitrogen]
$326 \times 10^{-18}$ m$^3$.m/(m$^2$.s.Pa) (43.5 barrer)
[Carbon dioxide/nitrogen separation factor] 20

Comparative Example 3

The cardo polyimides PI-PMBP64-BAFL(4Me) prepared in Example 7 were made into membrane as in Comparative Example 1.

Gas permeabilities of the cardo polyimide membrane thus made were as follows.
[Permeability coefficient of carbon dioxide]
$7800 \times 10^{-18}$ m$^3$.m/(m$^2$.s.Pa) (1040 barrer)
[Permeability coefficient of nitrogen]
$339 \times 10^{-18}$ m$^3$.m/(m$^2$.s.Pa) (45.2 barrer)
[Carbon dioxide/nitrogen separation factor] 23

Comparative Example 4

The cardo polyimides PI-BTDA-BAFL(4Me) prepared in Example 22 were made into membrane as in Comparative Example 1.

Gas permeabilities of the cardo polyimide membrane thus made were as follows.
[Permeability coefficient of carbon dioxide]
$2240 \times 10^{-18}$ m$^3$.m/(m$^2$.s.Pa) (298 barrer)
[Permeability coefficient of nitrogen]
$74 \times 10^{-18}$ m$^3$.m/(m$^2$.s.Pa) (9.9 barrer)
[Carbon dioxide/nitrogen separation factor] 30
[Relationship Between the Amount of NBS Used and the Degree of Modification by Bromine]

Figure 3:
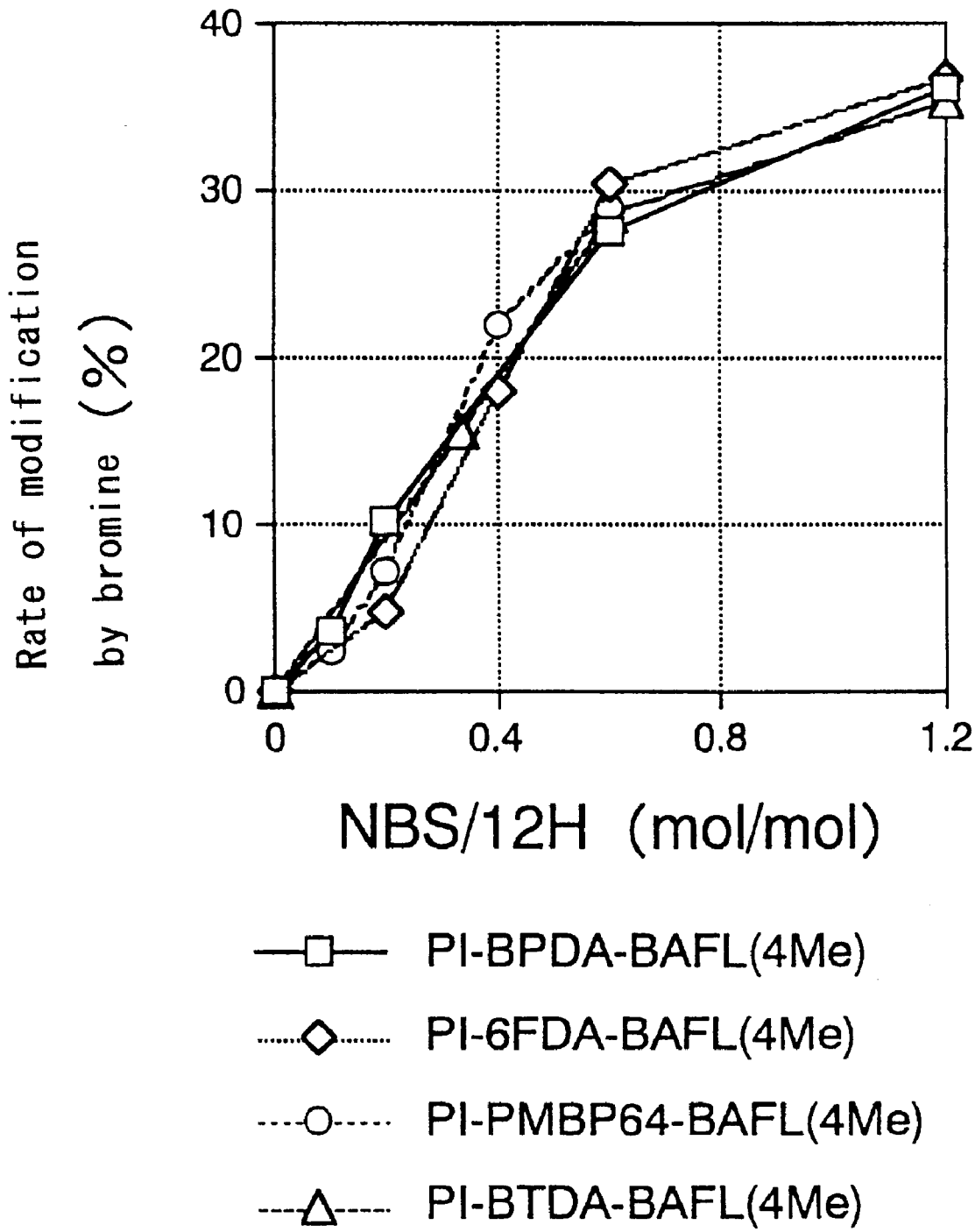
FIG. 3 is a graph showing the relationship between the amount of NBS used [molar ratio (NBS/12H)] and the rate of modification by bromine in the bromination reactions carried out in Examples 1 to 10 and 22 to 26.

In respect to the bromination reactions with the use of NBS in the aforementioned Examples 1 to 10 and 22 to 26, the relationship between the amount of NBS used and the rate of modification by bromine is illustrated in FIG. 3 in terms of the relationship between the molar ratio of NBS in use to the hydrogen atoms in the four methyl groups represented by $R_{12}$, $R_{14}$, $R_{17}$, and $R_{19}$ in the structural formula (A) in the general formula (1) (or 12 hydrogen atoms in the benzyl positions) or the molar ratio (NBS/12H) and the rate of modification by bromine.

The results shown in FIG. 3 clearly prove that the bromination of hydrogen atoms in the benzyl position in cardo polyimides can be controlled easily by the amount of the brominating agent NBS in use.
[Relationship Between the Rate of Modification by Bromine and the $CO_2/N_2$ Separation Factor (α)]

Figure 4:
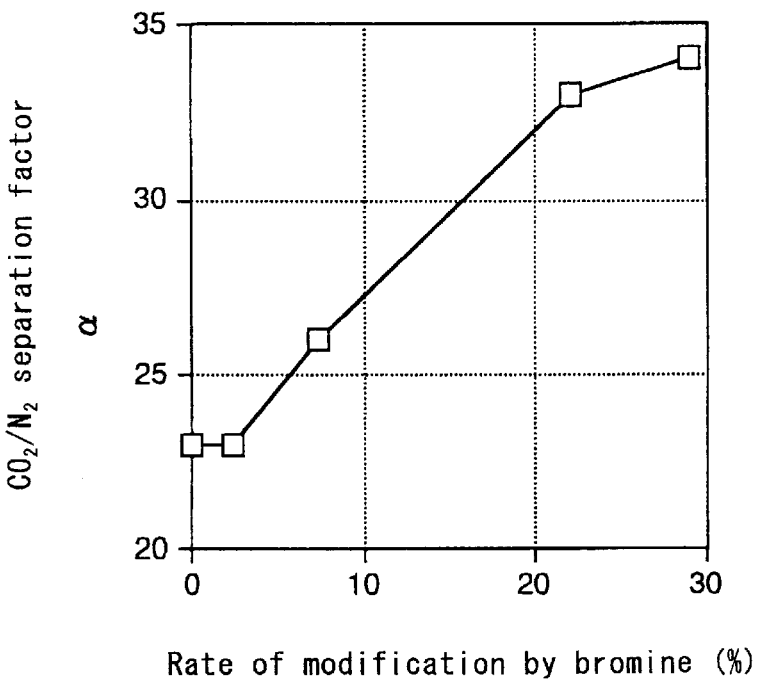
FIG. 4 is a graph showing the relationship between the rate of modification by bromine and the gas selectivity ($\alpha$, $CO_2/N_2$ separation factor) in Examples 7 to 10 and Comparative Example 3.

The relationship between the rate of modification by bromine and the $CO_2/N_2$ separation factor is shown in FIG. 4 for Examples 7 to 10 and Comparative Example 3.

The results shown in FIG. 4 indicate that the $CO_2/N_2$ separation factor improves as the rate of modification by bromine increases and the gas separation factor (α) can be controlled well by controlling the rate of modification by bromine in the case of the membranes of bromine-modified cardo polyimides represented by the general formula (1).

{Relationship Between the Rate of Modification by Bromine and the Gas Permeability [P(CO$_2$)]}

Figure 5:
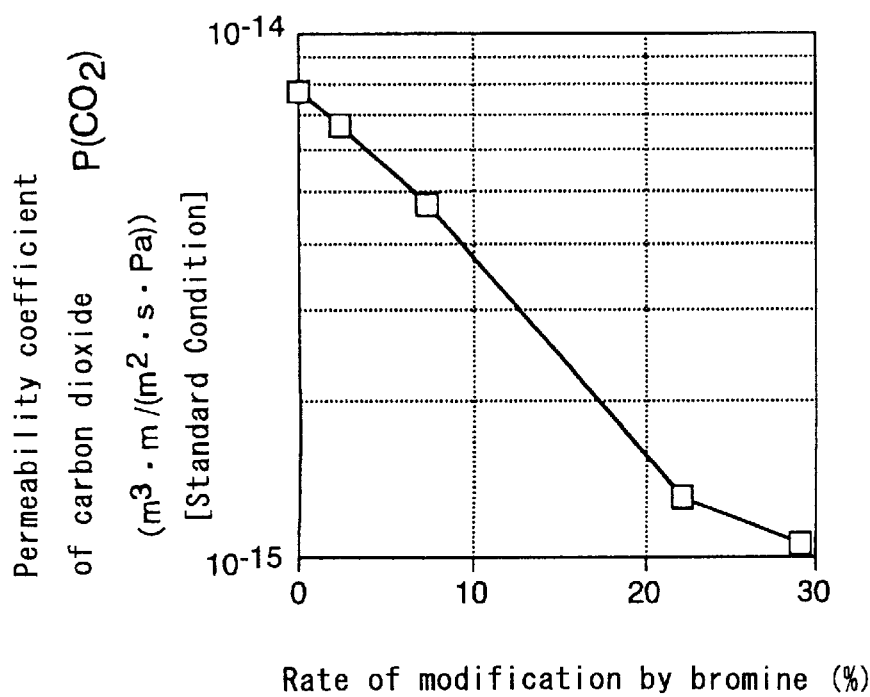
FIG. 5 is a graph showing the relationship between the rate of modification by bromine and the gas permeability [$P(CO_2)$] in Examples 7 to 10 and Comparative Example 3.

The relationship between the rate of modification by bromine and the gas permeability [P(CO$_2$)] is shown in FIG. 5 for Examples 7 to 10 and Comparative Example 3.

The results shown in FIG. 5 indicate that the gas permeability [P(CO$_2$)] diminishes as the rate of modification by bromine increases and the gas permeability can be controlled well by controlling the rate of modification by bromine in the case of the membranes of bromine-modified cardo polyimides represented by the general formula (1).

The results shown above in FIGS. 3 to 5 indicate that, with bromine-modified cardo polyimide membranes of this invention, the amount of NBS to be used as a brominating agent controls the rate of modification by bromine in the bromination reaction and, in turn, the rate of modification by bromine controls the gas selectivity (α) and gas permeability [P(CO$_2$)], indicators of the performance of gas separation membranes, and gas separation membranes of desired separation performance can be designed with ease.

INDUSTRIAL APPLICABILITY

This invention provides gas separation membranes of modified cardo polyimides which exhibit excellent, controllable, easy-to-design performance in gas permeability and gas selectivity.

This invention also provides modified cardo polyimides from which gas separation membranes exhibiting excellent and easy-to-design performance in gas permeability and gas selectivity can be produced and a process for producing said cardo polyimides.

What is claimed is:

1. A gas separation material, comprising:
   a resin material for gas separation base comprising polymer of a cardo structure in which hydrogen atoms in a side-chain benzyl and/or allyl position are halogenated at a rate of modification by halogen of 0.1% or more.

2. Resin material for gas separation base as described in claim 1, wherein said polymer is polyimide.

3. Resin material for gas separation base as described in claim 1, wherein said polymer is polyimide of a cardo structure represented by the following general formula (1)

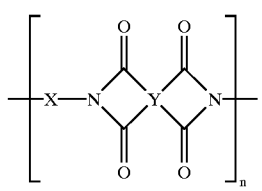
(1)

wherein X is a divalent residue of an organic group and at least partly a divalent residue of an organic group represented by the following structural formula (A)

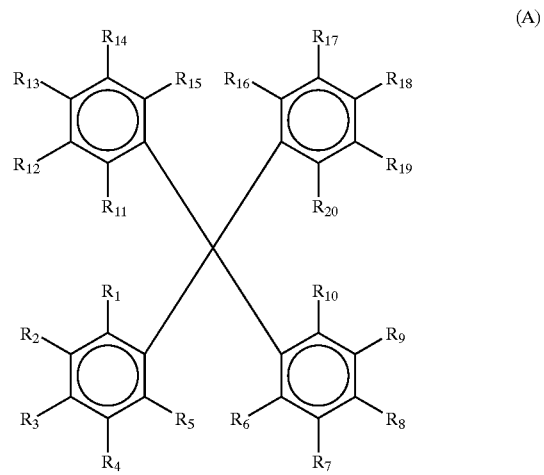
(A)

and Y is a tetravalent residue of an organic group; in the structural formula (A), at least one of $R_1$ to $R_{20}$ is a halogen-modified substituent represented by

—CZR$_{21}$R$_{22}$ (wherein Z is a halogen atom and $R_{21}$ and $R_{22}$ will be defined later), the remainder of $R_1$ to $R_{20}$ and $R_{21}$ and $R_{22}$ in the halogen-modified substituent are hydrogen, halogen, linear or branched or cyclic unsubstituted or substituted alkyl, alkenyl, alkynyl, or aryl group; the aforementioned alkyl, alkenyl, alkynyl, and aryl groups may contain one kind or two kinds or more of hetero atoms selected from nitrogen, oxygen, sulfur, phosphorus and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure.

4. Resin material for gas separation base as described in claim 3, wherein the structural formula (A) in the general formula (1) is a divalent residue of an organic group containing a fluorene skeleton represented by the following structural formula (B)

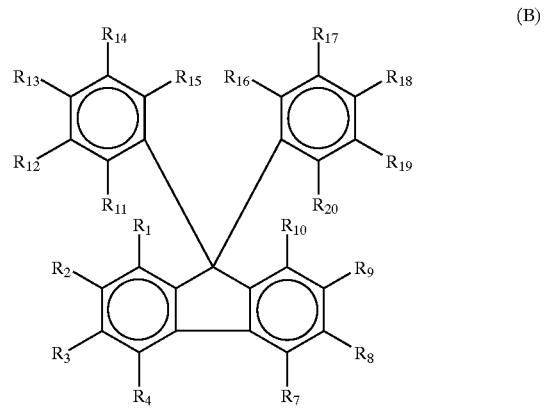
(B)

wherein $R_1$ to $R_4$ and $R_7$ to $R_{20}$ are as defined in the case of the structural formula (A).

5. Resin material for gas separation base as described in claim 4, wherein at least one substituent selected from $R_{11}$ to $R_{20}$ is a halogen-modified substituent.

6. Resin material for gas separation base as described in any one of claims 1 to 5, wherein the rate of modification by halogen of the hydrogen atoms in the side-chain benzyl and/or allyl position is 20% or more.

7. Resin material for gas separation base comprising polyimide of a cardo-type structure represented by the following general formula (1)

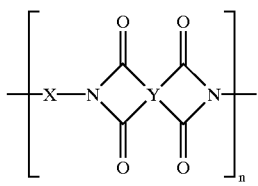

(1)

wherein X is a divalent residue of an organic group and at least partly a divalent residue of an organic group represented by the following structural formula (A)

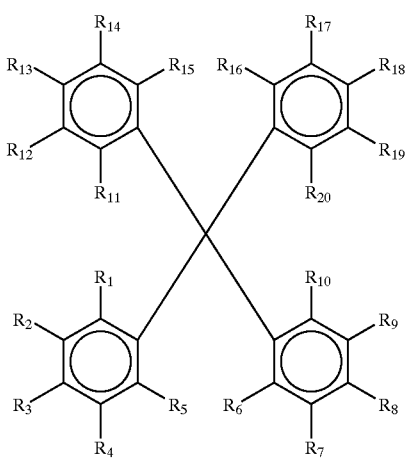

(A)

and Y is a tetravalent residue of an organic group; in the structural formula (A), at least one of $R_1$ to $R_{20}$ is a functional group-modified substituent represented by —$CFuZR_{21}R_{22}$, —$CFu_2R_{21}$ and/or —$CFu_3$ (wherein Fu is a functional group or a derivative thereof which can be introduced by replacing a halogen atom in the benzyl and/or allyl position), the remainder of $R_1$ to $R_{20}$ and $R_{21}$ and $R_{22}$ are hydrogen, halogen, linear or branched or cyclic unsubstituted or substituted alkyl, alkenyl, alkynyl, or aryl group; the aforementioned alkyl, alkenyl, alkynyl, and aryl groups may contain one kind or two kinds or more of hetero atoms selected from nitrogen, oxygen, sulfur, phosphorus and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure.

8. Resin material for gas separation base as described in claim 7, wherein the structural formula (A) in the general formula (1) is a divalent residue of an organic group containing a fluorene skeleton represented by the following structural formula (B)

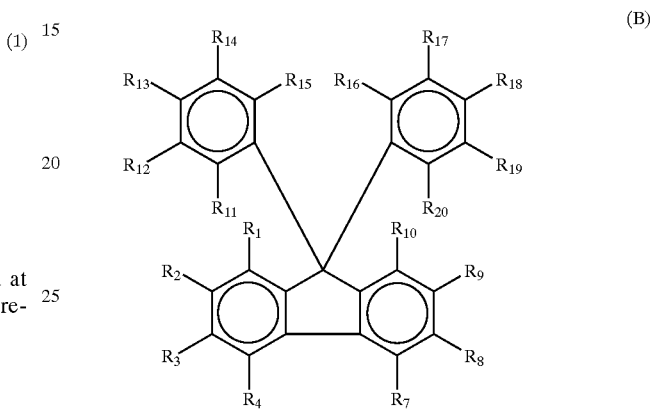

(B)

wherein $R_1$ to $R_4$ and $R_7$ to $R_{20}$ are as defined in the case of the structural formula (A).

9. Resin material for gas separation base as described in claim 8, wherein at least one substituent selected from $R_{11}$ to $R_{20}$ is a functional group-modified substituent.

10. Resin material for gas separation base comprising polymer in which the hydrogen atoms in the side-chain benzyl and/or allyl position are halogenated at a rate of modification by halogen of 34% or more.

11. Resin material for gas separation base as described in claim 10, wherein said polymer is polyimide.

12. Polymer containing a structure of cardo polyimide represented by the following general formula (1)

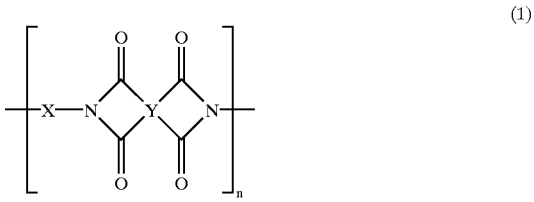

(1)

wherein X is a divalent residue of an organic group and at least partly a divalent residue of an organic group represented by the following structural formula (A)

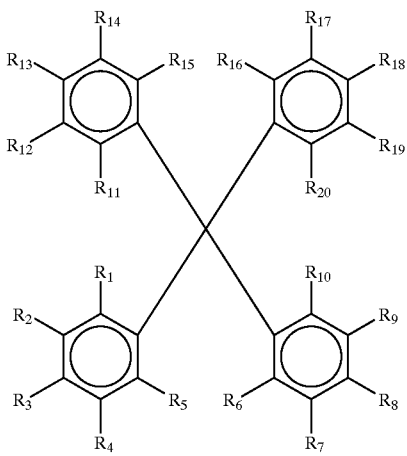

(A)

and Y is a tetravalent residue of an organic group; in the structural formula (A), at least one of $R_1$ to $R_{20}$ is a halogen-modified substituent represented by

—$CZR_{21}R_{22}$ (wherein Z is a halogen atom and $R_{21}$ and $R_{22}$ will be defined later), the remainder of $R_1$ to $R_{20}$ and $R_{21}$ and $R_{22}$ in the halogen-modified substituent are hydrogen, halogen, linear or branched or cyclic unsubstituted or substituted alkyl, alkenyl, alkynyl, or aryl group; the aforementioned alkyl, alkenyl, alkynyl, and aryl groups may contain one kind or two kinds or more of hetero atoms selected from nitrogen, oxygen, sulfur, phosphorus and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure.

13. Polymer as described in claim 12, wherein the structural formula (A) in the general formula (1) is a divalent residue of an organic group containing a fluorene skeleton represented by the following structural formula (B)

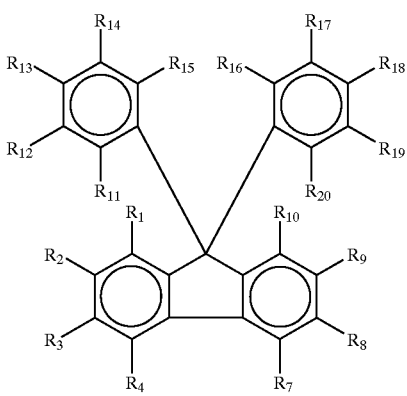

(B)

wherein $R_1$ to $R_4$ and $R_7$ to $R_{20}$ are as defined earlier.

14. Polymer as described in claim 13, wherein at least one substituent selected from $R_{11}$ to $R_{20}$ is a halogen-modified substituent.

15. Polymer as described in any one of claims 12 to 14, wherein the rate of modification by halogen in the side-chain benzyl and/or allyl position is 20% or more.

16. Polymer containing a structure of cardo polyimide represented by the following general formula (1)

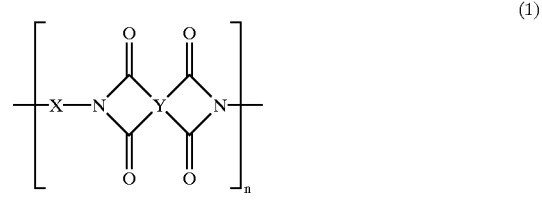

(1)

wherein X is a divalent residue of an organic group and at least partly a divalent residue of an organic group represented by the following structural formula (A)

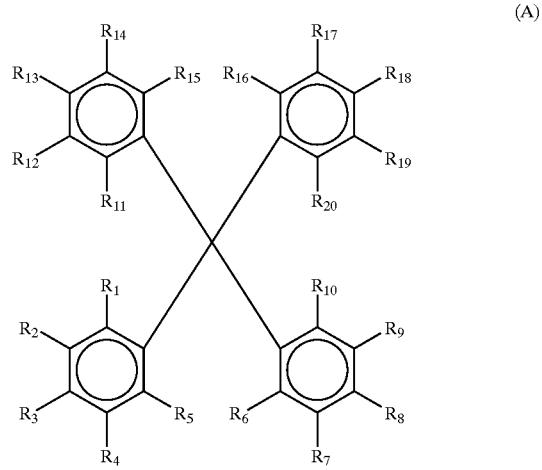

(A)

and Y is a tetravalent residue of an organic group; in the structural formula (A), at least one of $R_1$ to $R_{20}$ is a functional group-modified substituent represented by

—$CFuZR_{21}R_{22}$, —$CFu_2R_{21}$ and/or —$CFu_3$ (wherein Fu is a functional group or a derivative thereof which can be introduced by replacing a halogen atom in the benzyl and/or allyl position), the remainder of $R_1$ to $R_{20}$ and $R_{21}$ and $R_{22}$ are hydrogen, halogen, linear or branched or cyclic unsubstituted or substituted alkyl, alkenyl, alkynyl, or aryl group; the aforementioned alkyl, alkenyl, alkynyl, and aryl groups may contain one kind or two kinds or more of hetero atoms selected from nitrogen, oxygen, sulfur, phosphorus and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton; and any one of $R_1$ to $R_5$ and any one of $R_6$ to $R_{10}$ join together to form a saturated or unsaturated bond in a cyclic structure.

17. Polymer as described in claim 16, wherein the structural formula (A) in the general formula (1) is a divalent residue of an organic group containing a fluorene skeleton represented by the following structural formula (B)

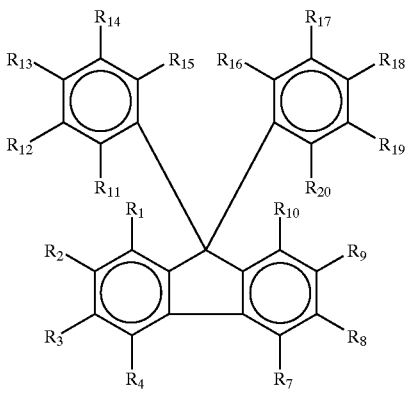

wherein $R_1$ to $R_4$ and $R_7$ to $R_{20}$ are as defined earlier.

18. Polymer as described in claim 17, wherein at least one substituent selected from $R_{11}$ to $R_{20}$ is a functional group-modified substituent.

19. A process for producing polymer containing a structure of halogen-modified cardo polyimide from a polymer containing a structure of cardo polyimide represented by the following general formula (1)

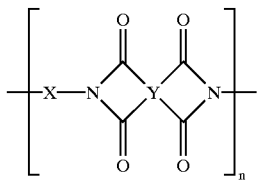

wherein X is a divalent residue of an organic group and at least partly a divalent residue of an organic group represented by the following structural formula (A)

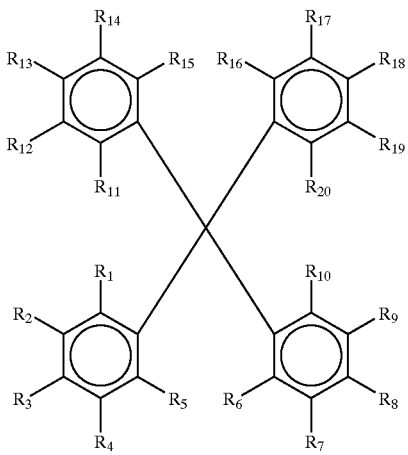

and Y is a tetravalent residue of an organic group; in the structural formula (A), at least one of $R_1$ to $R_{20}$ is a pre-modification substituent represented by

—$CHR_{21}R_{22}$ (wherein $R_{21}$ and $R_{22}$ are as defined later), the remainder of $R_1$ to $R_{20}$ and $R_{21}$ and $R_{22}$ are hydrogen, halogen, linear or branched or cyclic unsubstituted or substituted alkyl, alkenyl, alkynyl, or aryl group; the aforementioned alkyl, alkenyl, alkynyl, and aryl groups may contain one kind or two kinds or more of hetero atoms selected from nitrogen, oxygen, sulfur, phosphorus and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure; said process comprises treating said polymer containing a structure of cardo polyimide with a halogenating agent in mole equivalent corresponding to 0.01 to 3 times that of the hydrogen atoms in the benzyl and/or allyl position in said pre-modification substituent and effecting the reaction at a rate of modification by halogen of 0.1% or more to give said polymer containing a structure of halogen-modified cardo polyimide whose halogen-modified substituent is represented by

—$CZR_{21}R_{22}$ (wherein Z is a halogen atom and $R_{21}$ and $R_{22}$ are as defined earlier).

20. A process for producing polymer as described in claim 19, wherein the structural formula (A) in the general formula (1) contains a fluorene skeleton represented by the following structural formula (B)

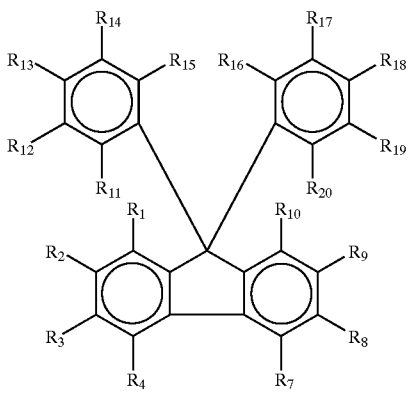

wherein $R_1$ to $R_4$ and $R_7$ to $R_{20}$ are as defined earlier.

21. A process for producing polymer as described in claim 20, wherein at least one substituent selected from $R_{11}$ to $R_{20}$ is a halogen-modified substituent.

22. A process for producing polymer as described in any one of claims 19 to 21, wherein the rate of modification by halogen of the hydrogen atoms in the side-chain benzyl and/or allyl position is 20% or more.

23. A process for producing polymer containing a functional group-modified substituent from a polymer containing a structure of cardo polyimide represented by the following general formula (1)

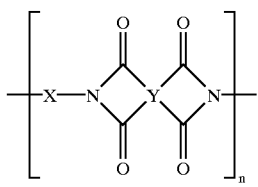
(1)

wherein X is a divalent residue of an organic group and at least partly a divalent residue of an organic group represented by the following structural formula (A)

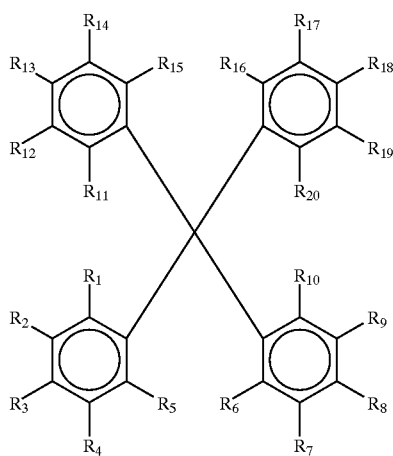
(A)

and Y is a tetravalent residue of an organic group; in the structural formula (A), at least one of $R_1$ to $R_{20}$ is a pre-modification substituent represented by

—$CHR_{21}R_{22}$ (wherein $R_{21}$ and $R_{22}$ are as defined later), the remainder of $R_1$ to $R_{20}$ and $R_{21}$ and $R_{22}$ in the pre-modification substituent are hydrogen, halogen, linear or branched or cyclic unsubstituted or substituted alkyl, alkenyl, alkynyl, or aryl group; the aforementioned alkyl, alkenyl, alkynyl, and aryl groups may contain one kind or two kinds or more of hetero atoms selected from nitrogen, oxygen, sulfur, phosphorus and halogens and may be identical with or different from one another, the aforementioned remainder of $R_1$ to $R_{20}$ and $R_{21}$ and $R_{22}$ may pair and join together directly or through another atom to form a saturated or unsaturated bond in a cyclic structure, any one of $R_{11}$ to $R_{15}$ and any one of $R_{16}$ to $R_{20}$ are respectively bonded to the nitrogen atom in the imide skeleton, and any one of $R_1$ to $R_5$ and any one of $R_6$ to $R_{10}$ join together directly or through another atom to form a saturated or unsaturated bond in a cyclic structure; said process comprises treating said polymer containing a structure of cardo polyimide with a halogenating agent in mole equivalent corresponding to 0.01 to 3 times that of the hydrogen atoms in the benzyl and/or allyl position in said pre-modification substituent, effecting the reaction at a rate of modification by halogen of 0.1% or more to give polymer containing a structure of halogen-modified cardo polyimide whose halogen-modified substituent is represented by

—$CZR_{21}R_{22}$ (wherein Z is a halogen atom and $R_{21}$ and $R_{22}$ are as defined earlier), and treating the resulting polymer with a nucleophilic reagent containing a functional group capable of undergoing substitution with the halogen atom in the halogen-modified substituent thereby converting at least a part of said halogen-modified substituent to a functional group-modified substituent represented by

—$CFuR_{21}R_{22}$, —$CFu_2R_{21}$ and/or —$CFu_3$ (wherein Fu is a functional group or a derivative thereof which can be introduced by replacing a halogen atom in the benzyl and/or allyl position).

24. Resin material for gas separation membrane as described in claim 1 in the form of gas separation membrane.

25. Cardo polymer in which hydrogen atoms in a side-chain benzyl and/or allyl position are halogenated at a rate of modification by halogen of 0.1% or more.

26. Cardo polymer as described in claim 25, wherein said polymer is polyimide.

27. Polymer containing cardo polymer modified by functional groups at least one of which is represented by

—$CFuR_{21}R_{22}$, —$CFu_2R_{21}$ and/or —$CFu_3$ wherein Fu is a functional group or a derivative thereof which can be introduced by replacing a halogen atom in a side chain benzyl and/or allyl position and $R_{21}$ and $R_{22}$ are hydrogen, halogen, linear or branched or cyclic unsubstituted or substituted alkyl, alkenyl, alkynyl or aryl group, may contain one kind or two kinds or more of hetero atoms selected from nitrogen, oxygen, sulfur, phosphorus and halogens, may be identical with or different from one another, and may join together or to other carbon atoms to form a saturated or unsaturated bond in cyclic structure.

28. Polymer as described in claim 27, wherein said polymer is polyimide.

29. Polymer as described in claim 27 useful for resin material for gas separation base.

30. Polymer as described in claim 28 useful for resin material for gas separation base.

31. Resin material for gas separation base as described in claim 29 or 30 in the form of gas separation membrane.

* * * * *